INVENTOR.
Robert B. Trousdale
BY T. L. Bowes
Att'y

TELEPHONE SYSTEM

Filed May 29, 1953 28 Sheets-Sheet 2

INVENTOR.
Robert B. Trousdale
BY
T. L. Bowes
Att'y

INVENTOR.
Robert B. Trousdale
BY T. L. Bowes
Attorney

INVENTOR.
Robert B. Trousdale
BY
T. L. Bowes
Attorney

INVENTOR.
Robert B. Trousdale
BY T. L. Bowes
Attorney

Dec. 11, 1956 R. B. TROUSDALE 2,773,939

TELEPHONE SYSTEM

Filed May 29, 1953 28 Sheets-Sheet 6

INVENTOR.
Robert B. Trousdale
BY J. L. Bowes
Att'y

Dec. 11, 1956 R. B. TROUSDALE 2,773,939

TELEPHONE SYSTEM

Filed May 29, 1953 28 Sheets-Sheet 7

INVENTOR.
Robert B. Trousdale
BY
T. L. Bowes
Att'y

Common Equipment-17

INVENTOR.
Robert B. Trousdale
BY
T. L. Bowes
Att'y

INVENTOR.
Robert B. Trousdale
BY
T. L. Bowes
Attorney

INVENTOR.
Robert B. Trousdale
BY T. L. Bowes
Attorney

Dec. 11, 1956 R. B. TROUSDALE 2,773,939

TELEPHONE SYSTEM

Filed May 29, 1953 28 Sheets-Sheet 11

INVENTOR.
Robert B. Trousdale
BY
T. L. Bowes
Attorney

INVENTOR.
Robert B. Trousdale
BY
T. L. Bowes
Attorney

INVENTOR.
Robert B. Trousdale
BY
J. L. Bowes
Attorney

Dec. 11, 1956 R. B. TROUSDALE 2,773,939

TELEPHONE SYSTEM

Filed May 29, 1953 28 Sheets-Sheet 14

INVENTOR.
Robert B. Trousdale
BY
T. L. Bowes
Attorney

Dec. 11, 1956 R. B. TROUSDALE 2,773,939
TELEPHONE SYSTEM
Filed May 29, 1953 28 Sheets-Sheet 15
Fig. 12
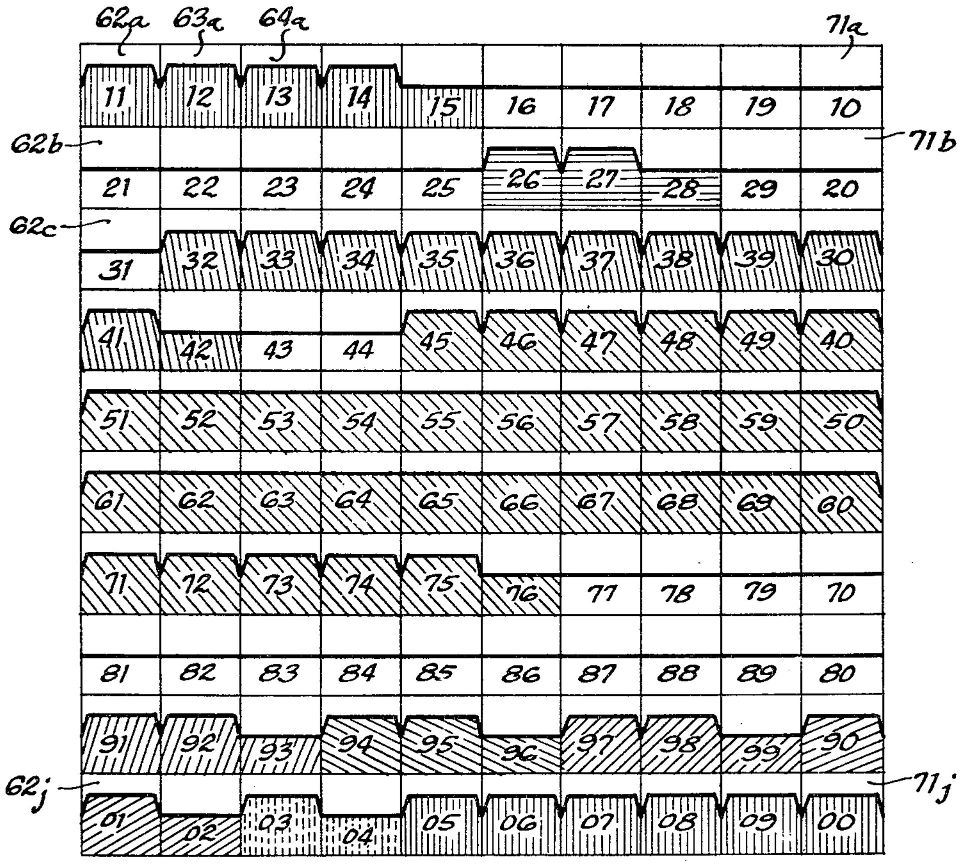
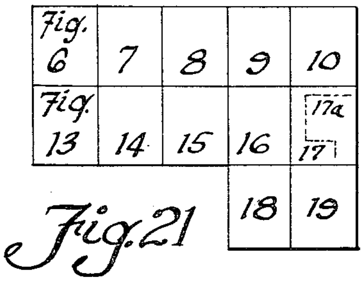
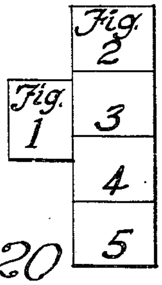
Fig. 20
INVENTOR.
Robert B. Trousdale
BY
T. L. Bowes
Attorney INVENTOR.
Robert B. Trousdale
BY
T. L. Bowes
Attorney INVENTOR.
Robert B. Trousdale
BY
T. L. Bowes
Attorney Dec. 11, 1956 R. B. TROUSDALE 2,773,939

TELEPHONE SYSTEM

Filed May 29, 1953 28 Sheets-Sheet 18

INVENTOR.
Robert B. Trousdale
BY
T. L. Bowes
Attorney

INVENTOR.
Robert B. Trousdale
BY
T. L. Bowes
Attorney

INVENTOR.
Robert B. Trousdale
BY T. L. Bowes
Attorney

Dec. 11, 1956 R. B. TROUSDALE 2,773,939

TELEPHONE SYSTEM

Filed May 29, 1953 28 Sheets-Sheet 21

INVENTOR.
Robert B. Trousdale
BY
T. L. Bowes
Att'y

Dec. 11, 1956 R. B. TROUSDALE 2,773,939

TELEPHONE SYSTEM

Filed May 29, 1953 28 Sheets-Sheet 22

INVENTOR.
Robert B. Trousdale
BY
T. L. Bowes
Att'y

Dec. 11, 1956 R. B. TROUSDALE 2,773,939

TELEPHONE SYSTEM

Filed May 29, 1953 28 Sheets-Sheet 23

INVENTOR.
Robert B. Trousdale
BY
T. L. Bowes
Attorney

Dec. 11, 1956 R. B. TROUSDALE 2,773,939

TELEPHONE SYSTEM

Filed May 29, 1953 28 Sheets-Sheet 24

INVENTOR.
Robert B. Trousdale
BY
T. L. Bowes
Attorney

Dec. 11, 1956 R. B. TROUSDALE 2,773,939

TELEPHONE SYSTEM

Filed May 29, 1953 28 Sheets-Sheet 25

INVENTOR.
Robert B. Trousdale
BY
T. L. Bowes
Attorney

Dec. 11, 1956 R. B. TROUSDALE 2,773,939

TELEPHONE SYSTEM

Filed May 29, 1953 28 Sheets-Sheet 26

INVENTOR.
Robert B. Trousdale
BY
T. L. Bowes
Attorney

INVENTOR.
Robert B. Trousdale
BY
T. L. Bowes
Att'y

Dec. 11, 1956

R. B. TROUSDALE 2,773,939

TELEPHONE SYSTEM

Filed May 29, 1953

28 Sheets-Sheet 28

INVENTOR.
Robert B. Trousdale
BY
T. L. Bowes
Att'y

United States Patent Office 2,773,939 Patented Dec. 11, 1956

2,773,939

TELEPHONE SYSTEM

Robert B. Trousdale, Webster, N. Y., assignor, by mesne assignments, to General Dynamics Corporation, a corporation of Delaware Application May 29, 1953, Serial No. 358,240

29 Claims. (Cl. 179—18)

The present invention relates to improved methods and apparatus for selectively setting up signal transmission connections between the lines of a signaling system, and more particularly, to improved methods and apparatus for setting up two-way communication connections between the lines of an automatic telephone system wherein facilities are provided for restricting the service available to one or more calling lines of the system. Specifically, the present invention is directed to certain improvements in a fully automatic electronic telephone system of the type disclosed in a copending application of Frank A. Morris and Robert B. Trousdale, Serial No. 134,974, filed December 24, 1949, and my copending application, Serial No. 301,215, filed July 28, 1952, which are assigned to the same assignee as the present invention, whereby restricted service facilities are provided for certain calling lines of the system so that different types of service are available to different lines.

Many types of automatic switching apparatus have been proposed and developed for transmitting signals between the lines of telephone, telegraph and other communication systems. In the main, the apparatus proposed and developed for this purpose utilizes electromechanical devices embodying moving mechanical parts, such, for example, as relays, stepping switches and the like, to perform the line selecting, line interconnecting and ancillary functions required in selectively interconnecting any two lines of a large group of lines. While apparatus of this type and embodying switching devices of various forms have been developed to provide thoroughly reliable service, it is inherently subject to several limitations, including that of insufficient operating speed. To overcome these limitations, various proposals have been made for utilizing electronic facilities, such, for example, as cathode ray tubes for the purpose of transmitting signals between the lines of a signaling system on a selective basis. However, most, if not all, of these proposals are limited to arrangements for providing one-way signal transmission between two lines.

In the improved systems disclosed in the above-identified copending applications, a system of multiplexing, namely, pulse sampling effectively at an ultrasonic rate of the control and intelligence signals produced at each substation of the system, is utilized to provide signal channel separation. Specifically, each line of the system is assigned a particular pulse time position in each of repetitive pulse frames each comprising one hundred pulse time positions. Intelligence and control signals developed on any one line of the system are sampled only in the particular pulse time position assigned to the particular line and the samples are carried through the signal transmitting components of the system as far as the connector stage on multiplexer signal pulses occurring in this particular time position. In the connector stage, the control and intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation. In the copending application, Serial No. 301,215, identified above, there is also disclosed a party line ringing system whereby party line service is provided as well as facilities for special services such as trunk hunting and conversation timing. While these systems are entirely satisfactory in operation, no provisions are made for restricting the service available to individual lines on a calling line basis. Restricted service facilities are desirable in many situations, particularly in the case of conversation timing, in order that the lines of the system may be assigned different types of service and variations in service charges may be made in accordance therewith.

Accordingly, it is an object of the present invention to provide new and improved methods and apparatus for selectively setting up two-way communication connections between different pairs of lines of a signaling system wherein restricted service facilities are provided to restrict the service available to certain calling lines of the system.

It is another object of the present invention to provide an automatic telephone system capable of providing the services of electromechanical switch-type systems, including calling line restricted service, but which consists exclusively of electron conducting devices such, for example, as electron tubes, gas tubes, crystal rectifiers, semiconductors, and the like, together with interconnecting circuit components therefor.

It is still another object of the present invention to provide a new and improved electronic telephone system wherein restricted service facilities are provided to permit certain calling lines of the system to obtain different special services, such as conversation timing, trunk hunting or the like, incident to the setting up of the connection.

It is a further object of the present invention to provide a new and improved electronic telephone system wherein different calling lines of the system are permanently assigned a particular type of service which may include service restrictions such as conversation timing or the like.

It is a still further object of the present invention to provide a new and improved electronic telephone system wherein linkage adapted to give different types of service is provided and calling lines of the system are restricted to the use of one particular type of linkage.

It is another object of the present invention to provide a new and improved electronic telephone system which is fully automatic in operation and is adapted to provide calling line restricted service, which compares favorably in first cost with electromechanical systems of the same capacity and requires a minimum of special circuit components in the construction thereof, and yet is capable of providing reliable service with a minimum amount of maintenance.

The invention, both as to its organization and method of operation, together with further objects and advantages thereof, will best be understood by reference to the following specification taken in connection with the accompanying drawings, in which:

Figs. 1 to 5, inclusive, when arranged in the manner shown in Fig. 20, illustrate in block diagram form an automatic telephone system characterized by the features of the present invention;

Figs. 2A, 2B and 2C, when laid side by side in the order named, diagrammatically illustrate the components of a finder-connector link which is a composite of the links shown in the system of Figs. 1 to 5, inclusive;

Figs. 6 to 10, inclusive, and 13 to 19, inclusive, when arranged in the manner shown in Fig. 21, illustrate the details of the finder-connector link shown in Figs. 2A, 2B and 2C;

Figs. 11 and 12 illustrate certain waveforms developed in the system of Figs. 1 to 5, inclusive;

Figs. 22 to 25, inclusive, when laid side by side, graphically illustrate certain other waveforms generated in the system of Figs. 1 to 5, inclusive; and Figs. 17A, 26 and 27 illustrate the details of the restricted service marking generators of the system of Figs. 1 to 5, inclusive.

In general, the electronic telephone system herein disclosed is capable of serving one hundred lines, each of which may have associated therewith a number of party line substations up to a maximum of ten such party line substations for each line. More specifically, the disclosed system is capable of providing two-way communication connections between any two lines of a one hundred line group on either a private or party line basis, and includes entirely novel facilities for marking the lines of the system as being in different service charge groups having different types of service available thereto and restricting the service available to each calling line in accordance with the service group to which it is assigned. Furthermore, this is accomplished on a fully automatic basis without the use of any relays, stepping switches or other equivalent mechanical devices having moving parts.

In order to minimize the amount of equipment used in certain components of the system, a decimal system of multiplexing is employed which entails arbitrary division of the lines of the system into subgroups. More specifically, the one hundred lines of the system are divided into ten subgroups of ten lines each, and tens multiplexing or gating pulses are developed at the rate of ten pulses for each pulse frame. Each tens pulse individually corresponds to a particular subgroup of ten lines and occurs during the time interval of each pulse frame which exactly spans the ten pulse time positions individually assigned to the lines of the particular subgroup. With this system of multiplexing, transmission of multiplexer signal pulses through certain of the signal transmission components of the system is dependent upon time coincidence of these signal pulses with particular tens pulses of successive pulse frames as well as coincidence of these pulses with particular pulse time positions within successive pulse frames.

In order to provide restricted service facilities for different calling lines of the system, the connectors of the system are arranged in different groups, each group of connectors being adapted to provide a different type of service, and restricted service marking generators are provided for each group of connectors, these generators being controlled in accordance with the tens and units pulses developed in the common equipment of the system. The restricted service marking generators are employed to control the finders associated with the connectors of each group so that calling lines which have a particular type of service available thereto are given access to the connector group which provides that service and are prevented from gaining access to the other connector groups.

GENERAL DESCRIPTION OF THE SYSTEM

Referring now to the drawings and, more particularly, to Figs. 1 to 5, inclusive, thereof, the present fully automatic electronic telephone system is there illustrated as comprising line circuits, such as the illustrated line circuits 6, 7, 8, 10 and 16, which are individual to the one hundred lines of the system, a multiplexer 11 of which only one is required in the system, a first group of identical finder-connector links 12, 13 and 14 which are adapted to provide a first type of service identified as service A, a second group of identical finder-connector links 12', 13' and 14' which are adapted to provide a different type of service identified as service B, a third group of identical finder-connector links 12'', 13'' and 14'' adapted to provide a still different type of service identified as service C, a distributor 15 of which only one is required in the system, a restricted service marking generator 190 adapted to function with the service A links 12, 13 and 14, a restricted service marking generator 191 adapted to function with the service B links 12', 13' and 14', a restricted service marking generator 192 adapted to function with the service C links 12'', 13'' and 14'', and the common equipment indicated generally at 17 in Fig. 5 of the drawings.

The one hundred lines of the system are arranged in different groups, each group of lines having one particular type of service available thereto. Thus, in the illustrated embodiment the lines numbered 1 to 9, inclusive, and 56 to 100, inclusive, are arranged to have the type of service provided by the service A links 12, 13 and 14 available thereto, the lines 92 and 94 being shown in Fig. 1 as representative of this group. The lines numbered 26 to 55, inclusive, are arranged to have the type of service provided by the service B links 12', 13' and 14' available thereto, the lines 32 and 53 being shown in Fig. 1 as representative of this second group of lines. The lines numbered 10 to 25, inclusive, are arranged to have the type of service provided by the service C links 12'', 13'' and 14'' available thereto, the line 23 being shown in Fig. 1 as representative of this third group of lines. In this connection it will be understood that the lines of the system may be picked at random or arranged in any desired sequence in the different service groups, the consecutively numbered group arrangement being illustrated merely to simplify the description of the system.

Each of the finder-connector links of the system is comprised of a finder and a connector. Thus, the first link 12 in the service A group includes the finder **12*a* and the connector 12*b*, the second link 13 includes the finder link 13*a* and the connector 13*b* and the last link 14 includes the finder 14*a* and the connector 14*b*. In the service B group the first link 12' includes the finder 12*a*' and the connector 12*b*', the second link 13' includes the finder 13*a*' and the connector 13*b*' and the last link 14' includes the finder 14*a*' and the connector 14*b*'. Finally, in the service C group, the first link 12'' includes the finder 12*a*'' and the connector 12*b*'', the second link 13'' includes the finder 13*a*'' and the connector 13*b*'' and the last link 14'' includes the finder 14*a*'' and the connector 14*b*''**. The finders of all of the finder-connector links of the system are identical. However, the connectors of each service group are adapted to provide the particular type of service required, a composite finder-connector link embodying the features of all of the finder-connector links of the system being shown in Figs. 2A, 2B and 2C of the drawings. It will be understood that the number of finder-connector links employed in a particular service group is chosen as required to handle the expected traffic in accordance with the number of lines assigned to the particular service group. Thus, although only three links have been illustrated in each service group, it may be necessary to employ more links in any one service group to handle the expected traffic. Inclusion of the additional links in each service group may easily be accomplished by connecting appropriate terminals of additional links to the indicated multiple points.

The line circuits respectively terminate different two-conductor lines which may be used for either private or party line service. Thus, in the illustrated embodiment, the line circuit 6 terminates the private line 23, the line circuit 7 terminates the private line 32, the line circuit 53 terminates the private line 53, the line circuit 10 terminates the private line 92 and the line circuit 16 terminates the party line 94. The private lines of the system have one substation associated therewith, this substation having a directory number designation corresponding to the line number plus a party line ringing digit for uniform directory numbering. Thus, the line 23 terminates in the substation E, the line 32 terminates in the substation F, the line 53 terminates in the substation G and the line 92 terminates in the substation A. The party line 94 terminates in a plurality of party line substations A′, B′, C′, D′, etc., which are assigned different directory numbers having the same first and second digits and different third or party line ringing digits. Thus, the substation A′ is assigned the directory number "941", the substation B′ is assigned the directory number "942", the substation C′ is assigned the directory number "943", etc. It will be understood that any one or all of the lines of the system may have a number of party line substations associated therewith, these substations being selectively signaled on a fully selective or semi-selective harmonic ringing basis, as described in detail in my copending application, Serial No. 301,215, identified above.

In the system of the present invention, facilities are provided in the service A links for private branch exchange operation wherein a plurality of lines may be designated as private branch exchange trunks, and a trunk hunting or consecutive number hunting operation may be performed in response to a call directed to one of the private branch exchange trunks, provided the calling line is entitled to this type of service. Also, in the system of the present invention, facilities are provided for timing the duration of the call, warning the calling and called subscribers when the conversation timing period is almost over, and breaking the connection when the conversation timing period has expired, provided the calling line is restricted in this manner.

In the illustrated embodiment, the service A links 12, 13 and 14 are arranged to provide a service wherein the trunk hunting facilities are made available to the calling line and wherein the length of the call is unlimited, i. e., conversation timing facilities are not employed. The service B links are arranged to provide a service wherein the trunk hunting facilities are not available to the calling line, but the length of the call is unlimited as in the service A group. In the service C group the links 12″, 13″ and 14″ are arranged to provide a service wherein no trunk hunting facilities are available and the duration of the call is limited by conversation timing facilities in these links. In this connection it will be understood that other restrictions may be placed on the type of service available to the calling line, the services of conversation timing and trunk hunting or consecutive number hunting being shown merely for purposes of illustration of the broad principles of the present invention.

Each line circuit performs the functions of repeating intelligence or control signals from its associated substation or substations to a corresponding one of the gate circuits in the multiplexer 11, repeating intelligence signals derived from a particular gate circuit of the distributor 15 to its associated substation or substations, and of responding to party line ringing control signals, derived from the operatively associated connector by way of the distributor 15, by transmitting ringing current at a particular selected frequency to the associated substation or substations on a call incoming thereto. To perform these functions, the line circuit 10, for example, is connected by way of the conductors 53*a* and 53*b* to one of the gate circuits in the multiplexer 11 and is connected by way of the conductor 44 to the corresponding gate circuit provided in the distributor 15. The line circuits 6, 7, 8 and 16 as well as the other ninety-five line circuits of the system which are not illustrated, are, likewise, connected on an individual basis to corresponding gate circuits of the multiplexer 11 and the distributor 15, and each line circuit is also connected to certain components of the common equipment 17 in a manner more fully explained below.

Generally speaking, the multiplexer 11 performs the functions of sampling the intelligence and control signals derived from the one hundred line circuits of the system only in the pulse time positions of each pulse frame individually assigned to the lines served by these line circuits and of modulating the sampled intelligence or control signals on the multiplexer signal pulses occurring in these pulse time positions for transmission to all of the finders and connectors of the system over the common conductor 50. In reverse manner, the distributor 15 performs the function of deriving intelligence signals from the signal modulated connector signal pulses which are released by the connectors of the system to the common input conductor 51 of the distributor 15 and of distributing the derived signals to the corresponding line circuits in accordance with the pulse time position assigned to the particular connector signal pulses. In performing the described functions, the multiplexer 11 and the distributor 15 are controlled by certain components of the common equipment 17.

The finders of the various links in each service group are identical and function strictly as control units. Moreover, in accordance with the present invention, each finder is provided with restricted service facilities which cooperate with the restricted service marking generator assigned to the particular service group to prevent the finder from seizing calling lines which are not entitled to the particular service provided by the connector associated with the finder. Thus, considering the finder 12*a* in the service A group of finder-connector links, the restricted service marking generator 190 functions in a manner to be explained in more detail hereinafter to impress negative restricted service marking pulses on the output conductor 190*a* thereof in the time positions assigned to those lines of the system which are not entitled to have access to the service A links. Thus, in the illustrated embodiments wherein lines 1 to 9, inclusive, and 56 to 100, inclusive, are assigned to the service A group, the marking generator 190 develops marking pulses on the conductor 190*a* in the time positions assigned to the lines 10 to 55, inclusive, and these pulses are impressed only upon the finders 12*a*, 13*a* and 14*a* in the service A group. Each of the finders in this group, such as the finder 12*a*, is provided with facilities responsive to the above-described marking pulses developed on the conductor 190*a* for preventing the finders in the service A group from responding to multiplexer signal pulses appearing on the common conductor 50 in the same time position. Accordingly, the lines numbered 10 to 55, inclusive, are prevented from becoming operatively associated with the finders of the finder-connector links in the service A group and, accordingly, are prevented from receiving the trunk hunting or consecutive number hunting service which these links are adapted to provide.

In the same manner, the restricted service marking generator 191*a*, which is associated with the service B links, is arranged to provide restricted service marking pulses on the output conductor 191*a* thereof in the time positions assigned to the lines numbered 1 to 25, inclusive, and 56 to 100, inclusive. The finders 12*a*′, 13*a*′ and 14*a*′ in the service B group respond to the restricted service marking pulses on the conductor 191*a* by preventing the multiplexer signal pulses appearing upon the common conductor 50 in the time positions assigned to the lines numbered 1 to 25, inclusive, and 56 to 100, inclusive, from entering these finders so that only the lines numbered 26 to 55, inclusive, may become operatively associated with the finders in the service B group. Similarly, the restricted service marking generator 192 is arranged to develop restricted service marking pulses on the conductor 192*a* thereof in the time positions assigned to the lines numbered 1 to 9, inclusive, and 26 to 100, inclusive, and the finders 12*a*″, 13*a*″ and 14*a*″ in the service C group respond to the marking pulses in the conductor 192*a* by preventing those multiplexer pulses which appear on the common conductor 50 in the same time positions from entering these finders.

In addition to the above-described restricted service facilities, each of the finders performs a number of other functions. Thus, considering the finder 12*a*, for example, this finder performs the function of determining when the link 12 shall be taken into use in handling a call originating on one of the lines assigned to the service A group, determining which calling line within the service A group the link 12 is to be associated in handling a call, and determining the particular pulse time position of successive pulse frames which is assigned to this calling line and during which signal bearing pulses derived from the multiplexer 11 shall be effective to produce a response in the finder and in the associated connector 12*b*. To advise the connector 12*b* of the pulse time position assigned to the seized calling line, the finder 12*a* transmits finder gate pulses to the connector in this pulse time position over the conductor 12*d*. The finder 12*a* also performs the function of conditioning its associated connector 12*b* for operation when the link 12 is definitely associated with a calling line in the service A group so as to handle the call initiated on that line. This is accomplished through operation of the finder 12*a* to impress operating anode potential upon a plurality of tubes in the connector 12*b* over the +B switch conductor 12*c*. When operatively associated with the particular calling line, the finder 12*a* also performs the function of guarding the calling line against intrusion on an incoming call to the line. This is accomplished through operation of the finder 12*a* to feed busy pulses occurring in the particular pulse time position assigned to the calling line with which the finder is operatively associated over the common busy pulse out conductor 52*a* and by way of the link coupling circuits 24 and the busy pulse in conductor 52*b* to each of the finders and connectors of the system. The finder 12*a* further performs the function of supplying an allotting signal over the conductor 36*b* to the finder 13*a* of the next succeeding link 13 in the service A group when the finder 12*a* is taken into use so that the finder-connector links in the service A group are allotted to the use of calling lines assigned to this group one at a time. In a similar manner the finders in each of the other service groups are provided with self-allotting facilities whereby the finders in each service group are successively allotted to calling lines within the corresponding service group one at a time.

To perform the above functions in the manner more fully explained below, the finder 12*a* comprises (see Fig. 2A), a pulse input circuit 200 which is provided with restricted service facilities, a +B switching circuit 201, a pulse combining circuit 202, tens and units coincidence tube circuits 203 and 204, a finder pulse forming circuit 205 and a self-allotting circuit 206.

Each of the connectors of the system is controlled by the finder gate pulses delivered thereto from the associated finder and responds to signal bearing multiplexer pulses occurring in the pulse time position corresponding to the calling line with which the link is associated. The connector also responds to the application of operating anode potential to the +B switch conductor and to the finder gate pulses by returning a dial tone signal to the calling subscriber. The connector then responds to dial impulses constituting the first and second digits dialed into the connector by selecting the particular pulse time position assigned to the called line and the third or party line ringing digit is employed to select the particular party line ringing signal assigned to the called substation associated with the called line. In so doing the connector tests the pulse time position assigned to the called line to determine the idle or busy condition thereof and transmits a busy tone signal to the calling subscriber if the called line tests busy.

When the called line time position is selected in the connector, it conditions itself to accept signal bearing pulses from the multiplexer 11 which occur in the pulse time position assigned to the selected called line and stores the intelligence carried by these pulses which is transmitted to the distributor 15 on the connector signal pulses occurring in the time position corresponding to the calling line with which the link is operatively associated. The connector also performs the auxiliary functions of terminating dial tone transmission when the first dial impulse is dialed into the connector and busying the called line over the common busy pulse out conductor 52*a* to guard the called line against seizure through another link. When the call is answered, the connector terminates the party line ringing signal and concurrently terminates a ringback tone signal which is transmitted to the calling subscriber to inform him of the progress of the call.

In addition to the above-mentioned functions, the connectors in the service A group are arranged to provide facilities for trunk hunting or consecutive number hunting to select an idle line within a called private branch exchange trunk group in response to a call directed to one of the lines in this trunk group. If the called line tests busy and is a member of a private branch exchange trunk group, the connectors in the service A group function to select the pulse time position next adjacent the time position assigned to the called line, i. e., the time position assigned to the next consecutively numbered line of the system and tests successive pulse time positions until either an idle line is found or the last line in the called trunk group is reached. If all of the lines in the trunk group are busy, the connector then transmits a busy tone signal to the calling subscriber to inform him of this condition.

The connectors in the service C group are not equipped with trunk hunting facilities but are arranged to provide conversation timing so as to limit the length of the call. Thus, the connectors in the service C group are arranged to initiate a conversation timing period when the call is answered and function to transmit a warning tone signal to the calling and called subscribers a predetermined interval before the end of the conversation timing period to inform them that the call will be terminated automatically a short interval thereafter. At the end of the conversation timing period, the connectors in the service C group function either to break the connection or transmit a busy tone signal to the calling subscriber to prevent continuance of the call.

In order to illustrate the component units of the connectors in each service group, there is shown in Figs. 2B and 2C, in block diagram form, a composite connector wherein all of the facilities employed in the different types of connectors of the system are shown. Referring to these figures, each of the connectors of the system is provided with a calling line in gate circuit 207, a calling line reconstructor circuit 208, a called line out gate circuit 224, a called line in gate circuit 223, a called line reconstructor circuit 222 and a calling line out gate circuit 226. The three circuits 207, 208 and 224 function to repeat intelligence from the calling line to the called line, whereas, the three corresponding circuits 223, 222 and 226 function to repeat to the calling line intelligence derived from the called line. In addition, each connector of the system comprises a dial impulse integrator circuit 209, tens units and party inverter circuits 260, 261 and 262, tens units and party digit registers 211, 215 and 265, tens units and party register pulses 210, 214 and 263, and tens units and party sequence timing circuits 212, 216 and 264. These component units function to register the time position assigned to the calling line as well as the party line ringing signal assigned to the called substation. Each connector further comprises a connector pulse forming circuit 217, a busy test circuit 218, a busy lock circuit 219, a busy gate circuit 220, supervisory tone gate circuits 225, a code start circuit 268 and a ring trip circuit 221.

In addition to the above-enumerated component units, the connectors of the service A group, i. e., the connectors 12*b*, 13*b* and 14*b* are equipped with trunk hunting facilities which include a trunk hunting control circuit 283, a units register advancer 281 and a tens register advancer 280.

The connectors of the service C group do not include the above-enumerated trunk hunting units but, instead, include facilities for conversation timing which include a conversation timing warning tone circuit 284, a party register advancer 282, and a conversation timing control circuit 285. It will also be understood that the connectors of the service B group are not equipped with either trunk hunting facilities or conversation timing facilities so that the above-enumerated units are not provided in the connectors of the service B group, as will be explained in more detail hereinafter.

The common equipment 17 comprises a master oscillator 18, a phase shifter and pulse former network 19, a units pulse ring circuit 20, a tens pulse ring circuit 21, a channel pulse commutator 22, a commutator drive circuit 25, a harmonic ringing oscillator 97, a harmonic ringing frequency generator 98, a harmonic ringing code forming circuit 99, a harmonic ringing modulator circuit 100, a ringback tone generator 29c, a supervisory carrier supply circuit 26, the link coupling circuits 24, a busy tone generator **29*a* and a dial tone generator 29*b***. All of the above-enumerated units are substantially identical to the corresponding units identified by the same reference numerals in my copending application, Serial No. 301,215, identified above, and reference may be had to this application for a complete and detailed description thereof.

The common equipment 17 of the present invention also includes the trunk hunting drive pulse generator 55 which supplies trunk hunting drive pulses over the conductor **55*a* to the finder-connector links in the service A group, and a trunk marking pulse generator which supplies trunk marking pulses identifying the lines of the system which are marked as private branch exchange trunks over the conductor 56*a* to the finder-connector links of the service A group. The common equipment 17 also includes a conversation timing pulse generator 57 which supplies conversation timing pulses over the conductor 57*a* to the finder-connector links in the service C group, and a conversation timing warning tone generator 58 which supplies a warning tone signal over the conductor 58*a*** to the links in the service C group. The trunk hunting and conversation timing generators are also substantially identical to the corresponding components described in detail in my copending application, Serial No. 301,215, identified above, and reference may be had thereto for a complete and detailed description of these units.

In order to render the mode of operation of the system more readily understandable, a pulse chart has been illustrated in Figs. 22 to 25, inclusive, to show the relative widths of the pulses developed by the common equipment components 19, 20, 21 and 22 during two successive pulse frames, as well as the time or phase relationship between the pulses. As there shown, the units pulse ring drive pulses **95*a*, appearing on the conductor 40, are produced by the phase shifter and pulse former circuit 19 along the zero potential reference line 95 at a frequency rate of one megacycle and are of positive polarity. Similarly, the channel pulse commutator drive pulses 96*a* appearing on the conductors 41 and 35 are produced by the phase shifter and pulse former network 19 along the zero potential reference line 96 at the same frequency of one megacycle and are of positive polarity. It will be noted that both the units pulse ring drive pulses 95*a* and the commutator drive pulses 96*a* are very narrow, i. e., persist for very short time intervals, and that the pulses 96*a* are so displaced in time relative to the pulses 95*a* that each commutator drive pulse 96*a* occurs approximately at the middle of the period separating the preceding and succeeding units pulse ring drive pulses 95*a*. The positive units pulses appearing respectively on the units pulse conductors 31*a*, 31*b*—31*j* are produced along the zero potential reference lines 62, 63—71. It will be noted that the units pulses are produced by the units pulse ring circuit 20** at the fundamental frequency rate of one megacycle. However, due to diversion of the pulses successively to different ones of the units pulse conductors *a, b—j*, the pulses along any particular zero potential reference line, such, for example, as the line 62, recur only at a frequency rate of one hundred kilocycles.

The positive tens pulses successively produced by the tens pulse ring circuit 21 on the tens pulse conductors **32*a*, 32*b*—32*j* are illustrated as appearing along the ten zero potential reference lines 72 to 81, inclusive. It will be noted that each tens pulse persists for a time interval exactly equaling the time required to produce ten units pulses. Thus, the tens pulse period 72*a* persists for the duration of the interval in which the ten units pulses 62*a*—71*a* are successively produced by the units pulse ring circuit 20**.

The channel pulses which are successively produced on the ten channel pulse conductors **34*a*, 34*b*—34*j* by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96*a* appearing along the zero potential reference line 96. Like the units pulses, the channel pulses are produced at the fundamental frequency rate of one megacycle, but due to the action of the commutator 22 in diverting these pulses successively to the conductors 34*a*, 34*b*—34*j* recur only on each of these conductors at a rate of one hundred kilocycles. Thus the channel pulses 82*a*, 82*b*, 82*c*, etc., appearing along the reference line 82 and impressed on the conductor 34*a* are spaced apart timewise by like intervals each of which exactly equals the sum of ten units pulse time periods. During this spacing interval, nine additional channel pulses are successively produced along the reference lines 83, 84—91 to appear on the conductors 34*b*, 34*c*—34*j***.

With the above general description of the pulse chart illustrated in Figs. 22 to 25, inclusive, in mind, it will readily be understood that each pulse frame is divided into one hundred readily identifiable pulse time positions. Thus, the first ten pulse time positions of each pulse frame, which are respectively assigned to the lines of the system having the directory number designations "11," "12," "13,"—"10," are defined by the first tens pulse period **72*a* of the frame within which the ten units pulse periods 62*a*, 63*a*, 64*a*—71*a* occur. Similarly, the second ten pulse positions, which are respectively assigned to the lines of the system having the directory number designations "21," "22," "23"—"20," are defined by the second tens pulse period 73*a* during which the ten units pulse periods 62*b*, 63*b*, 64*b*—71*b* occur. Again, the third ten pulse time positions, which are respectively assigned to the lines of the system having the directory number designations "31," "32," "33,"—"30," are marked out by the third tens pulse time period 74*a* during which the ten units pulse periods 62*c*, 63*c*, 64*c*—71*c* occur. Thus, it will be understood that the pulse time position of each pulse frame which is assigned to the illustrated line 23 occurs during the second tens pulse interval 73*a* of each pulse frame and is coincident with the units pulse period 64*b* of each pulse frame. It will also be apparent that the corresponding channel pulse 84*b* occurs well within the limits of this pulse time position. Similarly, the pulse time position assigned to the illustrated line 32 occurs during the third tens pulse time interval 74*a* of each pulse frame and is coincident with the second units pulse period 63*c* of each pulse frame. Here again, each channel pulse 83*c* corresponding to the line 32 occurs well within the limits of the particular pulse time position assigned to the line 32** in each pulse frame.

In order further to render the mode of operation of the fully selective or semi-selective harmonic ringing system of the present invention more readily understandable, a harmonic code sequence chart has been illustrated in Fig.

11 to show the time and phase relationship of the signals developed by the harmonic ringing code forming circuit 99 and the harmonic ringing modulator circuit 100 in the common equipment 17 during one harmonic ringing cycle. As there shown, the code forming circuit 99 develops a series of long ringing pulses 165, 166, 167, 168 and 169 on five different output code buses thereof which recur in succession during successive harmonic ringing cycles of approximately seven and one-half seconds duration. The long ringing pulses 165 to 169, inclusive, define a succession of five ringing periods which are separated by guard intervals 186 of relatively short duration. The code forming circuit 99 also operates to produce on five other code buses thereof a pair of short ringing pulses during each ringing period. Thus, the circuit 99 develops the short ringing pulses 170 and 171 during the first ringing period, the pulses 172 and 173 during the second ringing period, the pulses 174 and 175 during the third ringing period, etc. In addition, the code forming circuit 99 develops the positive code start pulses 180 (Fig. 11 (11)) which occur substantially at the end of each of the guard intervals 186. The code start pulses 180 are transmitted over the common conductor 5 to each of the connectors 12b, 13b and 14b to delay the selection of a particular party line ringing signal until the end of a particular ringing period.

The long ringing pulses 165 are employed in the harmonic ringing modulator circuit 100 successively to gate different ringing frequencies to the common output conductor 108 and the composite or multiplexed ringing frequency signal is filtered in the harmonic ringing amplifier and supply circuit 101 so as to provide a ringing voltage waveform substantially as shown in Fig. 11 (12). Thus, during the first ringing period the ringing pulse 165 is used to gate a 66⅔ C. P. S. ringing voltage to the common conductor 108. After the guard interval 186, the ringing pulse 166 is employed to gate a 50 C. P. S. ringing voltage to the conductor 108 during the second ringing period. Likewise, the successive ringing pulses 167, 168 and 169 are employed successively to gate to the common output conductor 108 ringing voltages having frequencies of 33⅓ C. P. S., 25 C. P. S. and 16⅔ C. P. S.

In order to produce ringing control signals which may be used to control the application of ringing current to the called line during the particular ringing period and in accordance with the particular ringing code assigned to the called substation connected thereto, and also to produce concurrently therewith corresponding ringback tone signals which may be used to advise the calling line subscriber that the called line is being rung in a particular code sequence, the long and short ringing pulses (Figs. 11 (1)—(10), inclusive) developed by the harmonic ringing code forming circuit 99 are used individually to gate to the output conductors 48a—48j, inclusive, a ringback tone signal for the duration of the ringing pulse. Thus, the ringing pulse 165 developed in the code forming circuit 99 is used to develop a ringback tone signal 165a which persists for the duration of the first ringing period. Likewise, the short ringing pulses 170 and 171 are employed to produce the ringback tone signals 170a and 171a which have a duration of one-half second and are separated by a one-half second interval, the signals 170a and 171a also occurring during the first ringing period. In the same manner the pulses 166, 172 and 173 are employed to develop the corresponding ringback tone signals shown in Figs. 11 (15) and (16) during the second ringing period. In a similar manner the long and short ringing pulses which are produced during the third, fourth and fifth ringing periods are employed to produce the ringback tone signals shown in Figs. 11 (17)—(22), inclusive.

With the above general description of the harmonic code sequence chart illustrated in Fig. 11 in mind, it will readily be understood that each harmonic ringing cycle is divided into five successive ringing periods and during each ringing period there is produced a first party line ringing signal consisting of one long ringing pulse, and a second party line ringing signal consisting of two short pulses, each party line ringing signal being repeated at approximately seven and one-half second intervals. In the event that a maximum of five substations are associated with any one line of the system, only the long ringing pulses 165 to 169, inclusive, need be employed, and under these conditions the first substation would be provided with ringing facilities which are responsive to a 66⅔ C. P. S. ringing current, the second substation would be provided with ringing facilities which are responsive to 50 C. P. S. ringing current, etc. The five substations would be assigned different third digit director number designations and one of the ringback tones 165a to 169a, inclusive, would be selected in the connector in response to the dialing of a third digit at the calling substation.

In the event that more than five substations up to a maximum of ten are associated with one of the lines of the system, the group of substations is divided into pairs and each pair of substations is provided with ringing facilities responsive to the same ringing frequency. Thus, for example, the substations A′ and B′ associated with the line 94 and assigned the directory number designations "941" and "942" would both be provided with ringing facilities responsive to the same ringing current, for example, a 66⅔ C. P. S. ringing current. If the calling subscriber wishes to call substation A′, he dials the number "941," and the connector responds to the third digit of "1" by selecting the ringback tone signal 165a so that a 66⅔ C. P. S. ringing current is transmitted over the called line 32 during the entire first ringing period. Only the ringers at the substations A′ and B′ will then be rung for a period of approximately one and one-half seconds, and the subscriber at the substation A′ will know that the call is intended for him. On the other hand, if the calling subscriber wishes to call the substation B′ associated with the line 94, he dials the number "942," and the connector responds to the third digit of "2" by selecting the ringback tone signal consisting of the short pulses 170a and 171a which control the application of 66⅔ C. P. S. ringing current to the line 32 so that the ringing facilities at both the substations A′ and B′ are rung in two short rings. The subscriber at the substation B′ is then notified that his substation is being rung.

In order to render the mode of operation of the trunk hunting facilities in the links of the service A group more readily understandable, a trunk marking pulse chart has been illustrated in Fig. 12 to show the time and phase relationship of the trunk marking pulses developed by the trunk marking pulse generator 56 in the common equipment 17. Referring to this figure, the one hundred time positions which comprise one pulse frame are illustrated as a series of ten horizontal strings of blocks corresponding to the ten tens digit levels of the lines of the system. In each of the blocks there is shown the directory number designation of the line which is assigned the corresponding units time position. Thus, the first units time position 62a in each time position frame is assigned to the line having the directory number designation "11;" the second units time position 63a in each time position frame is assigned to the line having the directory number designation "12," the third units time position 64a in each time position frame is assigned to the line having the directory number designation "13," and the tenth units time position 71a is assigned to the line having the directory number designation "10." In the second tens digit level the eleventh units time position 62b in each time position frame is assigned to the line having the directory number designation "21," and the twentieth units time position 71b in each time position frame is assigned to the line having the directory number designation "20."

In order to mark certain lines of the system as private branch exchange trunks, the trunk marking pulse generator 56 selects certain ones of the units pulses supplied thereto over the multiple conductor cable 31 and gates the selected units pulses by means of appropriate tens pulses supplied thereto over the multiple conductor cable 32 to provide trunk marking pulses which occur once in each time position frame in particular units pulse time positions, the last line in each trunk group being unmarked.

In the trunk marking pulse chart of Fig. 12 there are shown nine different private branch exchange trunk groups. One of these trunk groups is comprised of the lines having the directory number designations "32" to "42," inclusive, and the trunk marking pulse generator 56 operates to develop trunk marking pulses during each of the time positions assigned to these lines except the last line 42. It will be evident from Fig. 12 that this trunk group includes lines which are positioned in different tens digit levels. Thus, the lines 32 to 39, inclusive, and 30 are located in the third tens digit level, whereas the lines 41 and 42 are located in the fourth tens digit level. Since the line 42 is the last line in this trunk group no trunk marking pulse is produced in the time position **63*d* assigned thereto. A second trunk group is shown as comprising a group of thirty-two lines starting with the line 45 and ending with the line 76. Accordingly, trunk marking pulses are produced in all of the consecutive time positions assigned to these lines except the last line 76. It will be noted that this trunk marking group of thirty-five lines includes lines having four different tens digit directory number designations. A third trunk group is illustrated as comprising the lines 91, 92 and 93, the lines 91 and 92 being marked by trunk marking pulses. In a similar manner the lines 94, 95 and 96 comprise a fourth trunk group, and the lines 97, 98 and 96 comprise a fifth trunk group. The lines 90, 01 and 02 comprise a sixth trunk group, only the lines 90 and 01 being marked by corresponding trunk marking pulses produced in their respective time positions. A two-line trunk group is shown as comprising the lines 03 and 04 constituting the seventh trunk group. The eighth trunk group includes a plurality of lines in the tenth tens digit level and also a plurality of lines in the first tens digit level. Thus, the eighth trunk group comprises the lines 05 to 09, inclusive, 00 and 11 to 15, inclusive. It will be noted that the eighth trunk group includes lines in the last tens digit level as well as the first tens digit level so that the trunk hunting facilities of the system are capable of hunting not only through different tens digit levels but from the last time position to the first time position, i. e., from the time position 71*j* to the time position 62*a*. A ninth trunk group is illustrated as comprising the three lines 26, 27 and 28, the lines 26 and 27 being marked by corresponding trunk marking pulses. It will also be understood that the marking of different lines of the system as trunks has effect only when calls are directed to these lines, i. e., the lines are called lines, and is separate and distinct from the above-described restricted service marking system whereby the lines are restricted as to the type of service available thereto when calls are initiated on these lines. Thus, the line 32 is shown as a member of a trunk group when this line is the called line involved in the connection, whereas this same line is marked as a member of the service B group, and when the line 32** is used as a calling line, the call is routed by way of the service B links which have no trunk hunting facilities.

OPERATION OF THE SYSTEM AS A WHOLE

Considering now the operation of the sytem of the present invention, a call will first be traced from the private line 92 to the party line 94. Since the calling line 92 is, in the illustrated embodiment, entitled to the type of service provided by the service A links, the call is completed through one of these links, and it is assumed that the finder-connector link 12 is idle at the time the call is initiated on the line 92. A second call will then be traced from the line 32 to the line 94. Since the line 32 is shown in the service B group, the call originating on this line will be completed through one of the finder-connector links **12*a*', 13*a*' and 14*a*', it being assumed that the link 12*a*' is idle. A third call will then be traced from the line 23 to the line 94. Since the line 23 is a member of the service C group, the third call will be routed by way of the finder-connector links in the service C group, and it is assumed that the link 12*a*''** is idle at this time. In considering the placement of the above-described calls, the operation of the connectors in the various service groups will be described only in sufficient detail to permit an understanding of the restricted service facilities of the present invention, reference being had to my copending application, Serial No. 301,215, identified above for a complete and detailed description of the operation of these connectors in setting up an unrestricted call wherein trunk hunting and conversation timing facilities are provided.

When the receiver or hand set at the substation A is lifted from its supporting hook or cradle to initiate a call on the line 92, a loop circuit including the conductors of this line is closed to the line circuit 10 with the result that this line circuit immediately operates to change the magnitude of the bias potential which it delivers over the conductor **53*b* to the gating circuit of the multiplexer 11 which individually corresponds to the line 92. As a result, the gate circuit in the multiplexer 11 is opened and signal pulses 83*i*, occurring during the pulse time position 63*i* assigned to the line 92, are permitted to pass over the common conductor 50 to the pulse input circuits 200 of the finders in each service group and to the in gate circuits 207 and 223 of each of the connectors in each service group in parallel. At this point the pulses transmitted from the multiplexer 11 over the common conductor 50 may be regarded as multiplexer pulses 83*i***.

As described generally above, the restricted service marking generator 190 is arranged to impress negative restricted service marking pulses on the output conductor **190*a* thereof, and these restricted service marking pulses are impressed upon the pulse input circuits 200 of each of the finders 12*a*, 13*a* and 14*a* in the service A group. However, the marking pulses developed on the conductor 190*a* by the generator 190 appear only in the pulse time positions assigned to the lines numbered 10 to 55, inclusive. In the pulse input circuits 200 of the finders 12*a*, 13*a* and 14*a*, the restricted service marking pulses are employed to prevent multiplexer pulses, occurring in the same time positions as the marking pulses, from entering the pulse input circuit and causing the finder to become operatively associated with the calling line corresponding thereto. Since the marking pulses appearing upon the conductor 190*a* do not occur in the time position 63*i* assigned to the line 92, the multiplexer pulses 83*i* appearing on the conductor 50 are permitted to enter the pulse input circuits of each of the finders 12*a*, 13*a* and 14*a* in the service A group. However, the finders in the service A group are allotted to calling lines within this group in a predetemined sequence by means of the self-allotting circuits 206 in each of these finders so that initially only the finder 12*a* is conditioned to handle a call placed on a calling line within the service A group of lines in the system. When the link 12 is taken into use by the first calling line in the service A group, the self-allotting circuit 206 in the finder 12*a* thereof diverts a supervisory carrier signal over the conductor 36*b* to the next finder 13*a* in the service A group so that the finder 13*a*** is permitted to become operatively associated with the next succeeding calling line in the service A group.

While the multiplexer pulses **83*i* are impressed upon the pulse input circuits of the finders in the service B and service C groups, it will be understood that the pulse input circuits of these finders are prevented from transmitting the multiplexer pulses 83i therethrough because of the restricted service marking pulses inpressed coincidentally upon the pulse input circuits of these finders. Thus, in the service B group the generator 191 impresses marking pulses on the conductor 191a in the time positions assigned to the lines numbered 1 to 25, inclusive, and 56 to 100, inclusive, so that the finders in the service B group are prevented from responding to the multiplexer pulses 83i corresponding to the line 92. In the same manner the generator 192 develops pulses on the conductor 192a in the time positions assigned to the lines numbered 1 to 9, inclusive, and 26 to 100, inclusive, so that the finders in the service C group are prevented from responding to the multiplexer pulses 83i. As a result, only the finder 12a responds to the multiplexer pulses 83i when a call is initiated on the line 92**.

In the finder 12a the multiplexer pulses 83i are repeated by the pulse input circuit 200 so as to effect substantially immediate operation of the +B switching circuit 201 embodied in this finder whereby operating anode potential is delivered to the connector 12b over the +B switch conductor 12c with the result that the connector 12b is also conditioned to respond to the multiplexer pulses 83i transmitted to the connector 12b over the conductor 50. At the same time, the tens and units coincidence tube circuits 203 and 204 in the finder 12a are conditioned to register the tens and units pulse time positions of the calling line 92 and these circuits cooperate with the finder pulse forming circuit 205 and the combining circuit 202 of the finder 12a to produce finder gate pulses which are transmitted over the conductor 12d to the circuits 207, 208 and 226 of the connector 12b and have the effect of initially limiting the response of the connector only to multiplexer pulses 83i appearing in the pulse time position 63i. The combining circuit 202 of the finder 12a also gates busy pulses in the time position 63i to the busy pulse out conductor 52a so that this line is busied to all of the finders and connectors of the system to prevent these finders from responding to multiplexer pulses occurring in this time position, thereby guarding the line 92 against intrusion on an incoming call. After the finder 12a has operated to perform the described functions, continued holding of the finder 12a is dependent upon continued acceptance and transmission of multiplexer 83i by the pulse input circuit 200 which, of course, means that the finder will remain associated with the calling line 92 only so long as the calling condition persists on this line.

When operating anode potential is supplied to the connector 12b, the dial tone gate tube in the network 225 of this connector functions to transmit a dial tone signal to the calling line out gate circuit 226 over the conductor 244. This circuit, in responding to the dial tone signal and also to the finder gate pulses delivered thereto over the conductor 12d and the commutator drive pulses 96a delivered thereto over the conductor 35, functions to repeat the channel conductor 51 to the distributor 15 connector signal pulses modulated in accordance with the dial tone signal in the time position 63i assigned to the calling line. As a result, the dial tone signal is transmitted by way of the distributor 15 and the line circuit 10 to the calling subscriber so that he is informed that the dialing operation may be initiated.

The connector 12b responds to the first two digits of dial impulses which are dialed into this connector by selecting the time position assigned to the called line 94 and also responds to the third digit dialed into this connector by selecting the party line ringing signal assigned to the called substation B' having the directory number designation "942" assigned thereto. During the open circuit period of each dial impulse, the control bias supplied by the line circuit 10 to the gate circuit of the multiplexer 11 assigned to the calling line 92 is returned to its on-hook value so as to interrupt the transmission of multiplexer pulses 83i over the conductor 50 to the pulse input circuit 200 of the finder 12a and to the in gate circuits 223 and 207 of the connector 12b.

The intelligence and control signals thus modulated on the multiplexer pulses 83i are transmitted through the circuits 207 and 208 to the dial impulse integrator circuit 209, this latter circuit responding only to control signals so that control pulses are developed thereto during each dial impulse which are impressed upon the tens units and party inverter circuits 260, 261 and 262 over the conductor 227. In the illustrated call the circuit 209 develops nine control pulses corresponding to the first digit of "9," and these pulses are transmitted through the tens inverter circuit 260 and cause the tens register pulser 210 to develop corresponding register drive pulses of uniform amplitude and duration which are supplied to the tens digit register 211 and the tens sequence timing circuit 212 over the conductor 230. As a result, the register 211 is driven to a setting wherein tens pulses appearing on the positive tens pulse conductor 32i are transmitted through the ninth tens gate of this register and over the conductor 232 to the connector pulse forming circuit 217. At the end of the first digit the pulser 210 is blocked by the tens sequence timing circuit 212 so that it does not develop register drive pulses during the second and third digits, and the units inverter circuit 261 is conditioned to transmit therethrough the pulses developed by the circuit 209 during dialing of the second digit. As soon as the register 211 is driven off normal, a control potential is developed on the conductor 233 which biases the dial tone gate tube of the network 225 beyond cutoff so that dial tone transmission over the conductor 244 to the calling line out gate circuit 226 is terminated.

During the interdigit pause which separates dialing of the first and second digits, the circuit 212 develops a control potential on the conductor 234 which is employed to block the pulser 210 and to enable the units inverter circuit 261. During dialing of the second digit "4" by the calling substation A, the circuit 209 responds by developing four impulses which are transmitted through the units inverter circuit 261 to the pulser 214 and the circuit 214 develops corresponding register drive pulses which are supplied to the units digit register 215 and the units sequence timing circuit 216 over the conductor 236. As a result, the register 215 is driven to open the fourth units gate circuit therein thereby to establish a path for the transmission of units pulses appearing in the time positions 65a, 65b, 65c, etc., to the connector pulse forming circuit 217 over the conductor 245.

During the interdigit pause which separates dialing of the second and third digits at the calling substation, the circuit 216 develops a potential on the conductor 235 which biases the pulser 214 against conduction and enables the party inverter circuit 262. The potential developed on the conductor 235 is also supplied to the tens register advancer 280, the trunk hunting control circuit 283, the busy test circuit 218 and the busy lock circuit 219 to render these circuits operative to perform their respective functions as described below.

The circuit 217 combines the tens and units pulses transmitted thereto over the conductors 232 and 245 so as to produce a connector pulse in the called line time position, i. e., the time position 65i, these pulses being transmitted over the conductor 239 to the connector units 222, 223, 224 and 283 and over the conductor 239b to the circuit 220. The circuit 217 also selects one of the commutator drive pulses 96a which occurs in the called line time position 65i, these busy test pulses being transmitted over the conductor 239a to the busy test circuit 218.

The circuits 218 and 219 cooperate to perform the busy test operation in the connector 12*b* so that, if busy pulses are present on the common busy pulse in-conductor 52*b* in the time position 65*i* assigned to the called line 94, the busy lock circuit 219 transmits a bias potential over the conductor 248 to the circuit 218 which blocks the busy test circuit and the circuit 219 also transmits a control potential over the conductor 250 to the busy tone gate in the network 225 so that a busy tone signal derived from the conductor 46 is transmitted by way of the conductor 244, the calling line out gate circuit 226, the conductor 51, the distributor 15 and the line circuit 10 to the calling subscriber so that he is advised of the busy condition of the called line. If the called line 94 is idle, the busy test circuit 219 develops a positive cut-through potential on the conductor 251*a* which is transmitted to the circuit 219 to prevent the latter circuit from operating at the end of the busy test interval and is also applied to the units register advancer 281 over the conductor 289 to prevent this circuit from initiating a trunk hunting or consecutive number hunting operation as will be described in more detail hereinafter. The circuit 218 also develops a potential on the conductor 251 which is applied to the circuit 224 to condition this circuit to repeat connector signal pulses in the time position 65*i* to the distributor 15, and it is also applied to the busy gate circuit 220 so that busy pulses are released to the common busy pulse out-conductor 52*a*. The potential on the conductor 251 is also applied to the circuits 222 and 223 to condition the same to accept signals derived from the calling line.

As described heretofore, the connectors in the service A group are arranged to provide consecutive number hunting facilities for certain calling lines of the system which are designated as service A lines. Since the called line 94 is a member of one of the illustrated trunk groups, if this line tests busy, the connector 12*b* is provided with trunk hunting facilities which function to hunt for an idle trunk within the remaining lines in the called trunk group. More particularly, the circuits 283, 280 and 281 cooperate to perform this trunk hunting operation in the connector 12*b*. If the called line 94 is busy, the corresponding busy pulses on the conductor 52*b* will coincide with the connector pulses developed on the conductor 239 and the trunk marking pulses developed on the conductor 56*a*. As a result, the control circuit 283 develops a control potential which is transmitted over the conductor 288 to the units register advancer to permit this latter circuit to respond to trunk hunting drive pulses developed by the generator 55 and transmitted to the advancer 281 over the conductor 55*a*. The advancer 281 develops corresponding register drive pulses which are transmitted over the conductor 290 to the units digit register 215 and advances the setting of this register by one time position for each trunk hunting drive pulse. The busy test operation is performed for each new time position of the connector pulses until an idle line within the called trunk group is found, at which time the control potential on the conductor 288 is removed and the units register advancer 281 is disabled. If the last line in the called trunk group is busy, i. e., the line numbered 96 (Fig. 12), the busy lock circuit 219 blocks the busy test circuit 218 at the end of the busy test interval and a busy tone signal is transmitted to the calling subscriber in the manner described above.

Assuming that the line 94 is idle when called, the calling line out gate circuit 224 is conditioned by the above-described potential impressed upon the conductor 251 so that very narrow connector signal pulses are released to the conductor 51 which are well within the limits of the pulse time position 65*i* assigned to the called line, these connector signal pulses being developed by gating certain ones of the commutator drive pulses appearing on the conductor 35.

The above-described busy test and trunk hunting operations are performed during the interdigit pause which separates the second and third digits. During dialing of the third digit "2" at the calling substation A, the circuit 209 responds by developing two impulses which are transmitted through the party inverter circuit 262 to the pulser 263, this latter circuit developing corresponding register drive pulses which are transmitted over the conductor 240 to the register 265 and the party sequence timing circuit 264. As a result, the register 265 is driven to open the second party gate circuit therein so as to establish a path for the transmission of the interrupted ringback tone signal (Fig. 11 (14)) which corresponds to the code #2 party line ringing signal assigned to the called substation B′, over the conductor 275 to the ringback tone gate tube in the network 225.

At the end of the third digit the timing circuit 264 develops a potential on the conductor 242 which blocks the patry register pulser 263 and renders the code start circuit 268 operative to develop a control potential in response to the next occurring code start pulse developed on the conductor 5. The control potential developed by the circuit 268 is transmitted by way of the conductor 241 to the ringback tone gate tube in the network 225 so that the interrupted ringback tone signal corresponding to the code #2 party line ringing signal selected by the party digit register 265 is transmitted to the calling line out gate circuit 226 over the conductor 244 so that the calling subscriber is informed that the substations A′ and B′ are being rung during the ringing intervals of the signal assigned to the called substation B′. The ringback tone signal transmitted through the ringback tone gate circuit is also rectified to reproduce the party line ringing signal originally developed in the code forming circuit 99, and the ringing pulses resulting from such rectification are transmitted over the conductor 295 to the called line out gate circuit 224 wherein they have the effect of increasing the amplitude of the connector signal pulses by approximately 50% during each ringing pulse period. These large amplitude signal pulses control the ringing facilities in the line circuit 16 so that a 66⅔ cycle per second ringing current is transmitted over the line 94 during the two short ringing intervals of the substation B′ ringing signal.

When the call is answered at the substation B′ the line circuit 16 functions to change the magnitude of the control potential supply over the conductor 45*b* to the multiplexer 11 with the result that multiplexer pulses 85*i* are transmitted over the conductor 50 to the multiplexer input terminals of each of the finders and connectors of the system. Since the gate circuit 220 in the connector 12*b* impresses busy pulses on the common busy pulse in-conductor 52*b*, only the connector 12*b* responds to the multiplexer pulses 85*i* so that these pulses are transmitted through the called line in gate circuit 223 thereof and are impressed upon the reconstructor circuit 222. The circuit 222 responds to this call answering signal by developing a potential on the conductor 252 which is transmitted to the ring trip circuit 221 and causes this latter circuit to operate. In operating the circuit 221 develops a positive potential on the conductor 253 which is effective to close the ringback tone gate circuit in the network 225 so that the transmission of the ringback tone signal to the calling substation is arrested. At the same time, the amplitude of the connector signal pulses is reduced to the normal value so that the ringing operation is arrested.

Following the described operations in the connector 12*b*, a two-way talking or communication circuit is fully established between the calling substation A and the party line called substation B′. Since the lines assigned to the service A group are not restricted as to the duration of the call, the connectors in the service A group are not provided with conversation timing facilities and the call, once established, may be continued as long as necessary.

If the called party is the first to hang up after the call is completed, the bias potential developed on the conductor 45b is restored to its normal value when the called line loop circuit is opened so that the multiplexer pulses 85i are no longer transmitted over the conductor 50 to the finders and connectors of the system. However, such termination of multiplexer pulse transmission in the time position 65i does not release the finder-connector link 12 since the gate circuit 220 continues to impress busy pulses on the conductor 52b in the time position 65i and the finder 12a continues to remain operatively associated with the calling line 92. When the calling line subscriber disconnects, the bias potential developed on the conductor 53b is restored to its normal value so that the multiplexer pulses 83i are removed from the conductor 50. When transmission of the multiplexer pulses 83i to the pulse input circuit 200 of the finder 12a is thus terminated, the +B switching circuit 201 responds after a predetermined time delay interval by removing operating anode potential from the conductor 12c so that the circuits 203 and 204 in the finder 12a and the control circuits in the connector 12b are returned to their initial or quiescent values. At the same time the calling and called lines are unguarded to free the same for use in initiating another call or accepting a call incoming thereto.

Considering now the initiation of a call on one of the lines in the service B group, it will be assumed that the call is initiated at the substation F associated with the line 32 in the service B group and is intended for the party line 94 in the service A group. In this connection it will be understood that the grouping of particular lines in different service groups is for the purpose of restricting the service available to these lines when calls are initiated thereon. In other words, the line is designated as a restricted service line only if it is used to initiate a call.

When a call is initiated on the line 32, the line circuit 7 functions to change the magnitude of the bias potential which it delivers over the conductor 7b to the gate circuit of the multiplexer 11 which individually corresponds to the line 32. As a result, multiplexer signal pulses 83c are developed on the conductor 50 and are transmitted to all of the finders and connectors of the system. In the service A group of links the restricted service generator 190 develops restricted service marking pulses on the conductor 190a thereof in the time position 63c assigned to the line 32 so that the multiplexer pulses 83c are prevented from entering the pulse input circuits 200 of any of the finders in the service A group. In a similar manner, the restricted service marking generator 192 develops restricted service marking pulses on the conductor 192a in the time position 63c so that the finders in the service C group are prevented from becoming operatively associated with the line 32. However, in the service B group the generator 191 does not develop marking pulses on the conductor 191a in the time position 63c assigned to the line 32 so that the multiplexer pulses 83c are permitted to enter the particular finder in the service B group which is allotted to receive calls initiated in the service B group of lines. Assuming that the finder 12a' is allotted by means of the self-allotting circuit 206 thereof to receive the illustrated call, the multiplexer pulses 83c enter the pulse input circuit 200 of the finder 12a' with the result that this finder becomes operatively associated with the line 32 and impresses a +B switch potential on the conductor 12c' which is transmitted to the connector 12b' to condition the same for operation. At the same time, the finder 12a' functions to develop finder gate pulses in the time position 63c assigned to the line 32, these finder gate pulses being transmitted over the conductor 12d' to the associated connector 12b'. Following the described operations in the finder 12a', the link 12' is conditioned to set up the desired call between the line 32 and the line 94.

In responding to the dial impulses constituting the digits "9," "4" and "2" of the called substation B' associated with the line 94, the connector 12B' functions in a manner substantially identical to that described above in connection with the connector 12b to set up the call between these substations. However, as described generally heretofore, lines in the service B group are not arranged to have the benefit of trunk hunting facilities so that the connectors in the service B group are not provided with trunk hunting facilities. More particularly, in these connectors the units register advancer 281, the tens register advancer 280 and the trunk hunting control circuit 283 are either disconnected in a manner to be described in more detail hereinafter, or omitted altogether, so that no trunk hunting operation is performed. Therefore, if the line 94 is busy, a busy tone signal is returned immediately after the first busy test operation is performed. In this connection it will be understood that the restriction of a calling line to only one line within a called group of lines is a somewhat different type of restriction than that normally referred to as restricted service, and the above described trunk hunting restricted service is shown merely for purposes of illustration of the overall restricted service system of the present invention whereby several different types or grades of service may be provided. It will also be understood that a more conventional restriction, namely, that of preventing certain calling lines from access to an entire group of lines or trunks, may equally well be employed insofar as the restricted service facilities of the present invention are concerned. It will further be understood that the connector 12b', as well as the other connectors in the service B group, is not provided with conversation timing facilities since the lines in the service B group are not restricted as to the duration of the call. Accordingly, the call is terminated in the manner described above in connection with the description of the service A connector 12b.

Considering now the initiation of a call on one of the lines in the service C group, it will be assumed that a call is initiated at the substation E associated with the line 23 in the service C group and that the call is intended for the party line 94 in the service A group. When the loop circuit, including the conductors of the line 23, is closed by lifting the receiver at the substation E off its supporting hook or cradle, the line circuit 6 functions to change the magnitude of the bias potential which it delivers over the conductor 6b to the gate circuit in the multiplexer 11 which individually corresponds to the line 23. As a result, multiplexer signal pulses 84b are developed on the conductor 50 and are transmitted to all of the finders and connectors of the system.

In the service A group of links the restricted service marking generator 190 develops restricted service marking pulses on the conductor 190a thereof in the time position 64b assigned to the line 23 which are impressed upon the pulse input circuits 200 of each of the finders in the service A group so as to prevent the multiplexer pulses 84b from entering these finders and causing the finders to become operatively associated with the line 23. In the same manner, the generator 191, which serves the service B links, develops restricted service marking pulses on the conductor 191a which occur in time position 64b assigned to the line 23 and are impressed upon the pulse input circuits 200 of each of the finders in the service B group. As a result, these finders are likewise prevented from seizing the calling line 23.

In the service C group the restricted service marking generator 192 does not develop marking pulses on the conductor 192a in the time position 64b so that the finder which is allotted to the first call in the service C group is permitted to transmit the multiplexer pulses 84b through the pulse input circuit 200 thereof so as to cause the finder to become operatively associated with the calling line 23. When this occurs a +B switch potential is developed on a conductor 12c'' and is transmitted to the associated connector 12b'' to condition the same for operation, and at the same time finder gate pulses occurring in the time position 64b assigned to the line 23 are developed in the finder 12a and are transmitted over the conductor 12d'' to the connector 12b'' to condition this connector to respond only to the multiplexer pulses 34b appearing on the conductor 50. Following the described operations in the finder 12a'' the link 12'' is conditioned to set up the desired call between the line 23 and the called line 94.

In responding to the dial impulses transmitted over the calling line 23 which constitute the digits of the directory number assigned to the called substation B' associated with the line 94, the connector 12b'' functions in a manner substantially identical described above in connection with the connector 12b to set up the call between the substations. However, as described generally heretofore, the lines in the service C group are not arranged to have the benefit of trunk hunting facilities so that the connectors in the service C group are not provided with trunk hunting facilities but instead are modified in the manner described above in connection with the connectors of the service B group.

In addition, the connectors of the service C group are arranged to provide conversation timing facilities so that the duration of a call initiated on any one of the lines in the service C group is limited to a period of approximately seven and one-half minutes after which time the connection is either broken completely or a busy tone signal is returned to the calling and called subscribers to discourage further continuance of the call. More particularly, in the connector 12b'', as well as the other connector in the service C group, the positive potential produced on the ring trip conductor 253 (Fig. 2C) is employed to condition the conversation timing control circuit 285 for operation at the end of a predetermined conversation timing period. This potential on the conductor 253 is also employed as anode potential for the conversation timing warning tone circuit 284 and is supplied over the conductor 253 to the party digit register 265 to reset this register to zero. The potential on the conductor 253 is also applied to the party register advancer 282 over the conductor 253 to condition this latter circuit to respond to conversation timing pulses which are developed in the conversation timing pulse generator 56 and are supplied over the common conductor 57a to the party register advancers 282 in each of the connectors 12b'', 13b'' and 14b'' in the service C group. The conversation timing pulses are produced at periodic intervals and the party register advancer 282 responds to each conversation timing pulse by producing a register drive pulse which is supplied to the party digit register 265 over the conductor 291 to advance this register one step for each conversation timing pulse, it being understood that the register 265 is no longer required for ringback tone transmission after the called party answers and ringing is terminated. The conversation timing pulses may occur, for example, at forty second intervals so that the party digit register 265 is advanced one stage for each forty second interval of the call.

When the ninth counting tube of the party digit register 265 is extinguished by the tenth register drive pulse produced by the party register advancer 282a, a positive potential is developed on the conductor 292 which is transmitted to the conversation timing warning tone circuit 284, and this latter circuit responds to the potential on the conductor 292 by transmitting therethrough a short pulse of the warning tone signal impressed upon the circuit 284 from the warning tone generator 58 over the conductor 58a which is common to the links of the service C group. This short pulse of warning tone is transmitted over the conductor 244 to the calling line out gate circuit 226 and is also transmitted over the conductor 294 to the called line out gate circuit 224 so that both the calling and called subscribers are informed that the call is about to be terminated.

When the tenth counting tube of the register 265 is extinguished by the eleventh register drive pulse produced by the party register advancer 282, a positive control potential is developed on the conductor 293 which is transmitted to the conversation timing control circuit 285 in the connector 12b''. The circuit 285 responds to the positive potential produced on the conductor 293 by developing a positive pulse on the conductor 12e. In one embodiment of the conversation timing facilities the positive pulse developed on the conductor 12e is transmitted back to the finder 12a and is applied to the cathode of the +B switch tube in the +B switching circuit 201 of the finder 12a''. As a result the +B switch tube in the circuit 201 is extinguished so that operating potential is removed from the conductor 12c'' and the finder-connector link 12'' is no longer operatively associated with the calling and called lines. Under these conditions both the calling and called lines call in new linkage and dial tone is returned to both the calling and called subscriber to inform them that the connection has been broken and that they should hang up.

In the alternative conversation timing arrangement, the positive pulse developed on the conductor 12e is impressed upon the busy test tube in the busy test circuit 218 of the connector 12b'' so that this tube is extinguished and cut-through potential is removed from the conductors 251 and 251a with the result that the connector is made busy at the end of the conversation timing period and returns a busy tone signal to the calling subscriber. Since the called line is no longer busied by the busy gate circuit 220 in the connector 12b'', the called line immediately thereafter calls in new linkage and receives dial tone to inform the called subscriber that the call has been automatically terminated by the conversation timing facilities. In this connection it will be understood that the conversation timing warning tone circuit 284 and the conversation timing control circuit 285 are provided with the facilities for preventing these circuits from responding falsely to potentials developed by the party digit register 265 during the selection of the party line ringing signal by the register 265 during the dialing operation, as described in detail in my copending application, Serial No. 301,215 identified above. It will also be understood that the above described restriction as to the duration of the call which is impressed upon the lines in the service C group is shown merely for purposes of illustration, and other types of restricted service may equally well be employed insofar as the overall restricted service facilities of the present invention are concerned.

DETAILED DESCRIPTION OF THE SYSTEM

Figure 1:
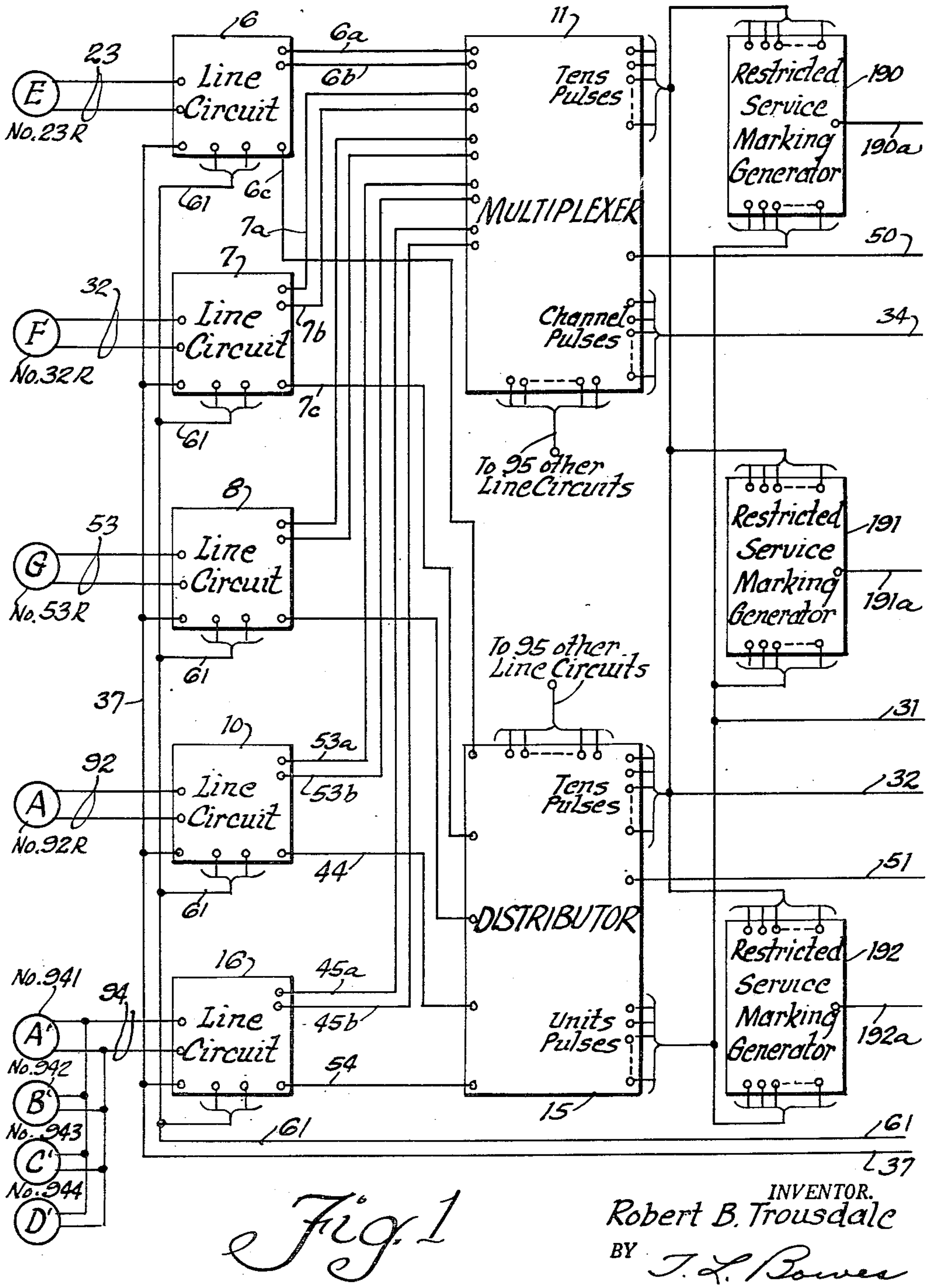

In considering the detailed circuitry of the system components briefly described above, operation of these components will be analyzed insofar as possible in terms of the functions which they perform in establishing the above - described connections. Before considering the details of the system components, however, it is pointed out generally that corresponding reference characters have been used throughout the drawings to identify corresponding circuit elements of the system. It is also pointed out that all pulse carrying conductors, such, for example, as the signal pulse transmission conductors 50 and 51 are in the form of coaxial cables or transmission lines having low pulse attenuating properties at the pulse frequencies employed. In certain instances, the coaxial cables provided to connect two or more components of the system have been illustrated, but it should also be remembered that all of the other illustrated pulse carrying conductors are of the proper type. On the other hand, all illustrated conductors which function as direct current potential or audio signal carrying conductors are in the form of open or shielded wire.

Throughout the following detailed description of the system, the tube types employed are specifically identified. Moreover, those tubes of the system which are of the gas filled or thyratron type are so identified in the drawings through the use of a small dot within the tube envelope circle and opposite the tube cathode to indicate the gas content of the tube. It is also pointed out that unless necessary to an understanding of the operation of a particular system component, those circuit elements which perform entirely conventional functions in the circuits, namely functions which will be readily understood by those skilled in the art, have not been identified in the drawings or referred to in the following description of the system components.

As used in this specification, the terms electronic and electronic means refer to and are intended to define means comprising electron conducting devices, such, for example, as electron tubes, gas tubes, crystal rectifiers, semi-conductors and the like, together with interconnecting circuit components therefor, and to exclude all electromechanical devices embodying moving mechanical parts such, for example, as relays, stepping switches, and the like.

In order to reduce the complexity of this specification, those system components which are substantially identical to the corresponding system components of the copending applications, Serial No. 134,974 and Serial No. 301,215 identified above, will be only briefly described in this specification, reference being had to these copending applications for a complete and detailed description of the particular system components.

*Common equipment 17*

The component units of the common equipment 17 may all be substantially identical to the corresponding system components shown and described in detail in my copending application, Serial No. 301,215, described above so that a detailed description thereof is considered unnecessary herein. However, it will be understood that the component units of the common equipment 17 are connected to the other system components in a manner somewhat different from that disclosed in the above-identified copending applications. Thus, in the present system the service A group of links does not require conversation timing facilities so that the output conductors 57*a* and 58*a* of the conversation timing pulse generator 57 and the conversation timing warning tone generator 58, respectively, do not extend to the links in the service A group. In a similar manner the links in the service B group are not provided with trunk hunting facilities or conversation timing facilities so that the output conductors 55*a*, 56*a*, 57*a* and 58*a* do not extend to the links in the service B group. Also, in the service C group, the conversation timing output conductors 57*a* and 58*a* extend to the links in this group but the trunk hunting output conductors 55*a* and 56*a* do not extend to these links.

*Restricted service marking generator 190*

Figure 26:
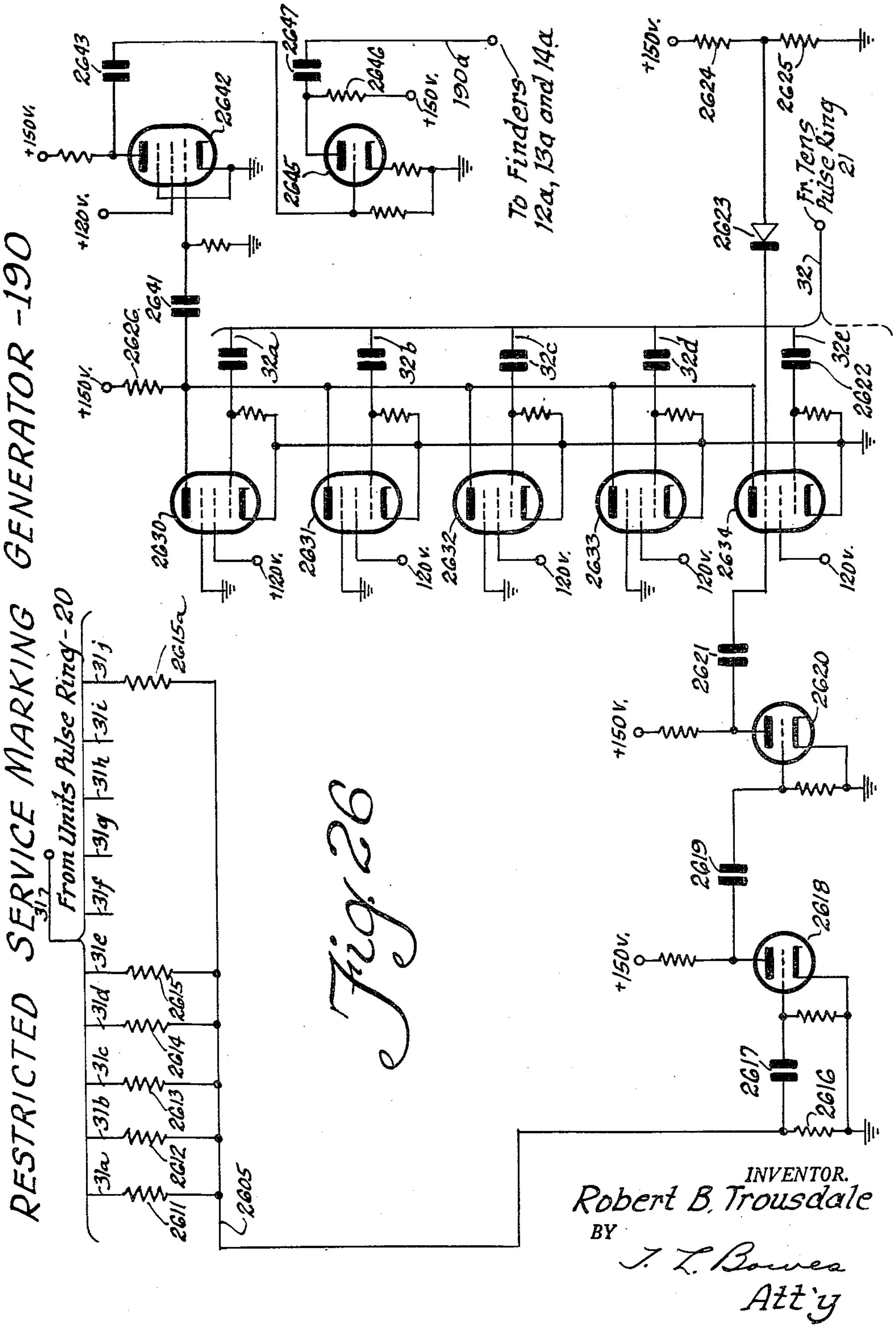

As described generally heretofore, the retsricted service marking generator 190, which is shown in detail in Fig. 26 of the drawings, is provided for the purpose of developing restricted service marking pulses on the conductor 190*a* which are transmitted to the finders 12*a*, 13*a* and 14*a* in the service A group wherein these restricted service marking pulses are used for control purposes to prevent the links in the service A group from seizing calling lines which are not entitled to receive the service provided by the service A links.

In the illustrated embodiment, the lines numbered 1 to 9, inclusive, and 56 to 100, inclusive, have been arbitrarily designated as service A lines, and calls initiated on these lines are adapted to be set up through the links in the service A group. Accordingly, the generator 190 is arranged to provide restricted service marking pulses in the time positions assigned to the lines numbered 10 to 55, inclusive, so that these lines will be prevented from becoming operatively associated with the links in the service A group.

In order to provide a complete and reliable gating operation in the finders controlled by the restricted service marking pulses, these pulses are preferably relatively wide so that they straddle the corresponding multiplexer pulses, and in the illustrated embodiment these restricted service marking pulses are derived by selection and combination of different ones of the units and tens pulses developed by the units pulse ring circuit 20 and the tens pulse ring circuit 21. Since the units and tens pulses occupy the substantial portion of each time position or group of time positions, these pulses may be conveniently used as the required restricted service marking pulses, and a positive and reliable gating operation is provided without materially increasing the complexity of the system.

In order to produce restricted service marking pulses in the time positions assigned to the lines numbered 51, 52, 53, 54 and 55, it is necessary to combine the units pulses appearing on the conductors 31*a*, 31*b*, 31*c*, 31*d* and 31*e* and then gate the combined units pulses by means of the tens pulses appearing upon the conductor 32*e* so that restricted service marking pulses appearing in the time positions 62*e*, 63*e*, 64*e*, 65*e* and 66*e* are developed. Since the other lines in the group numbered 10 to 55, inclusive, occur consecutively in groups of ten, it is not necessary to combine units pulses to produce restricted service marking pulses in these time positions but instead the tens pulses can be used directly to provide blocks of ten time positions according to the desired lines. Thus the tens pulses appearing upon the conductors 32*a*, 32*b*, 32*c* and 32*d* may be used directly as blocks of ten restricted service marking pulses in time positions 62*a*, 63*a*, 64*a*—71*a*; 62*b*, 63*b*, 64*b*—71*b*; 62*c*, 63*c*, 64*c*—71*c*; and 62*d*, 63*d*, 64*d*—71*d*.

In considering the details of the restricted service marking generator 190, it is pointed out that this generator is basically similar to the trunk marking pulse generator 56 in the common equipment 17 and reference may be had to my copending application 301,215 identified above for a complete and detailed description of a generator of this type. However, for the purposes of the present invention it may be stated that the units pulses appearing upon the conductors 31*a*, 31*b*, 31*c*, 31*d*, 31*e* and 31*j* are coupled through the isolating resistors 2611, 2612, 2613, 2614, 2615 and 2615*a*, respectively, to the common units pulse mixing bus 2605 so that a portion of each of these units pulses appears across the common output resistor 2616. The units pulses developed on the mixing bus 2605 are coupled through the condenser 2617 to the control grid of an amplifier tube 2618 wherein they are amplified and inverted and the amplified negative units pulses developed at the anode of the tube 2618 are coupled through the condenser 2619 to a second amplifier tube 2620 wherein they receive further additional amplification and inversion. Accordingly, there is produced at the anode of the tube 2620 positive units pulses which are coupled through the condenser 2621 to the suppressor grid of the fifth tens gating tube 2634. The tens pulses appearing upon the conductor 32*e* in the time position 76*a* are coupled through the condenser 2622 to the first control grid of the tube 2634 and the suppressor grid of this tube is coupled through the clamping rectifier 2623 to a voltage divider including the resistors 2624 and 2625 which are connected from the positive supply potential to ground so that the cathode of the rectifier 2623 is operated at a small positive potential with respect to ground, preferably in the order of sixteen volts. Accordingly, only the units pulses 62*e*, 63*e*, 64*e*, 65*e*, 66*e* and 71*e* are gated by the tube 2634 and appears as negative pulses across the common anode resistor 2626. It will be understood that if additional lines in the group numbered 50 to 99, inclusive, are to be prevented from gaining access to the service A links, the corresponding units pulses would be connected through appropriate isolating resistors to the mixing bus 2605.

In order to develop restricted service marking pulses in the time positions assigned to the lines numbered 10 to 49, inclusive, the tens pulses are utilized directly to provide blocks of ten marking pulses. Thus, the tens pulses 72*a* appearing upon the conductor 32*a* are coupled to the first control grid of the first tens gating tube 2630 and the suppressor grid of this tube is connected to ground so that these tens pulses are transmitted through the tube 2630 and appear as corresponding negative pulses across the common anode resistor 2626. In a similar manner the tens pulses 73*a* appearing upon the conductor 32*b* are impressed upon the second gating tube 2631 and appear as corresponding negative pulses across the common anode resistor 2626. Likewise, the tens pulses appearing upon the conductor 32*c* are impressed upon the third tens gating tube 2632 and the tens pulses appearing upon the conductor 32*d* are impressed upon the fourth gating tube 2633. In this connection it will be understood that additional tens gating tubes may be provided as required to develop the restricted service marking pulses in other tens digit levels of the system, as described in detail in connection with the trunk marking pulse generator 56 in my copending application, Serial No. 301,215 identified above. It will also be understood that if individual units pulses are to be impressed upon a particular tens gating tube, the suppressor of this tube is connected through a clamping rectifier similar to the rectifier 2623 to the voltage divider 2624, 2625, as will be well understood by those skilled in the art.

The mixed tens and units pulses developed across the common anode resistor 2626 are coupled through the condenser 2641 to the control grid of an amplifier tube 2642 wherein these pulses are amplified and inverted so that positive marking pulses are developed at the anode of the tube 2642. These positive marking pulses are coupled through the condenser 2643 to the control grid of an inverted tube 2645 so that negative marking pulses of substantial amplitude are developed across the anode resistor 2646 of the tube 2645. These negative marking pulses are coupled through the condenser 2647 to the conductor 190*a* and are transmitted over this conductor to the finders 12*a*, 13*a* and 14*a* in the service A group. In this connection it will be understood that the generator 190 may be arranged to provide positive marking pulses by merely omitting the phase inverter tube 2645 in which case the positive pulses developed at the anode of the tube 2642 are coupled through the condenser 2643 to the conductor 190*a*. It will also be understood that positive marking pulses may be employed instead of the illustrated negative pulses to control the finders in the service A group as will be described in more detail hereinafter in connection with the finder 12*a*.

*Restricted service marking generator 191*

Figure 27:
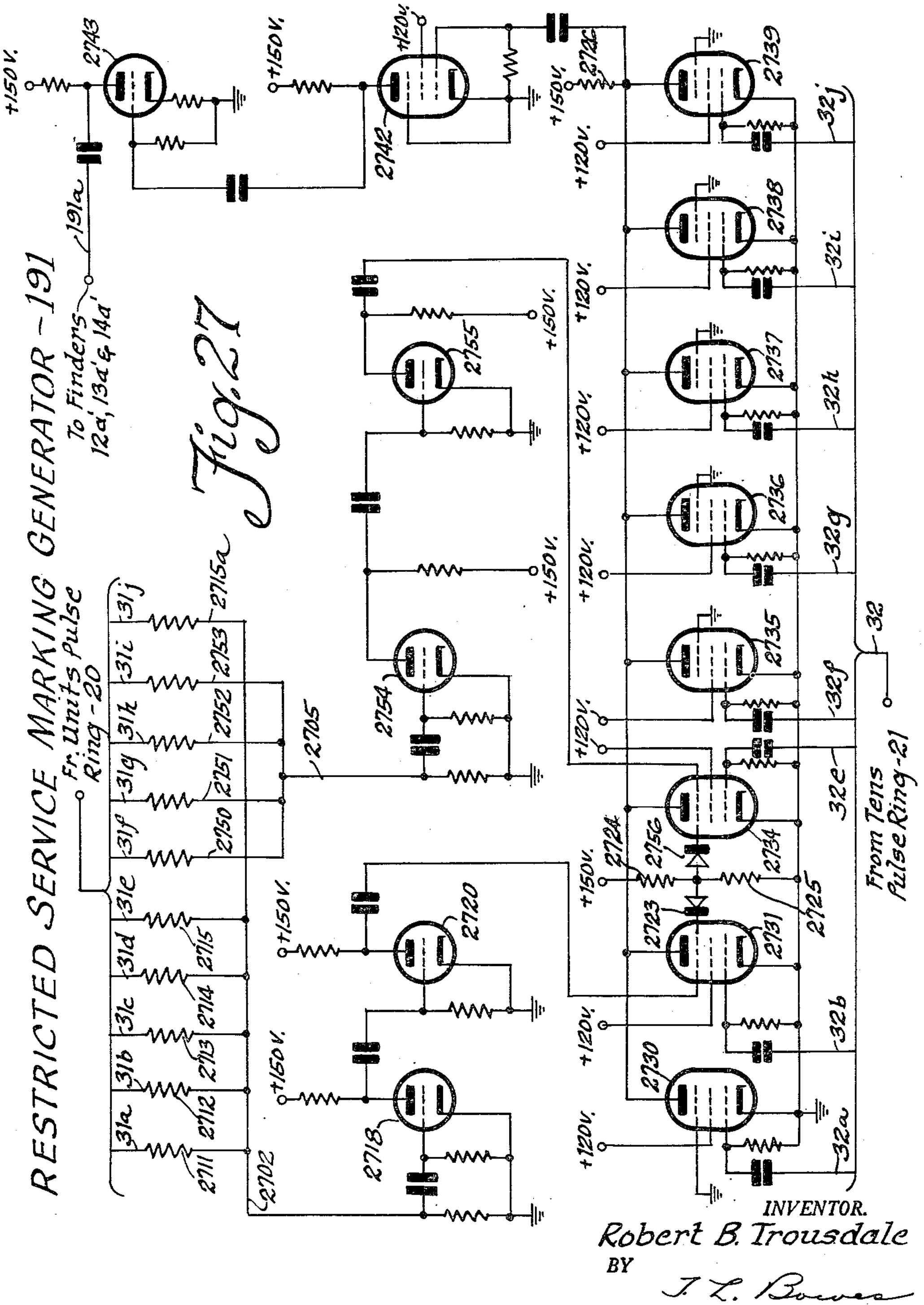

As described generally heretofore, the generator 191, which is shown in detail in Fig. 27 of the drawings, is employed for the purpose of developing restricted marking pulses on the conductor 191*a* in the time positions assigned to the lines numbered 1 to 25, inclusive, and 56 to 100, inclusive, these restricted marking pulses being impressed upon the finders 12*a'*, 13*a'* and 14*a'* in the service B group. This will be readily understood when it is realized that only the lines numbered 26 to 55, inclusive, are entitled to the service provided by the service B links so that restricted service marking pulses must be produced in all other time positions to prevent these other lines from gaining access to the service B links.

In order to provide restricted marking pulses in the time positions assigned to the lines numbered 20 to 25, inclusive, it is necessary to combine the units pulses appearing on the conductors 31*a*, 31*b*, 31*c*, 31*d*, 31*e* and 31*j* and to gate these combined pulses by the tens pulses 73*a* appearing upon the conductor 32*b*. In addition, it is necessary to combining the units pulses appearing upon the conductors 31*f*, 31*g*, 31*h* and 31*i* and to gate these combined pulses by means of the tens pulses appearing upon the conductor 32*e* so as to provide marking pulses in the time positions assigned to the lines numbered 56, 57, 58 and 59. For the remaining time positions the tens pulses may be used directly to provide blocks of ten marking pulses in a manner similar to that described above in connection with the generator 190. In the generator 191 the units pulses appearing upon the conductors 31*a*, 31*b*, 31*c*, 31*d*, 31*e* and 31*j* are coupled through the corresponding isolating resistors 2711, 2712, 2713, 2714, 2715 and 2715*a* to the second units pulse mixing bus 2702 and are amplified in the tubes 2718 and 2720 in a manner substantially identical to that described above in connection with the generator 190. However, the amplified units pulses developed at the anode of the tube 2720 are then impressed upon the suppressor grid of the second tens gating tube 2731 and are gated by the tens pulses appearing upon the conductor 32*b* so that only the units pulses 62*b*, 63*b*, 64*b*, 65*b*, 66*b* and 71*b* are developed across the common anode resistor 2726. A clamping rectifier 2723 is connected to the suppressor grid of the tube 2731 to limit the positive excursions of the suppressor grid as described above in connection with the generator 190.

In addition, the units pulses appearing upon the conductor 31*f*, 31*g*, 31*h* and 31*i* are coupled through the isolating resistors 2750, 2751, 2752 and 2753 to the fifth units pulse mixing bus 2705, these units pulses being impressed upon the control grid of the amplifier tube 2754. The negative units pulses developed at the anode tube 2754 are further amplified in the tube 2755 and are impressed upon the suppressor grid of the fifth tens gating tube 2734, the rectifier 2756 being connected from this suppressor grid to the voltage divider 2724, 2725 to provide a pulse clipping action. Accordingly, the units pulses impressed upon the suppressor grid of the tube 2734 are gated by the tens pulses appearing upon the conductor 32*e* so that only the units pulses 67*e*, 68*e*, 69*e* and 70*e* are developed across the common anode resistor 2726.

The remaining marking pulses which are developed by the generator 191 may be derived directly from the tens pulses. Thus, the suppressor grid of the first tens gating tube 2730 is connected to ground and the tens pulses 72*a* appearing upon the conductor 32*a* are transmitted through this tube to the common anode resistor 2726 so as to provide marking pulses in the time positions assigned to the lines numbered 10 to 19, inclusive. In a similar manner the sixth tens gating tube 2735, the seventh tens gating tube 2736, the eighth tens gating tube 2737, the ninth tens gating tube 2738 and the tenth gating tube 2739 are employed to gate the tens pulses impressed thereon so as to produce marking pulses in the time positions assigned to the lines numbered 60 to 100, inclusive, and 1 to 9, inclusive. The mixed tens and units pulses appearing across the resistor 2726 are amplified in the tube 2742 and inverted in the tube 2743 so that negative marking pulses in the time positions described above are developed on the conductor 191*a* and are transmitted to the pulse input circuits 200 of the finders 12*a'*, 13*a'* and 14*a'* in the service B group.

*Restricted service marking generator 192*

Figures 17, 17A:
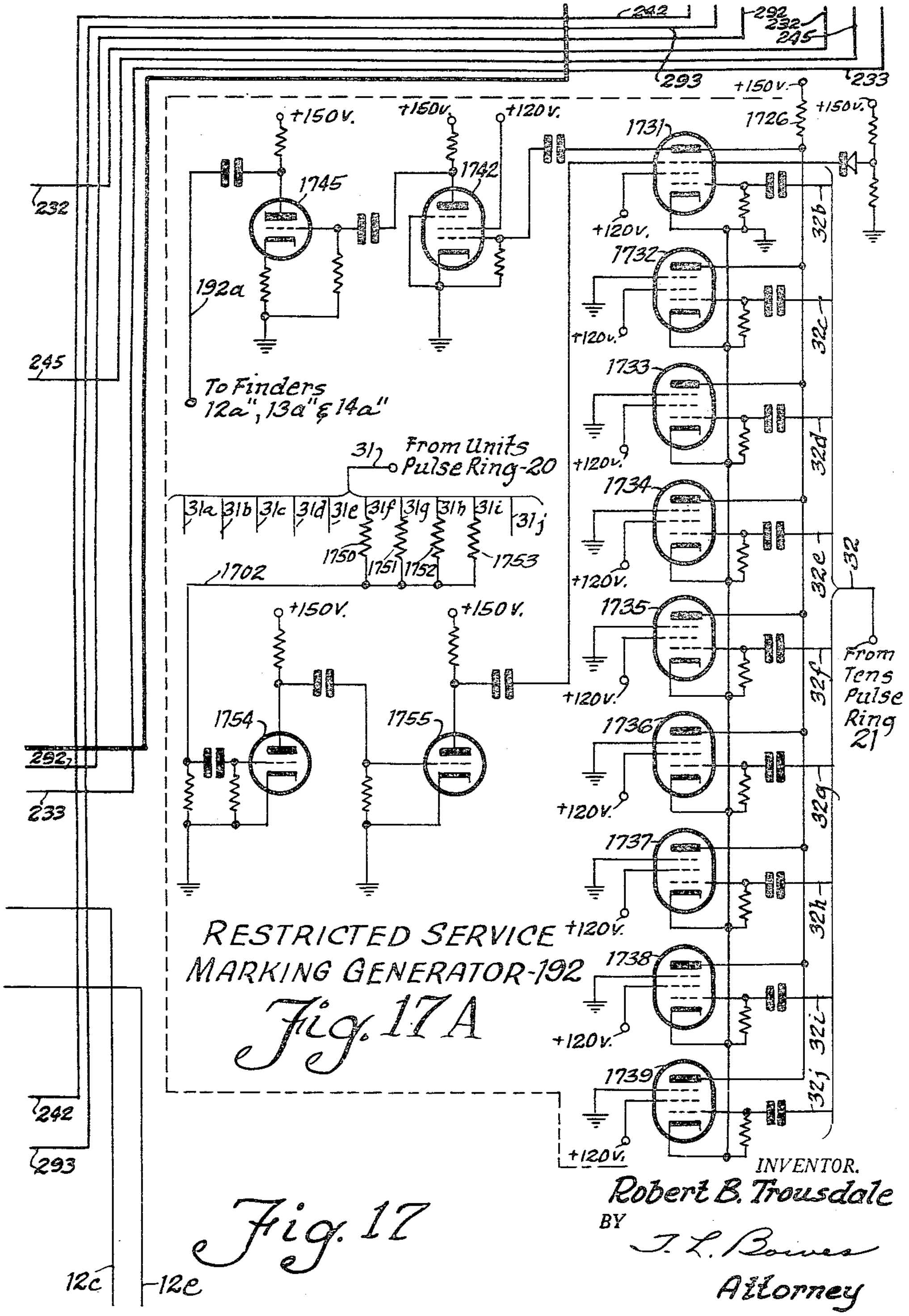

As described generally above, the generator 192, which is shown in detail in Fig. 17A of the drawings, is provided for the purpose of developing restricted service marking pulses in the time positions assigned to the lines numbered 1 to 9, inclusive, and 26 to 100, inclusive, so that only the lines numbered 10 to 25, inclusive, may have access to the service C finders 12*a''*, 13*a''* and 14*a''*.

In order to develop marking pulses in the time positions assigned to the lines numbered 26, 27, 28 and 29, the units pulses appearing upon the conductors 31*f*, 31*g*, 31*h* and 31*i* are coupled through the isolating resistors 1750, 1751, 1752 and 1753 to the second units pulse mixing bus 1702 and are amplified in the tubes 1754 and 1755 and are supplied to the suppressor grid of the second tens gating tube 1731. As a result the units pulses 67*b*, 68*b*, 69*b* and 70*b* are developed across the common anode resistor 1726. All of the other marking pulses may be produced directly from the tens pulses. Thus the third tens gating tube 1732, the fourth tens gating tube 1733, the fifth tens gating tube 1734, the sixth tens gating tube 1735, the seventh tens gating tube 1736, the eighth tens gating tube 1737, the ninth tens gating tube 1738 and the tenth tens gating tube 1739 are all employed to develop corresponding blocks of marking pulses across the common anode resistor 1726. These pulses are then amplified in the tubes 1742 and 1745 so as to develop on the conductor 192*a* marking pulses which occur in the time positions assigned to the lines numbered 1 to 9, inclusive, and 26 to 100, inclusive, these restricted service marking pulses being impressed upon the pulse input circuits 200 in the finders 12*a*'', 13*a*'' and 14*a*'' in the service C group.

*Line circuits 6, 7, 8, 10 and 16*

As previously indicated, the above-identified line circuits are respectively utilized to terminate the private lines 23, 32, 53, 92 and the party line 94 at the exchange end of the system. These line circuits, as well as the line circuits terminating the other 95 lines of the system, are identical in circuitry and mode of operation and may be substantially identical to the corresponding line circuits described in detail in my copending application, Serial No. 301,215 identified above. Accordingly, a detailed description of these line circuits is considered unnecessary in the present application.

*Multiplexer 11*

As pointed out in the general description of the system, this circuit is provided for the general purpose of sampling control and intelligence signals developed on calling and called lines of the system in the time positions of each pulse frame individually assigned to the lines from which the signals are respectively derived and for transmitting multiplexer pulses modulated with the sampled control or intelligence signals over the multiplexer output conductor 50 to the finder-connector links in each service group of the system. The multiplexer circuit is capable of sampling signals appearing on each of the one hundred lines of the system at a sampling repetition rate of 10 kilocycles.

The multiplexer 11 may be identical to the corresponding system component described in the copending application, Serial No. 134,974 identified above, or my copending application, Serial No. 205,641, filed on January 12, 1951. However, it will be understood that a given type of multiplexer is designed to operate with the intelligence and supervisory signal channels of a given type of line circuit. Thus, the type of line circuit disclosed in copending application, Serial No. 134,974, is adapted to supply the intelligence and control signals over the same conductor to the corresponding gate tube of the multiplexer 11, whereas in the copending application, Serial No. 205,641, the intelligence the control signals are supplied over separate paths to separate control grids of the corresponding gate tube in the multiplexer 11. Since the intelligence and supervisory signal channels of the line circuits of the present invention are of the latter type, it will be understood that a multiplexer of the type shown in copending application, Serial No. 205,641, is to be used with this line circuit. However, it will be understood that either type of line circuit and multiplexer combination may be employed insofar as the restricted service facilities of the present invention are concerned.

*Finder 12a*

As described generally heretofore, the finder 12*a*, as well as the finders of all of the other links of the system, comprises a pulse input circuit 200, a +B switching circuit 201, a finder pulse and busy pulse combining circuit 202, a tens coincidence tube 203, a units coincidence tube circuit 204, a finder pulse forming circuit 205 and a self allotting circuit 206. It will also be recalled from the general description of the system that the pulse input circuit of this finder is provided with restricted service facilities which are adapted to function with the above-described restricted service marking pulses so as to prevent certain lines of the system from gaining access to links in the service A group.

Figure 18:
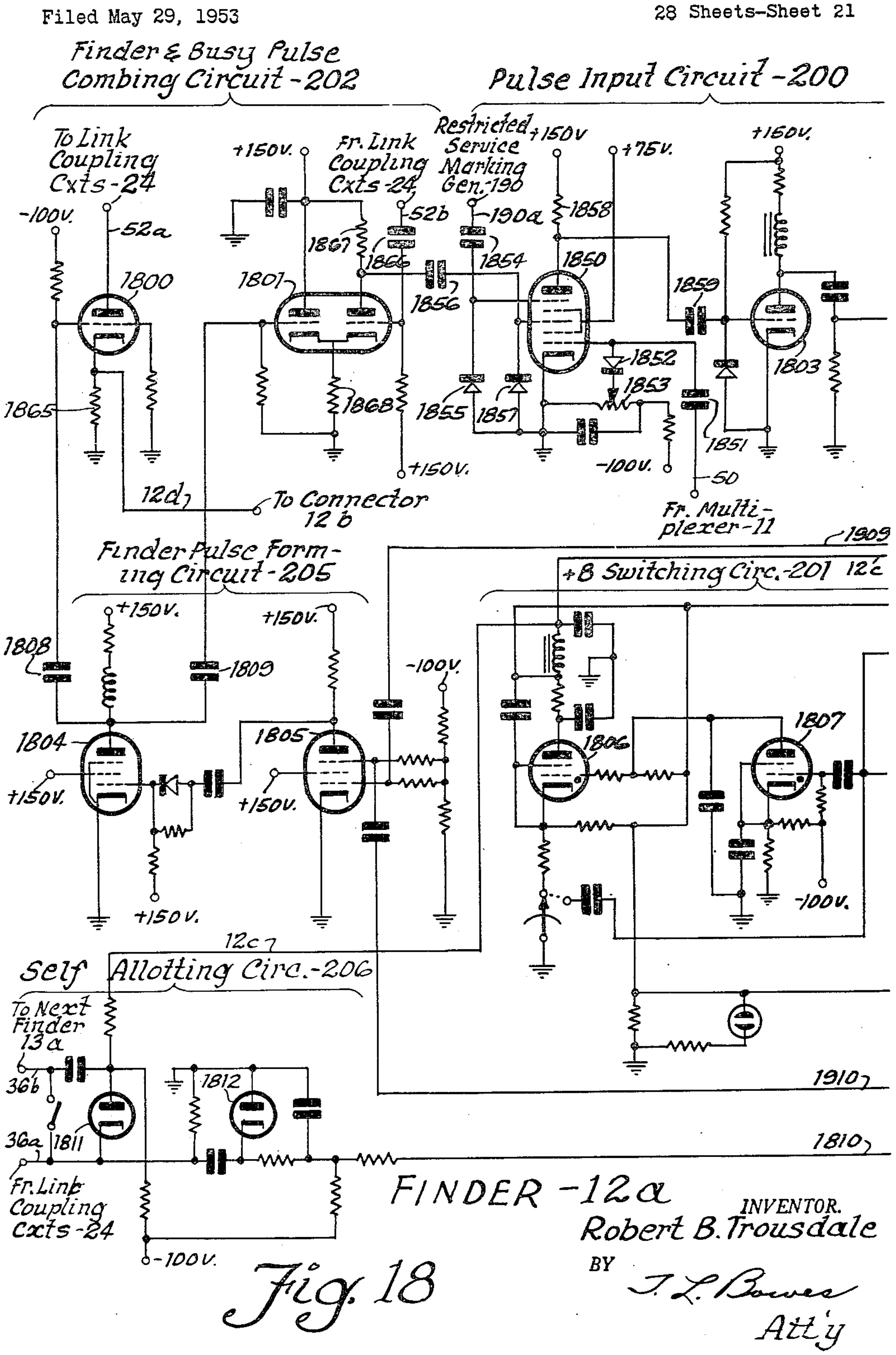
Figure 19:
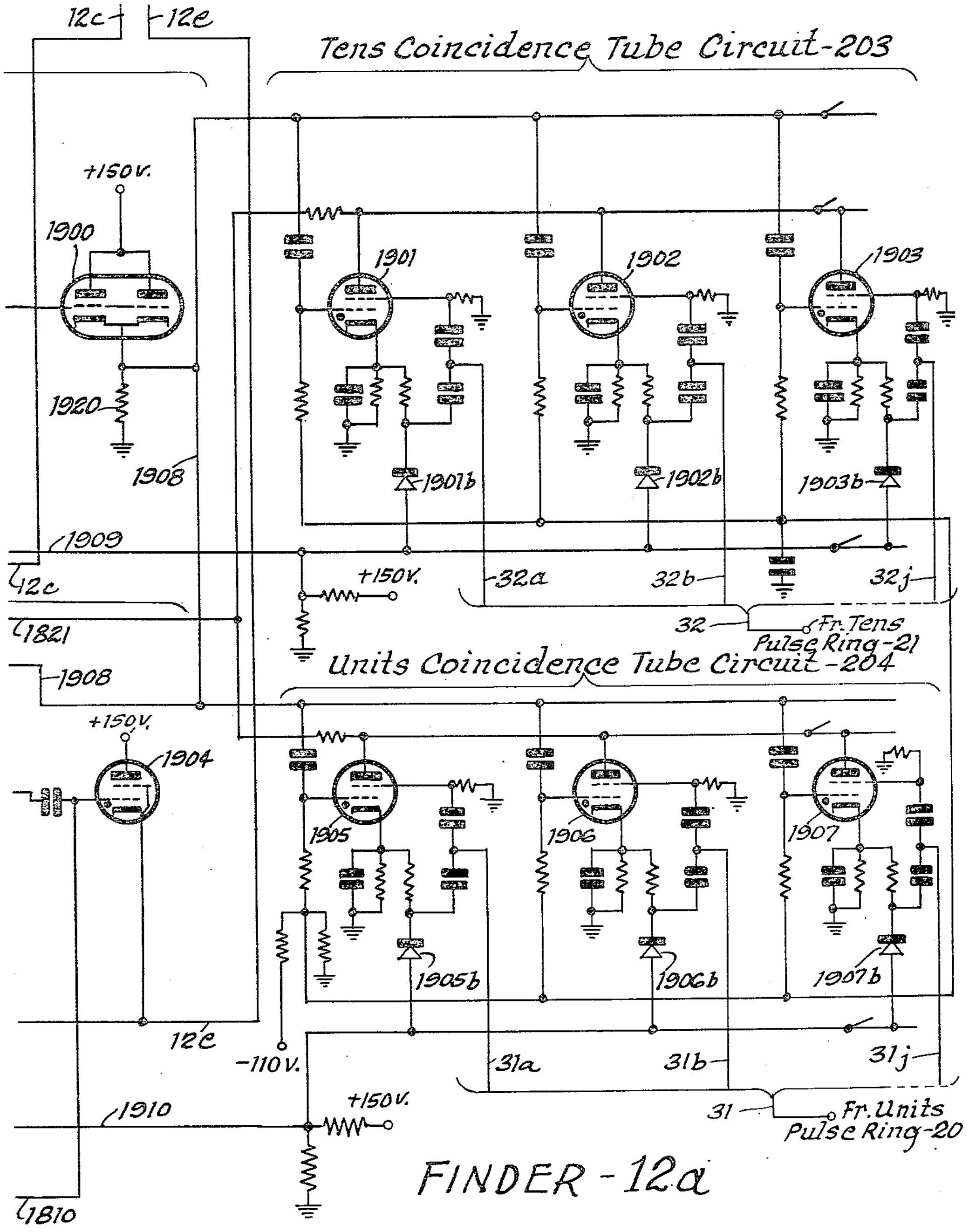
Figure 22:
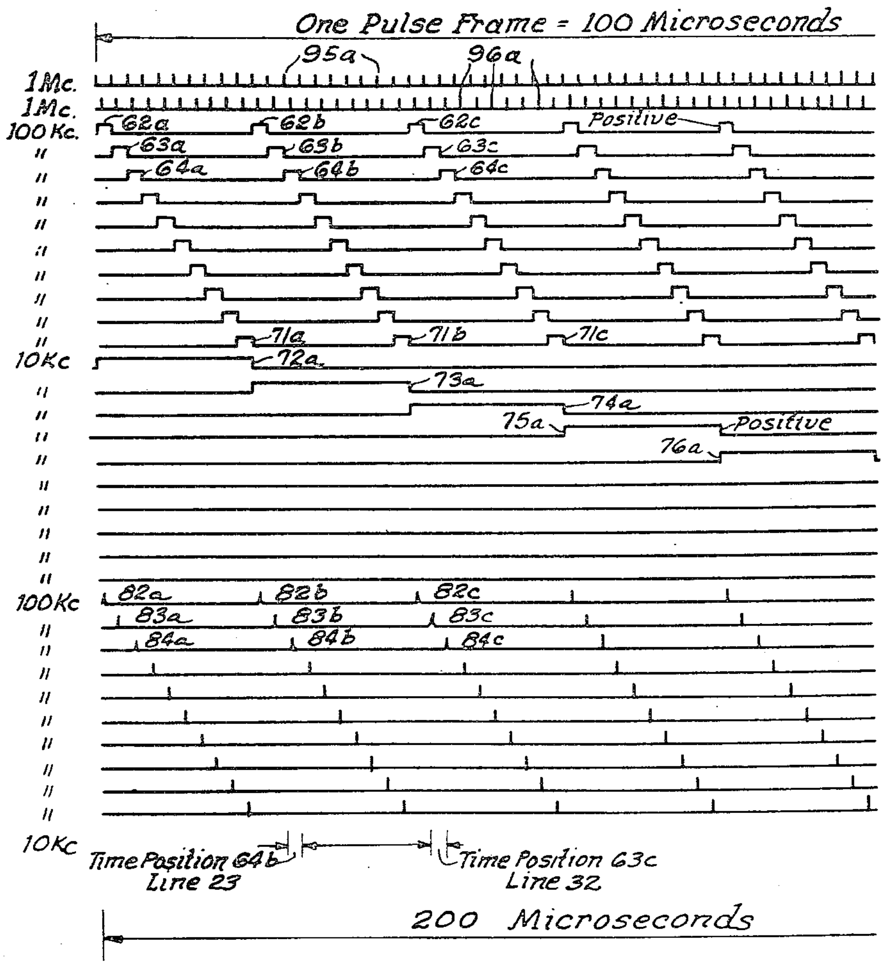
Figure 23:
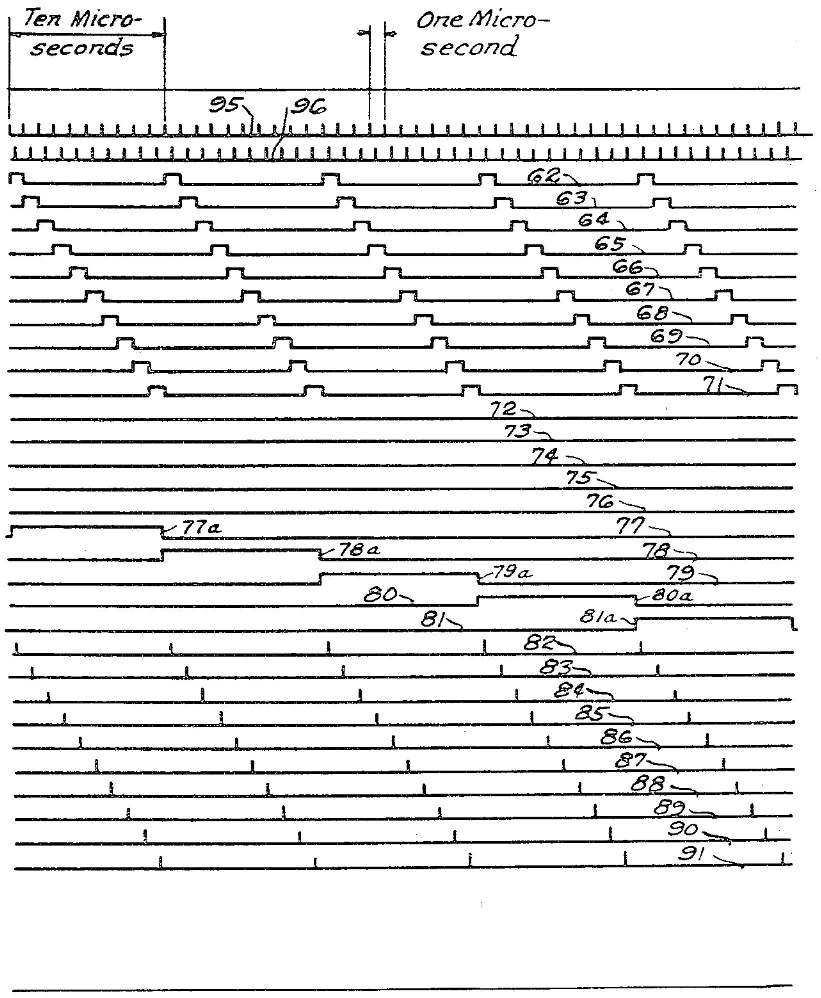
Figure 24:
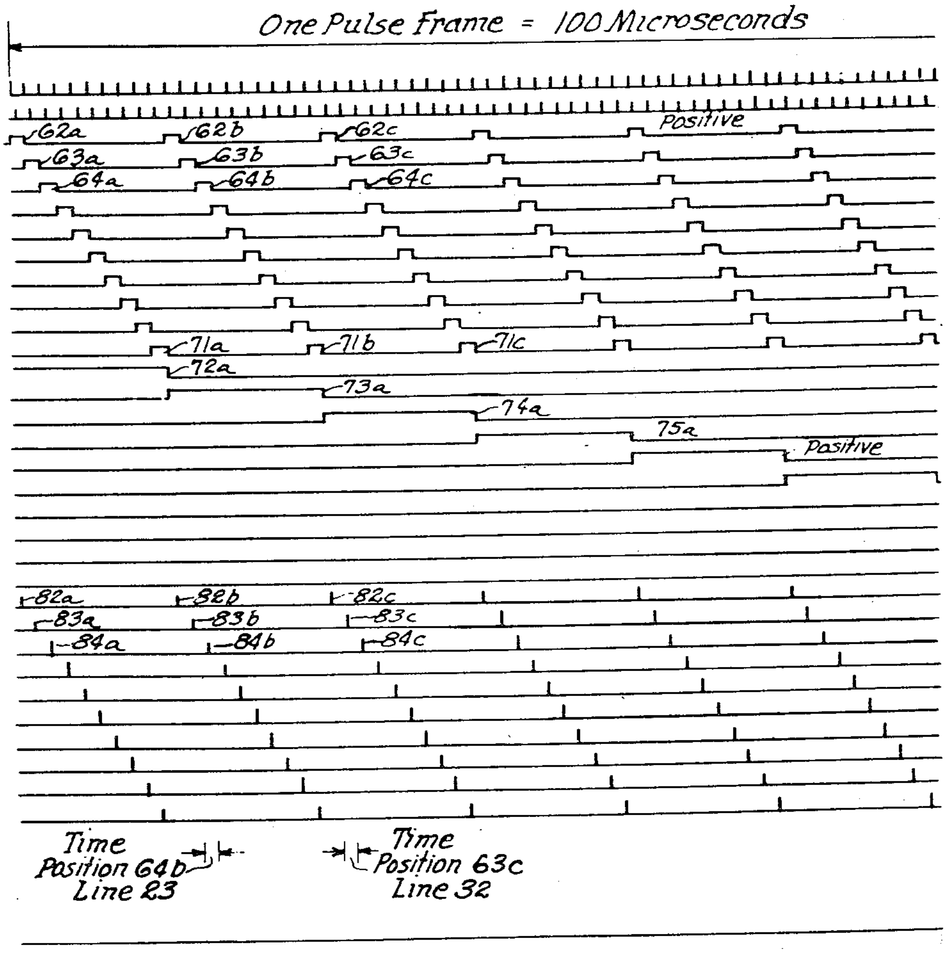
Figure 25:
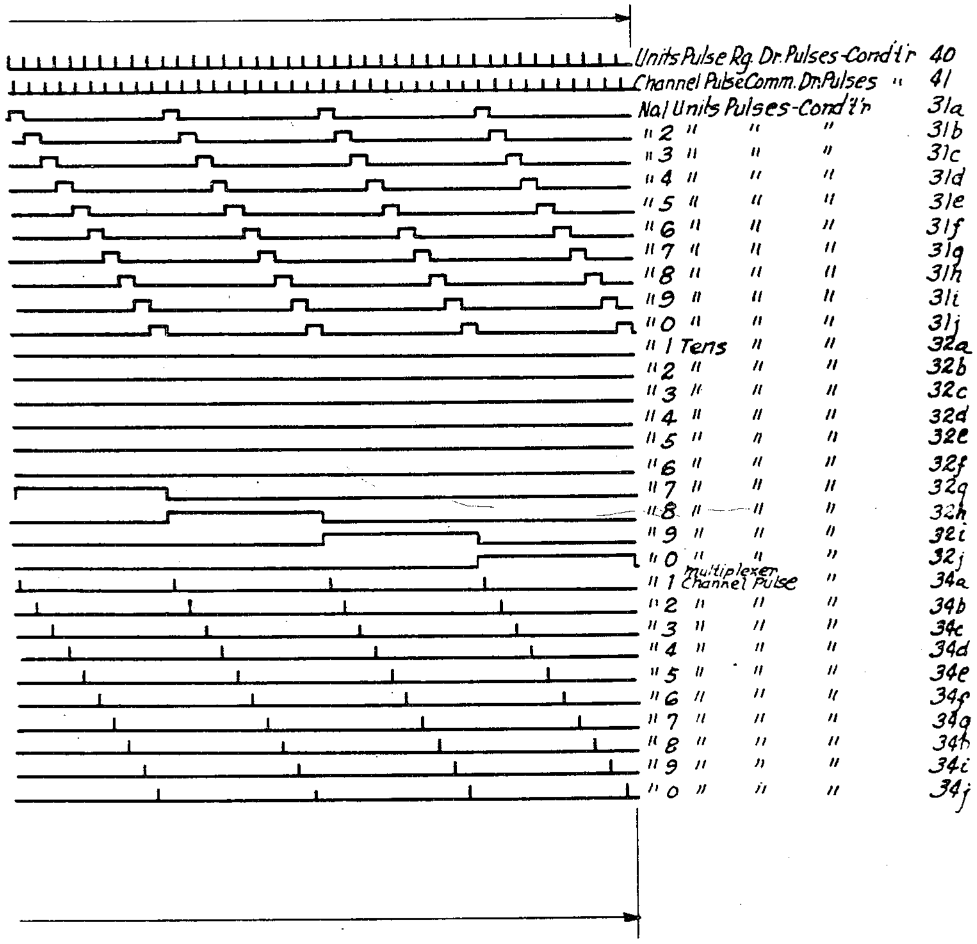

In considering the details of the finder 12*a*, which are shown in Figs. 18 and 19 of the drawings, it is pointed out that all of the component circuits of the finder 12*a*, with the exception of the pulse input circuit 200, may be substantially identical to the corresponding units of the finders shown in any one of the copending applications, Serial No. 134,974 and Serial No. 301,215, identified above, or my copending application, Serial No. 301,087, filed July 26, 1952, and, accordingly, a detailed description of these component circuits of the finder 12*a* is considered unnecessary herein.

In considering the operation of the pulse input circuit 200, it will be assumed that the above described call is initiated on the line 92 whereupon multiplexer pulses 83*i* are developed on the conductor 50 and are transmitted by way of this conductor to the pulse input circuits 200 of each finder in the system. In the finder 12*a* these multiplexer pulses are coupled through the condenser 1851 to the first control grid of the pulse input gate tube 1850. Preferably the tube 1850 is of the RCA experimental type A–5727 having three control electrodes each of which has a substantial mutual conductance when operated at a potential negative with respect to the cathode potential of the tube. A clamping rectifier 1852 is connected from the first control grid of the tube 1850 to the arm of a potentiometer 1853, this rectifier acting to set the baseline potential of these multiplexer pulses in accordance with the adjustment of the potentiometer 1853. The negative restricted service marking pulses developed on the conductor 190*a* are coupled through the condenser 1854 to the third control grid of the gate tube 1850, a clamping rectifier 1855 being connected from this control grid to ground to clamp the baseline of these restricted service marking pulses to ground potential. The negative busy pulses developed by the finder and busy combining circuit 202 are coupled through the condenser 1856 to the second control grid of the gate tube 1850, a clamping rectifier 1857 being connected from this control grid to ground to clamp the baseline of these busy pulses to ground potential. Accordingly, the second control grid of the tube 1850 is operated at ground potential except during the busy pulses impressed thereon during which periods the second control grid is driven highly negative so as to cut off the tube 1850 and prevent conduction therethrough. Similarly, the third control grid is operated at ground potential except during the restricted service marking pulses impressed thereon during which periods the third control grid is driven highly negative so as to cut off the tube 1850. As a result, the tube 1850 cannot conduct unless a positive multiplexer pulse is impressed on the first control grid and no busy pulses or restricted service pulses are coincidentally impressed upon the second and third control grids thereof.

In the illustrated embodiment it has been assumed that the lines numbered 1 to 9, inclusive, and 56 to 100, inclusive, are members of the service A group and hence are entitled to access to an idle one of the finder-connector links in the service A group. Accordingly, the restricted service marking generator 190 does not develop pulses in the time position assigned to the line 92 so that no restricted service marking pulses are impressed upon the third control grid of the tube 1850 coincidentally with the multiplexer pulses 83*i* impressed upon the first control grid of this tube. Accordingly, the multiplexer pulses 83*i* are gated through the tube 1850 and are reproduced as positive multiplexer pulses across the anode resistor 1858 of the tube 1850. The multiplexer pulses which are gated through the tube 1850 are coupled through the condenser 1859 to the control grid of the inverter tube 1803 wherein they are amplified and inverted and are supplied to the double triode cathode follower tube 1900. The multiplexer pulses impressed upon the cathode follower tube 1900 are repeated as positive pulses across the cathode resistor 1920 of this tube and are transmitted by way of the conductor 1908 to the ten coincidence tubes of the tens coincidence tube circuit 203, the ten coincidence tubes of the units coincidence tube circuit 204, and the +B switch tube 1904 and the +B switch timing tube 1807 in the +B switching circuit 201 in parallel.

The above-described transmission of the multiplexer pulses 83*i* through the pulse input circuit 200 in the finder 12*a* also takes place in the pulse input circuits 200 of each of the other finders 13*a* and 14*a* in the service A group. However only the +B switching circuit 201 in the finder 12*a* is enabled by means of the self allotting circuit 206 in this finder to respond to the multiplexer pulses transmitted through the pulse input circuit of the finder. As a result, only the finder 12*a* responds to the multiplexer pulses 83*i*, and these multiplexer pulses are effective to fire the +B switch tube 1904 in the circuit 201 so that a +B switch potential of approximately one hundred forty volts positive is developed on the conductor 12*c* and is transmitted to the associated connector 12*b*.

In the tens and units coincidence tube circuits 203 and 204 the time position assigned to the calling line 92 is selected by selecting the corresponding ones of the tens and units pulses impressed upon these coincidence tube circuits. Thus, in the circuit 203 the ninth coincidence tube is fired by coincidence of the multiplexer pulses 83*i* and the tens pulses 80*a* with the result that the tens pulses 80*a* are transmitted by way of the conductor 1909 to the finder pulse forming circuit 205. In the circuit 204 the second coincidence tube 1906 is fired by coincidence of the multiplexer pulses 83*i* and the units pulses 63*a*, 63*b*, 63*c*—63*j*, inclusive, appearing on the conductor 31*b* with the result that these units pulses are transmitted by way of the conductor 1910 to the circuit 205.

In the finder pulse forming circuit 205 the above-described tens and units pulses are combined in the mixer tube 1805 so as to developed a composite waveform wherein the units pulse 63*i* is superimposed upon the tens pulse 80*a* and this composite waveform is coupled through a pulse clipping network to a control grid of an amplifier and inverter tube 1804. Accordingly, there is produced in the anode circuit of the tube 1804 the single units pulse 63*i* which may now be called a finder pulse, and this pulse is coupled through the condenser 1808 to the finder pulse and busy pulse output tube 1800 and is also coupled through the condenser 1809 to the control grid of the left hand section of the finder and busy pulse mixer tube 1801.

The finder pulses which are coupled to the control grid of the output tube 1800 are transmitted as busy pulses by way of the conductor 52*a* to the link coupling circuits 24 and are supplied by way of the common busy pulse in-conductor 52*b* to all of the finders and connectors of the system to inform these units that the calling line 92 is busy and has been seized by linkage. The finder pulses impressed upon the control grid of the tube 1800 are also repeated as positive pulses across the cathode resistor 1865 of this tube and are transmitted by way of the conductor 12*d* to the associated connector 12*b* as finder gate pulses. The busy pulses developed upon the conductor 52*b* in the time positions assigned to busy lines of the system, including the time position 63*i* assigned to the calling line 92, are coupled through the condenser 1866 to the control grid of the right hand section of the mixer tube 1801. With the exception of the busy pulses produced in the time position 63*i* assigned to the calling line 92, the busy pulses on the conductor 52*b* are amplified and inverted in the right hand section of the tube 1801 so as to appear as negative pulses across the anode resistor 1867 of this tube section, these negative busy pulses being transmitted through the coupling condenser 1856 to the second control grid of the input gate tube 1850 in the manner described above. Accordingly, the gate tube 1850 is blocked by means of these negative busy pulses impressed upon the second control grid of this tube so that multiplexer pulses occurring in the same time positions are prevented from being transmitted through the tube 1850.

In order to permit continuous transmission of the multiplexer pulses 83*i* through the tube 1850, the finder pulses produced by the circuit 205 are employed to cancel the finders' own busy pulses normally developed on the conductor 52*b* in the time position 63*i* assigned to the line 92. More specifically, the finder pulses developed by the circuit 205 are coupled through the condenser 1809 to the left hand section of the tube 1801 and are repeated across the common cathode resistor 1868 of this tube. These positive finder pulses produced across the resistor 1868 effectively cancel the busy pulses coincidentally impressed upon the control grid of the right hand section of the tube 1801 so that no negative busy pulses are produced at the anode of this section in the time position 63*i* assigned to the line 92. Accordingly, the second control grid of the tube 1850 remains at ground potential during the time position 63*i* and the multiplexer pulses 83*i* are permitted to be transmitted through this tube.

In considering the manner in which the calling line 92 is prevented from becoming operatively associated with any of the links in the service B and service C groups, it is pointed out that the restricted service marking generators in the service B and service C groups both develop marking pulses on the respective conductors 191*a* and 192*a* in the time position 63*i* assigned to the line 92. As a result, the third control grid of the pulse input gate tubes in the pulse input circuits 200 of each of the finders in the service B and service C groups is driven beyond cutoff by the restricted service marking pulse which occurs in the time position 63*i* so that the multiplexer pulses 83*i* are prevented from being transmitted through the gate tubes of these finders with the result that none of these finders is permitted to seize the calling line 92.

While the above-described restricted service facilities in the finder 12*a* employ negative restricted service marking pulses which are produced in the time positions assigned to the lines which are not to be seized by this particular finder, it will be understood that service restrictions may be provided with either polarity of restricted service marking pulses. Furthermore, the lines which are to be restricted to a particular service group may be marked instead of the above-described alternative wherein the nonrestricted lines are marked. Thus, considering the finder 12*a* in connection with the above-described call initiated on the line 92, the generator 190 may be arranged to provide positive restricted service marking pulses which may be impressed upon the gate tube 1850 so as to prevent conduction thereof for the duration of these restricted service marking pulses. For example, the positive service marking pulses could be impressed upon the cathode of the tube 1850 with the same result as the above-described negative pulses impressed upon the third control grid of this tube. It will also be evident that positive restricted service marking pulses may be produced in the time positions assigned to the lines which are in the service A group, and these pulses may be employed to enable the gate tube 1850 instead of disabling this tube. Thus, the third control grid of the tube 1850 may be normally biased beyond cutoff by means of a suitable bias network and positive restricted service marking pulses impressed upon this control electrode in the time positions assigned to lines which are entitled to use the service A links. With this arrangement multiplexer pulse transmission through the tube 1850 will be obtained in the same manner as that described above in connection with the use of negative restricted service marking pulses.

It will further be understood that the restricted service marking pulses may be employed to control other portions of the finder to prevent the finder from seizing certain lines. For example, the negative restricted service marking pulses on the conductor 190*a* may be impressed directly on the control grid of the +B switch tube 1904 to prevent this tube from firing in response to multiplexer pulses occurring in the same time positions. Other arrangements for preventing the finder from seizing certain lines may likewise be employed as will be readily apparent to those skilled in the art.

In considering the second illustrated call initiated on the line 32, it will be recalled that the multiplexer 11 functions to develop multiplexer pulses 83*c* on the conductor 50 which are transmitted to all of the links of the system. In the service A group negative restricted service marking pulses are impressed upon the third control grid of the gate tube 1850 in the pulse input circuit 200 of each finder in this group so that the multiplexer pulses 83*c* are not transmitted through the input gate tubes of any finder in the service A group. Similarly, in the service C group negative restricted service marking pulses are developed in the time position 83*c* so that the finders in this group are also prevented from becoming operatively associated with the line 32. However, in the service B group no restricted marking pulses are developed in the time position 63*c* assigned to the line 32 with the result that the multiplexer pulses 83*c* are transmitted through the input gate tube of each finder in the service B group and the line 32 is seized by one of these finders in accordance with the self allotting system described above. It will be evident that the third illustrated call, which is initiated on the line 23, results in a seizure of the line 23 by one of the finders in the service C group, this line being prevented from becoming operatively associated with any of the finders in the service A and service B groups due to the fact that restricted marking pulses are developed in the time position 64*b* assigned to the line 23 in the service B and service A groups.

*Connector 12b*

Figure 2:
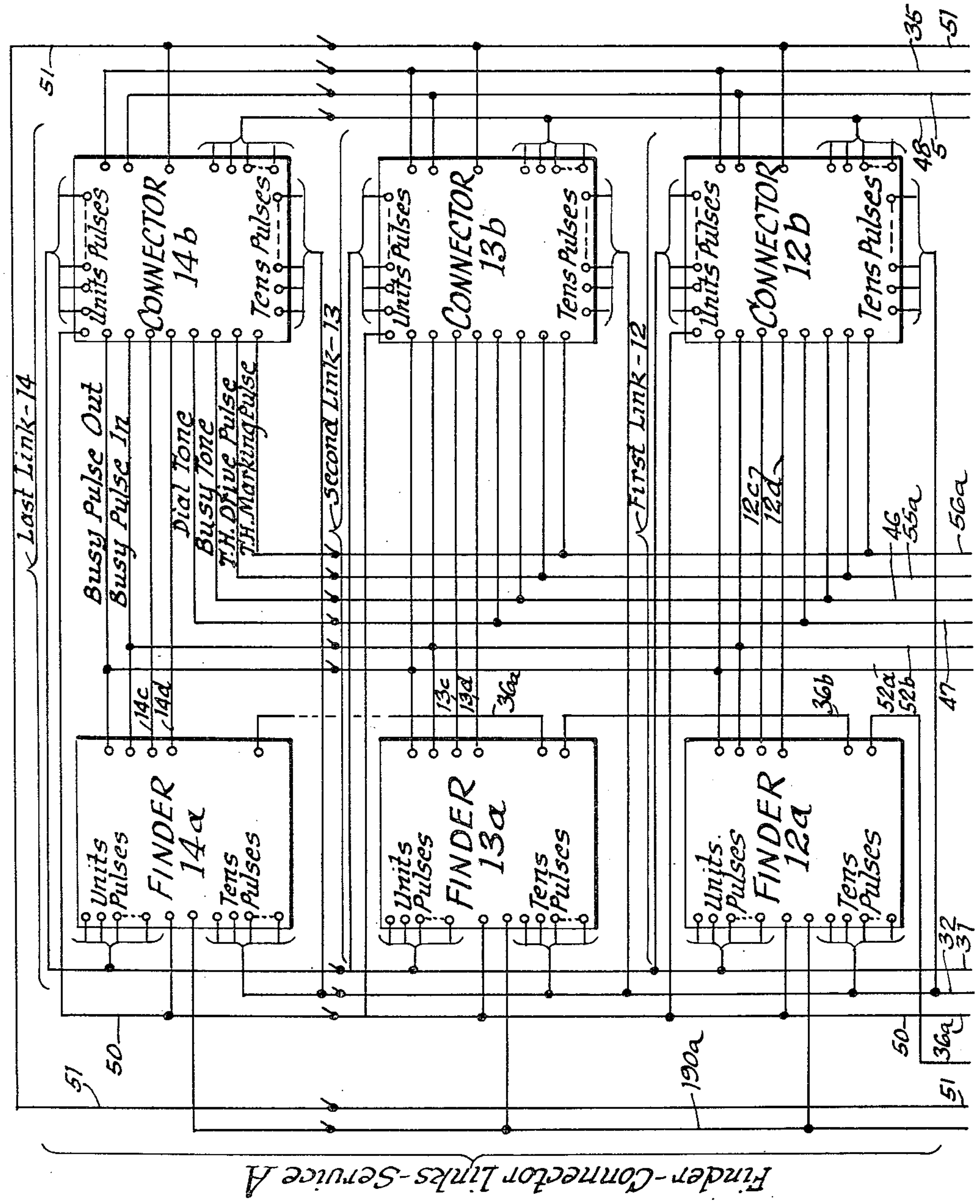
Figure 2A:
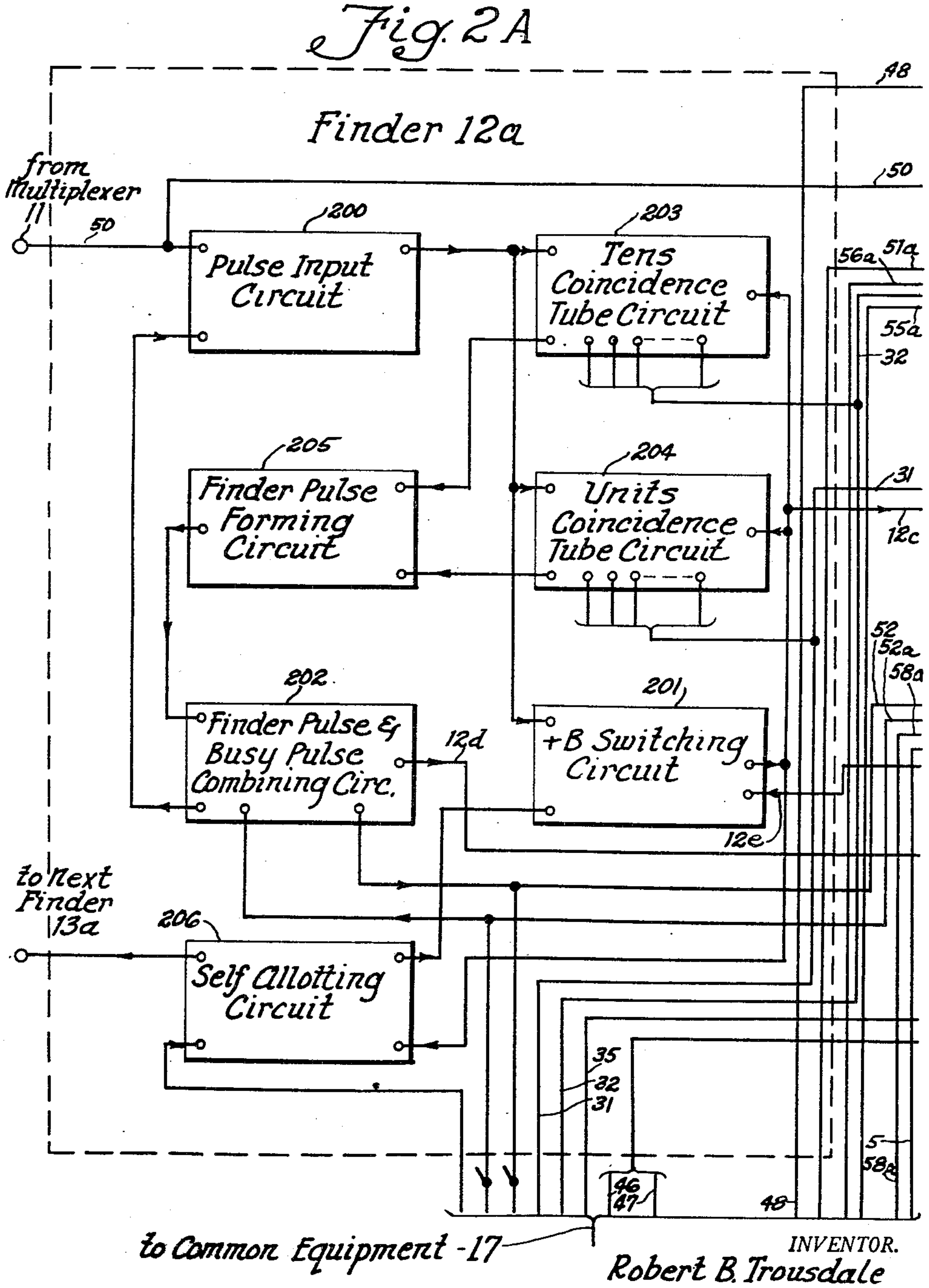
Figure 2B:
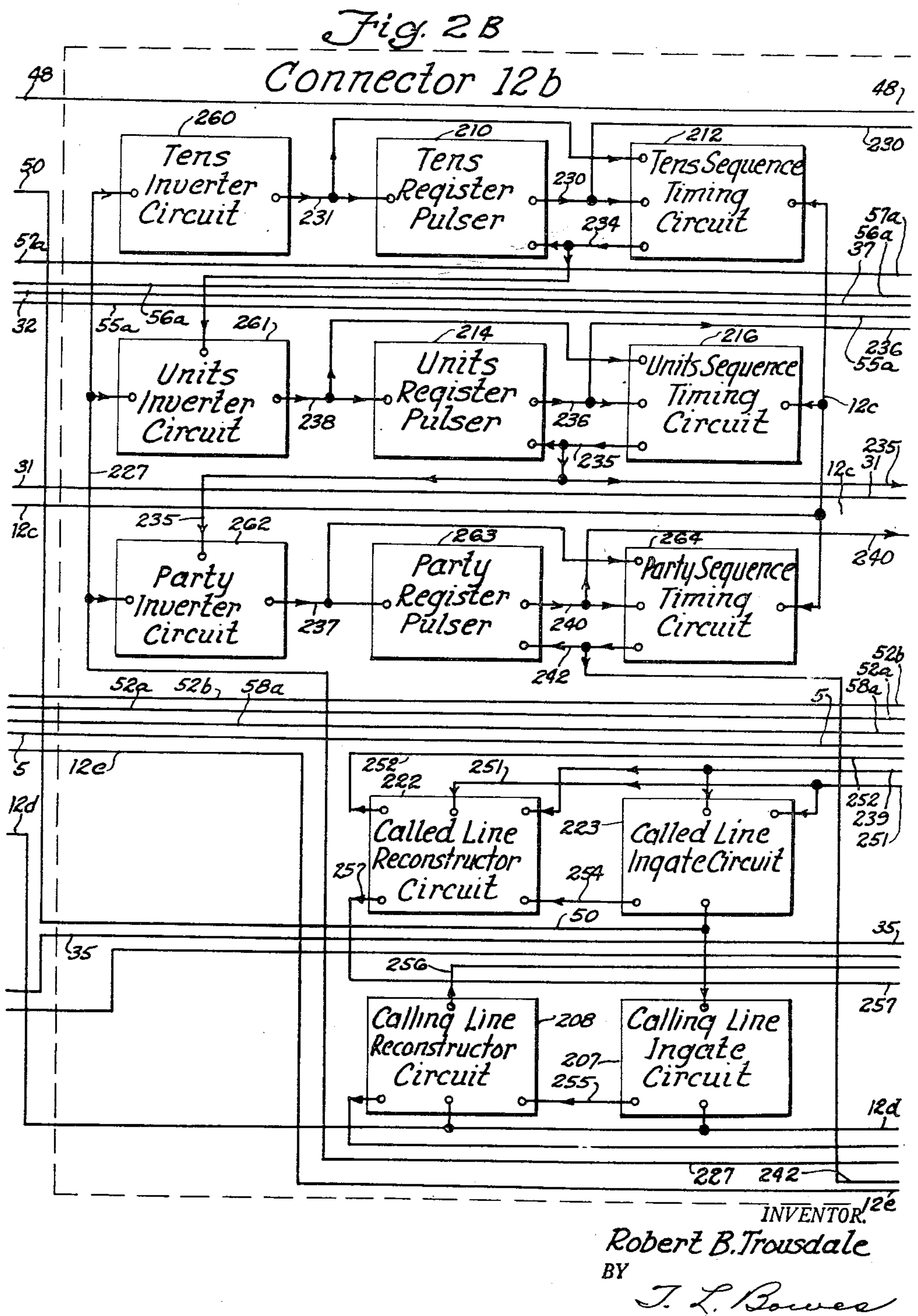
Figure 2C:
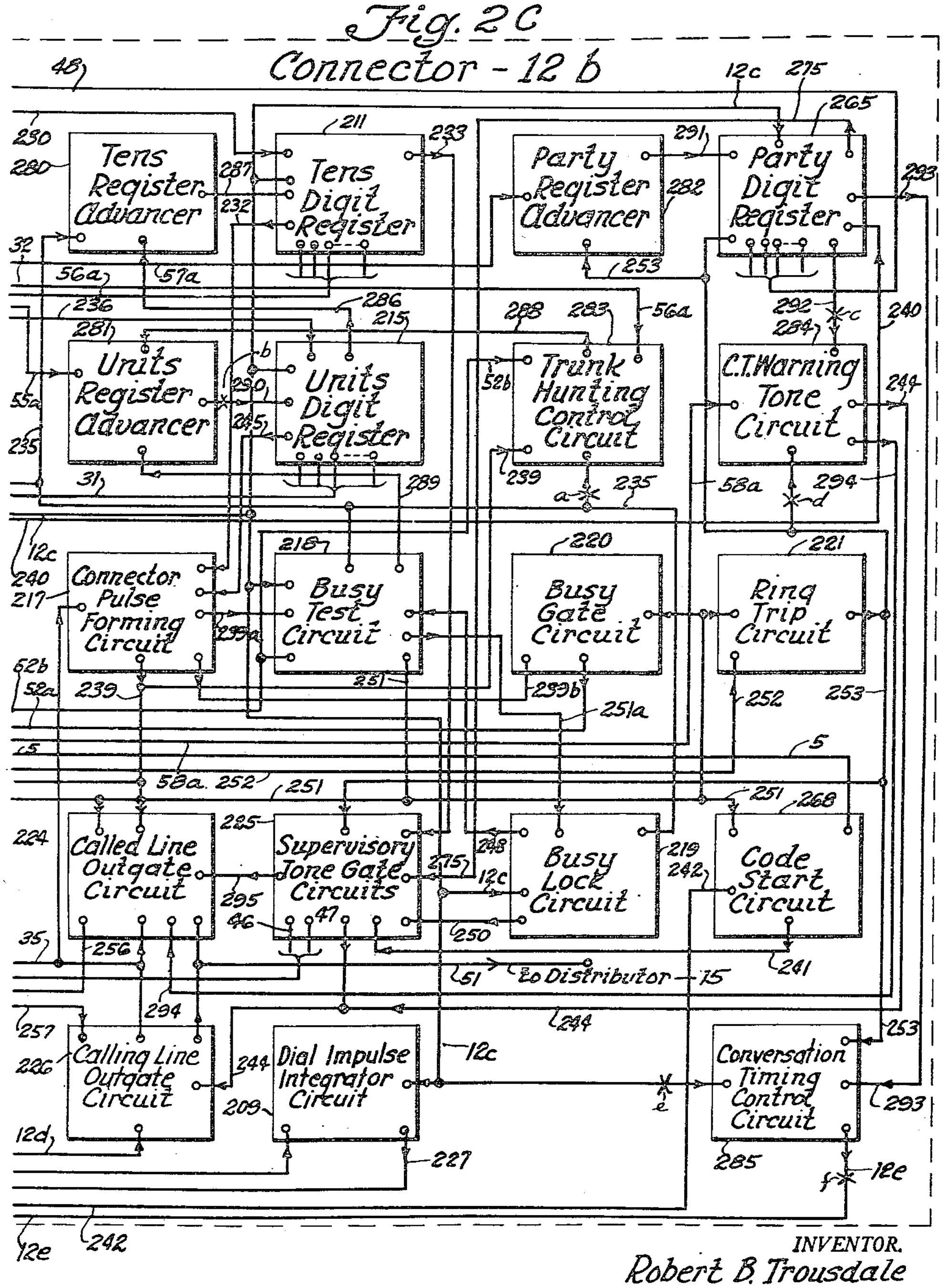
Figure 3:
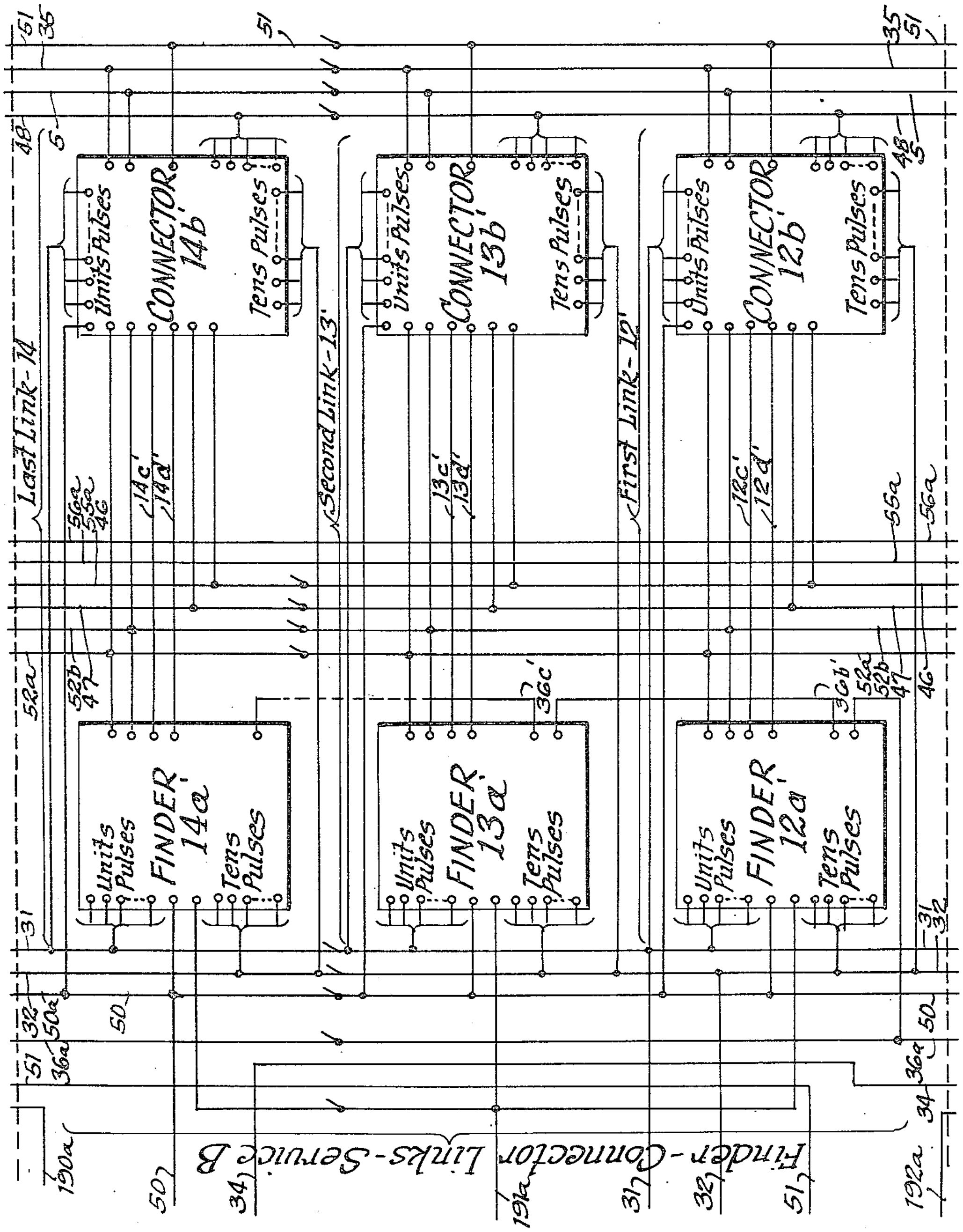
Figure 4:
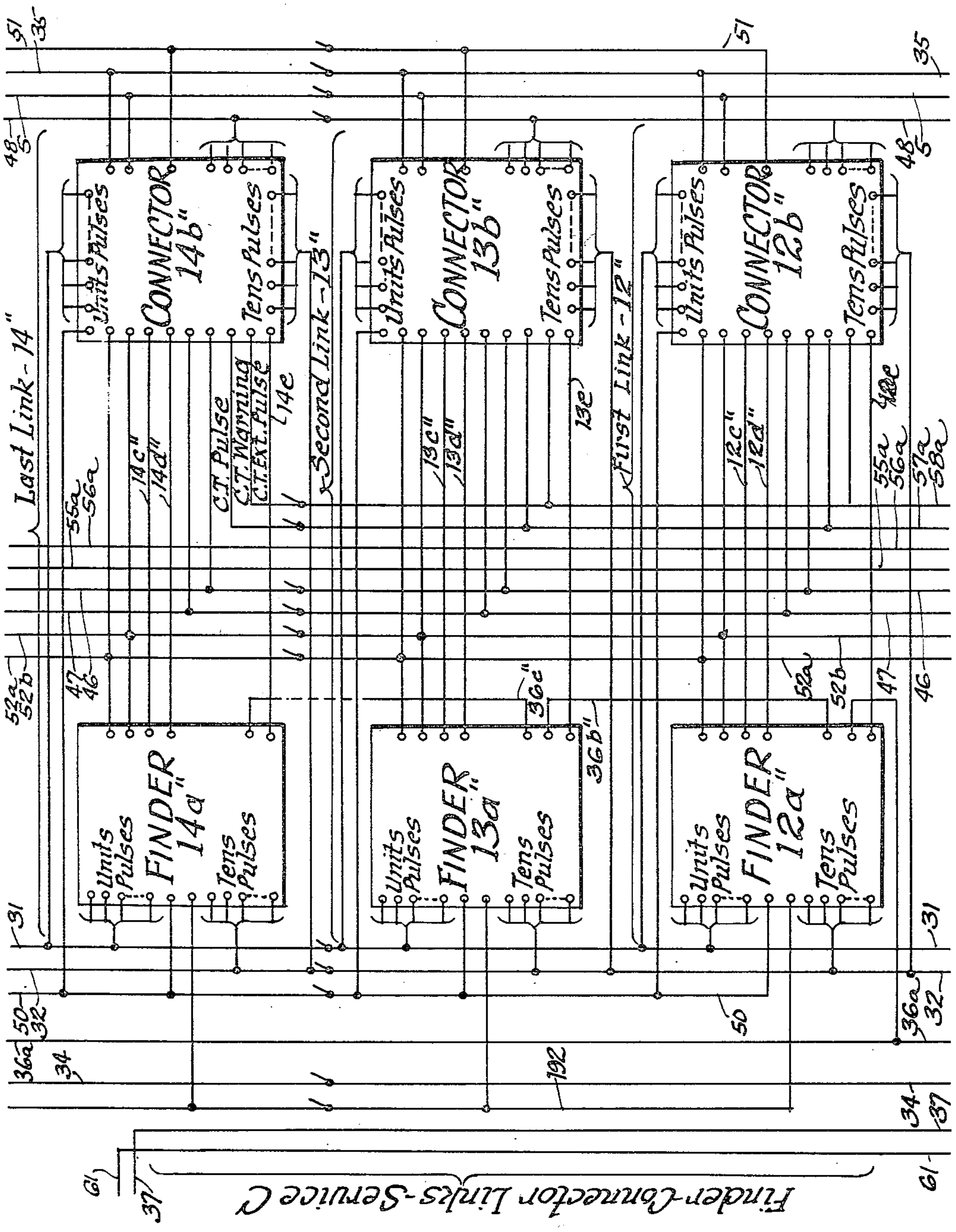
Figure 5:
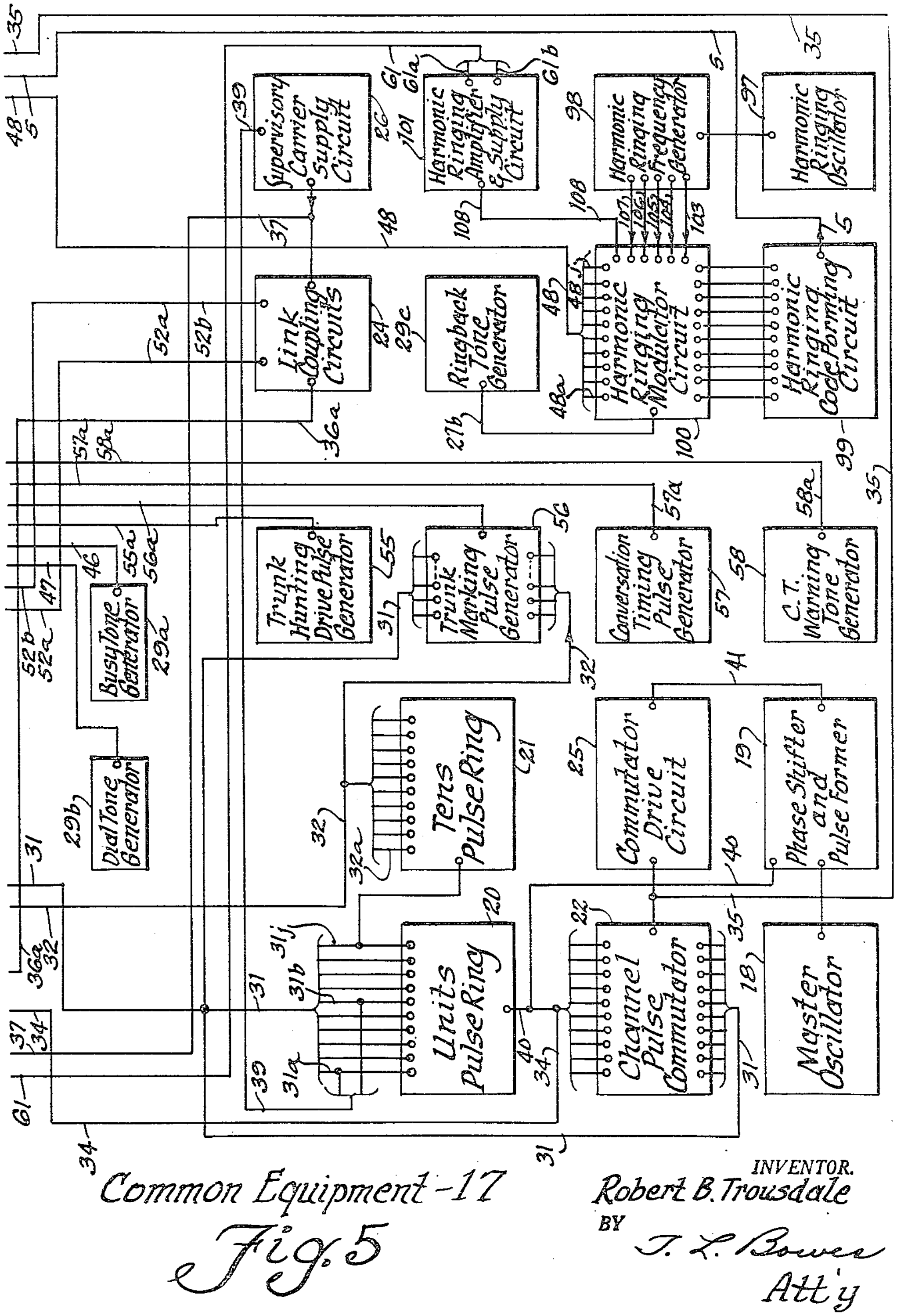

As described generally heretofore in connection with the general description of the system, the connectors in the service A group are provided with trunk hunting facilities but do not require conversation timing facilities, in the service B group the connectors are not provided with either trunk hunting or conversation timing facilities, while in the service C group the connectors are provided only with conversation timing facilities. In Figs. 2B and 2C of the drawings a composite connector has been illustrated wherein both trunk hunting and conversation timing facilities are available and this composite connector may be adapted for use in any one of the three illustrated service groups by merely disconnecting certain portions of the connector as described in detail hereinafter.

Figure 6:
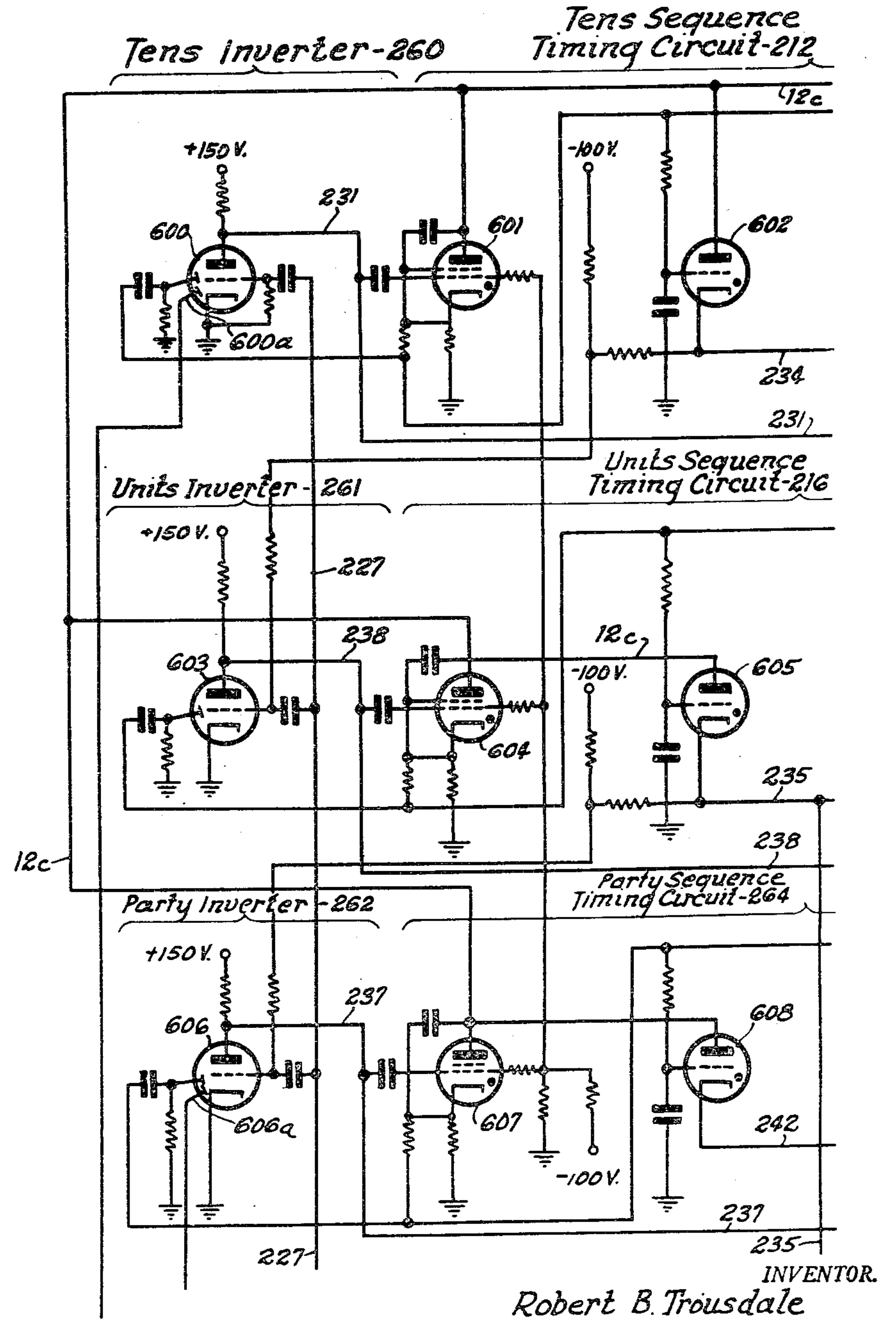
Figure 7:
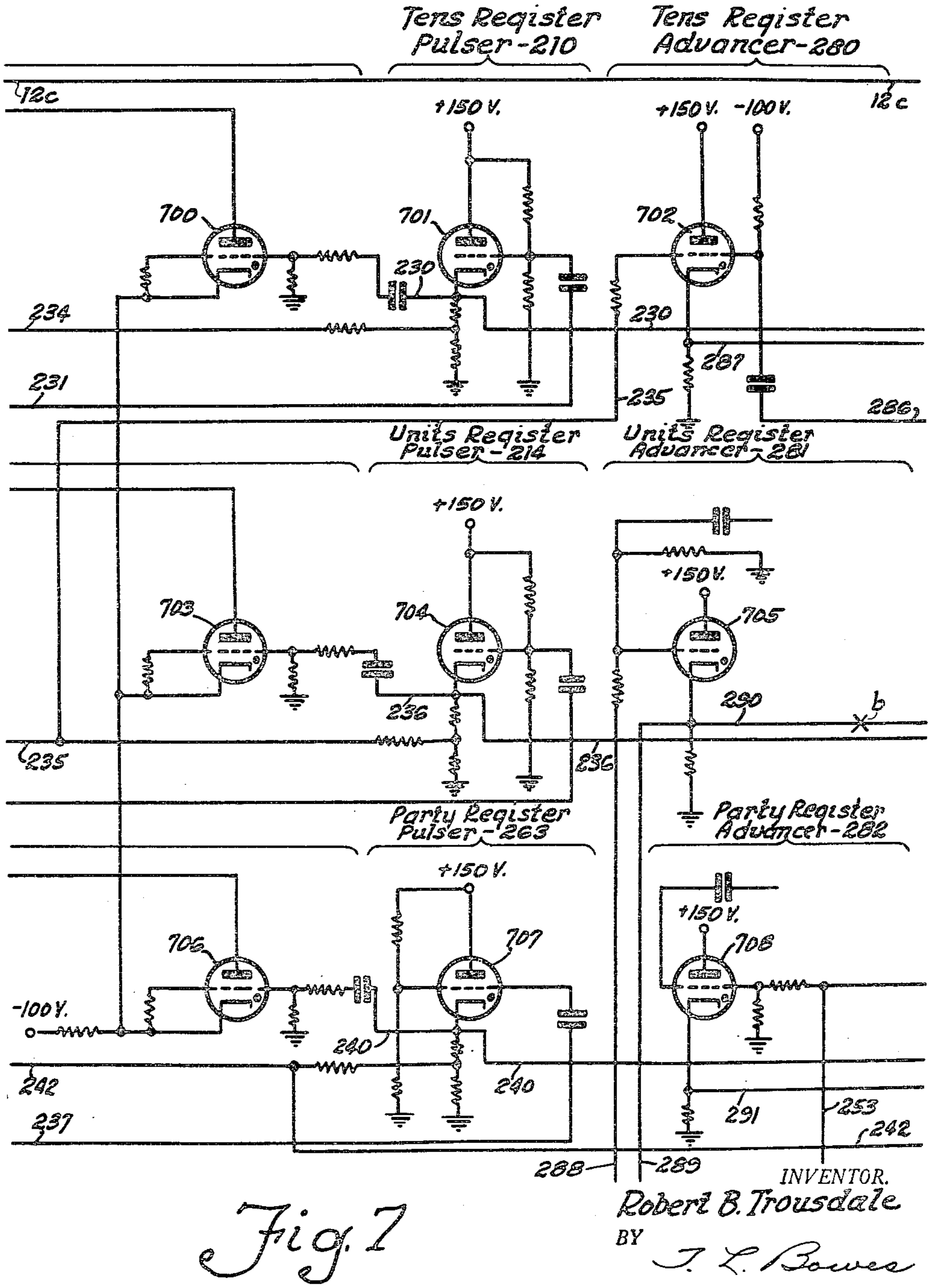
Figure 8:
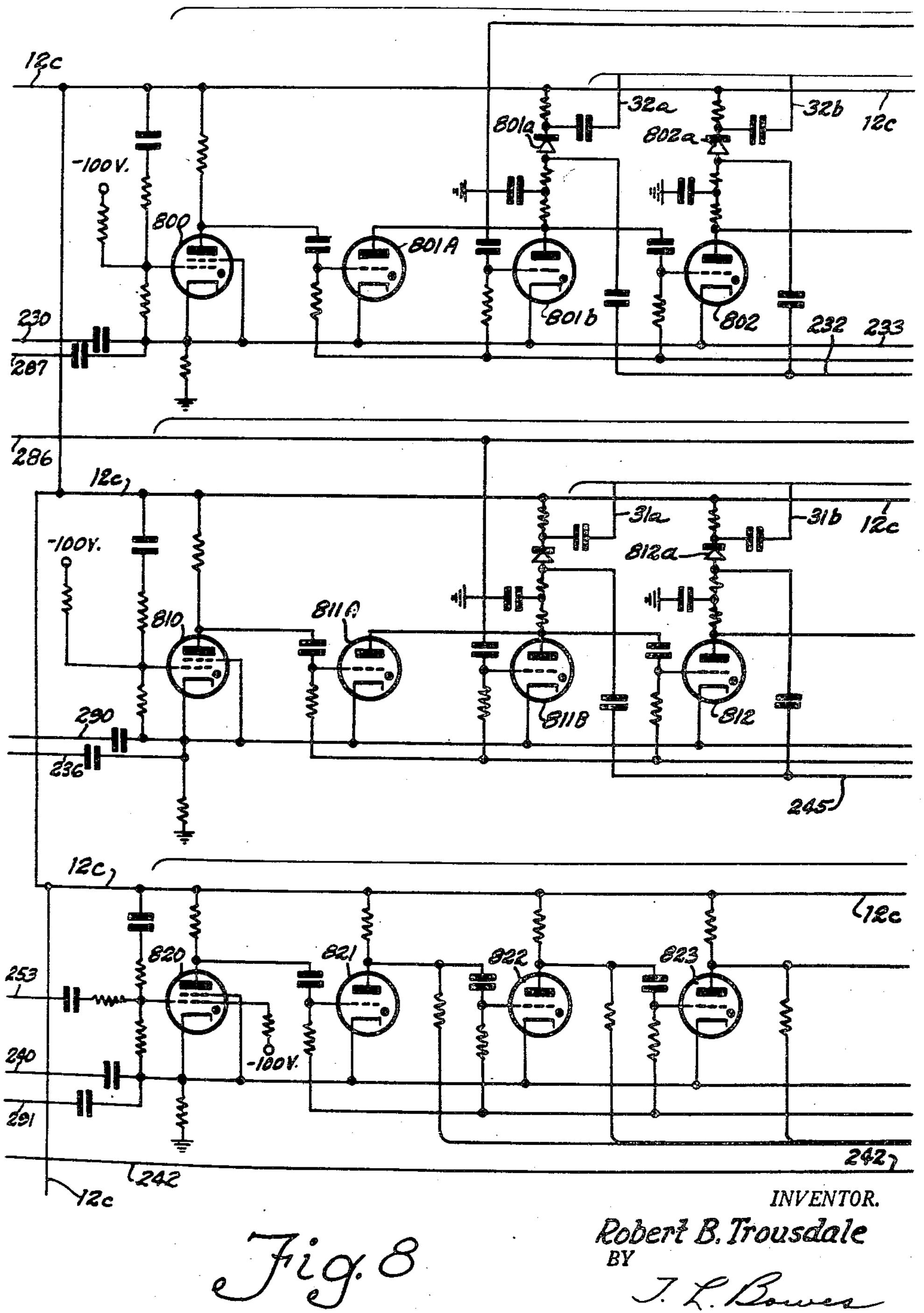
Figure 9:
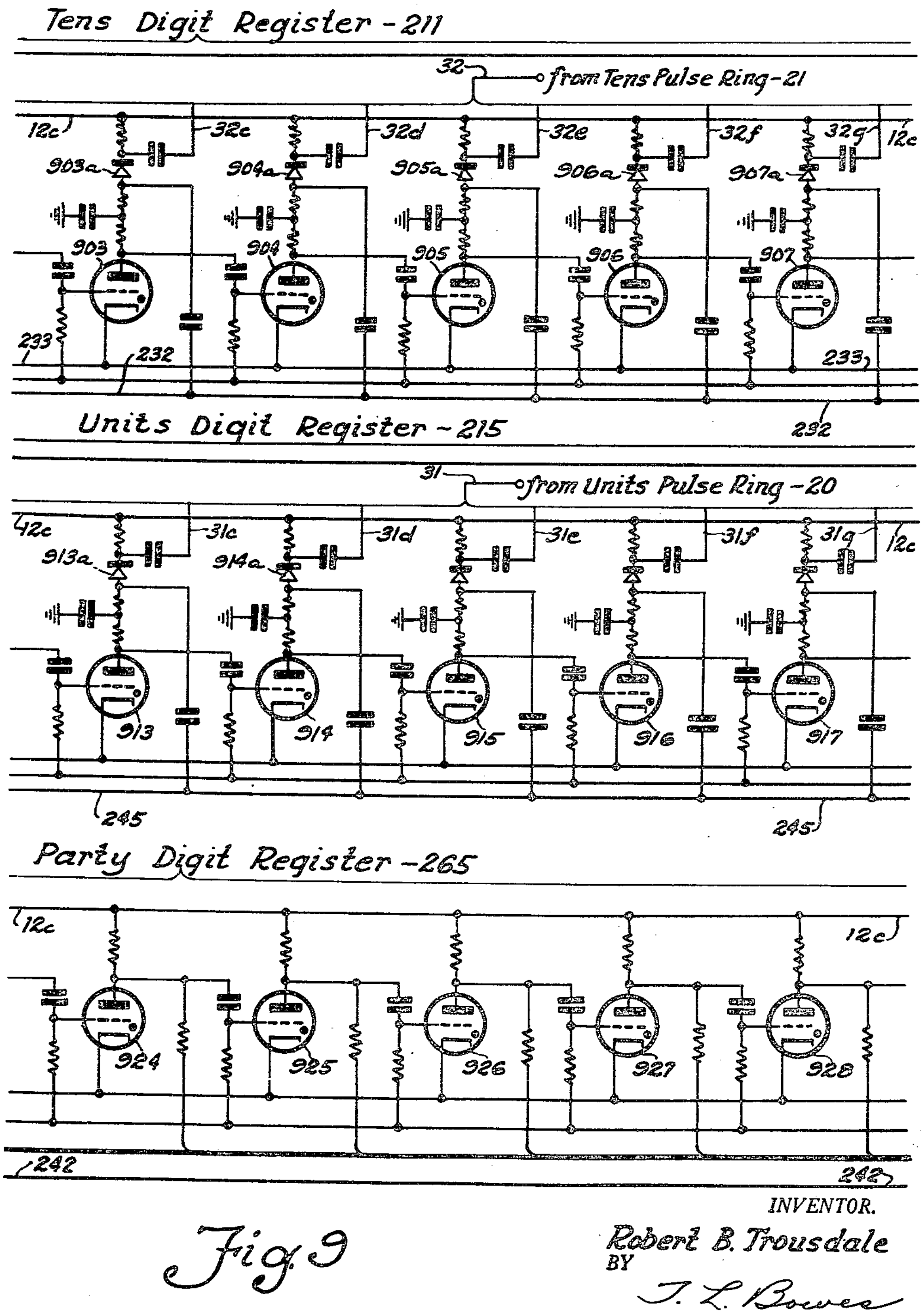
Figure 10:
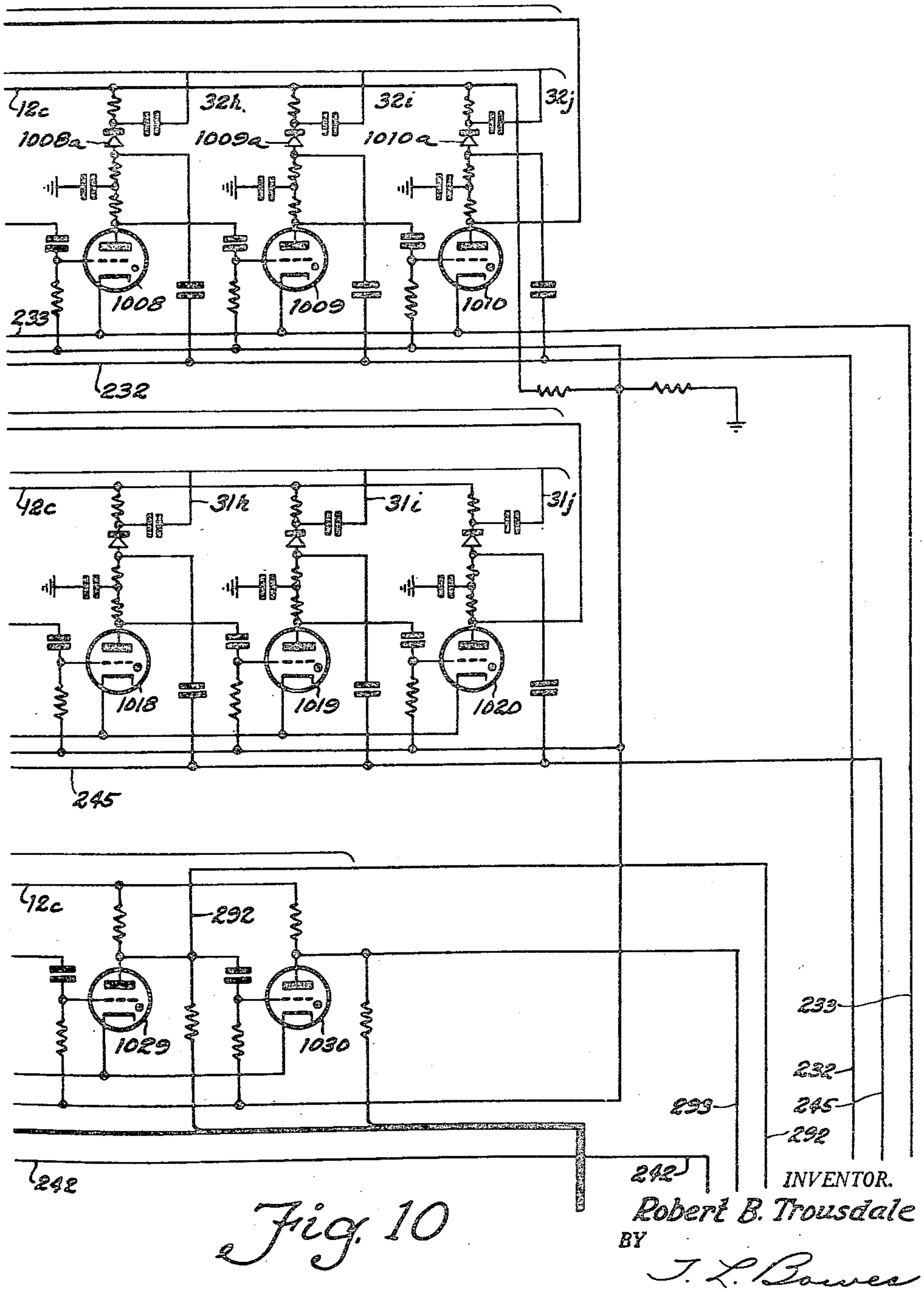
Figure 13:
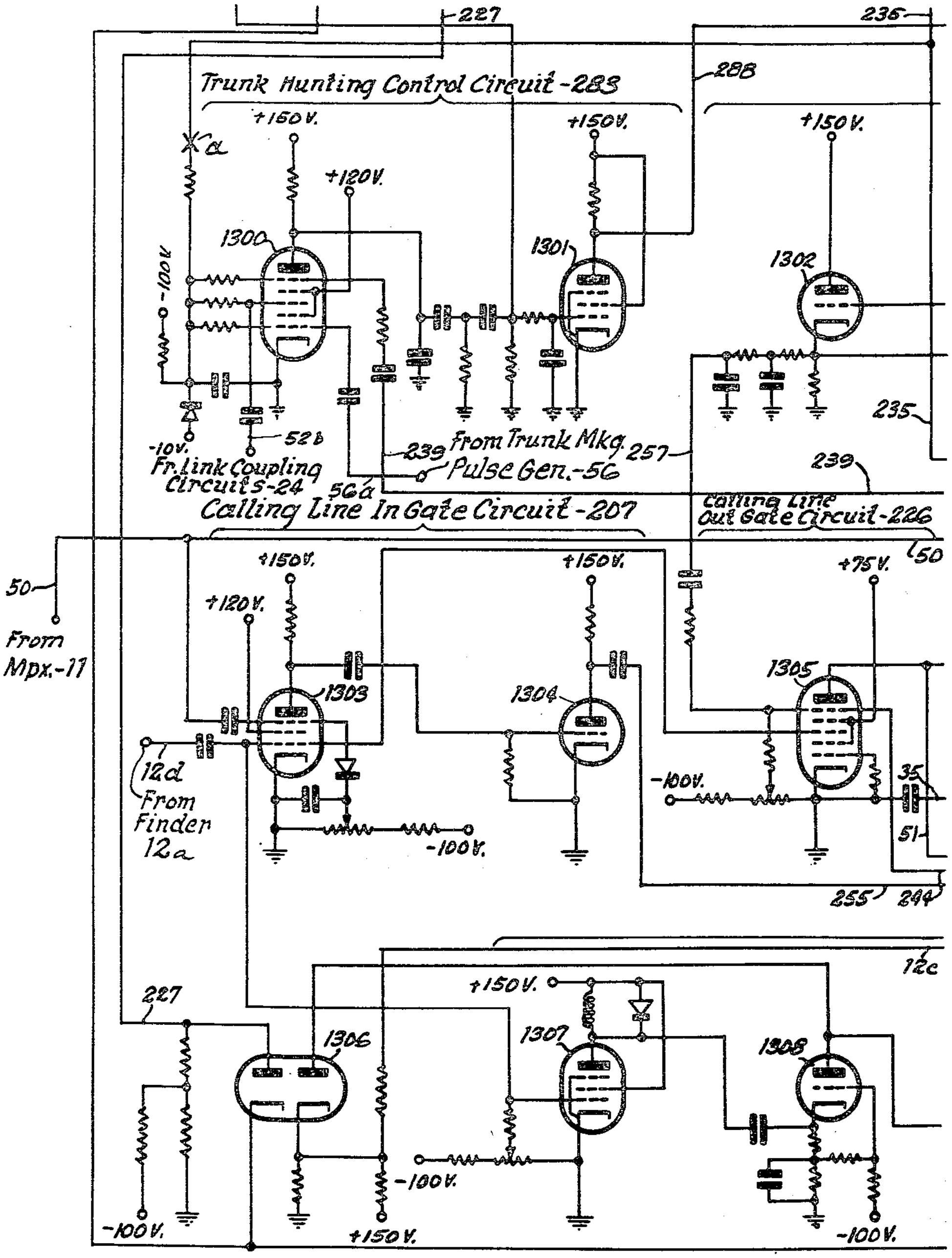
Figure 14:
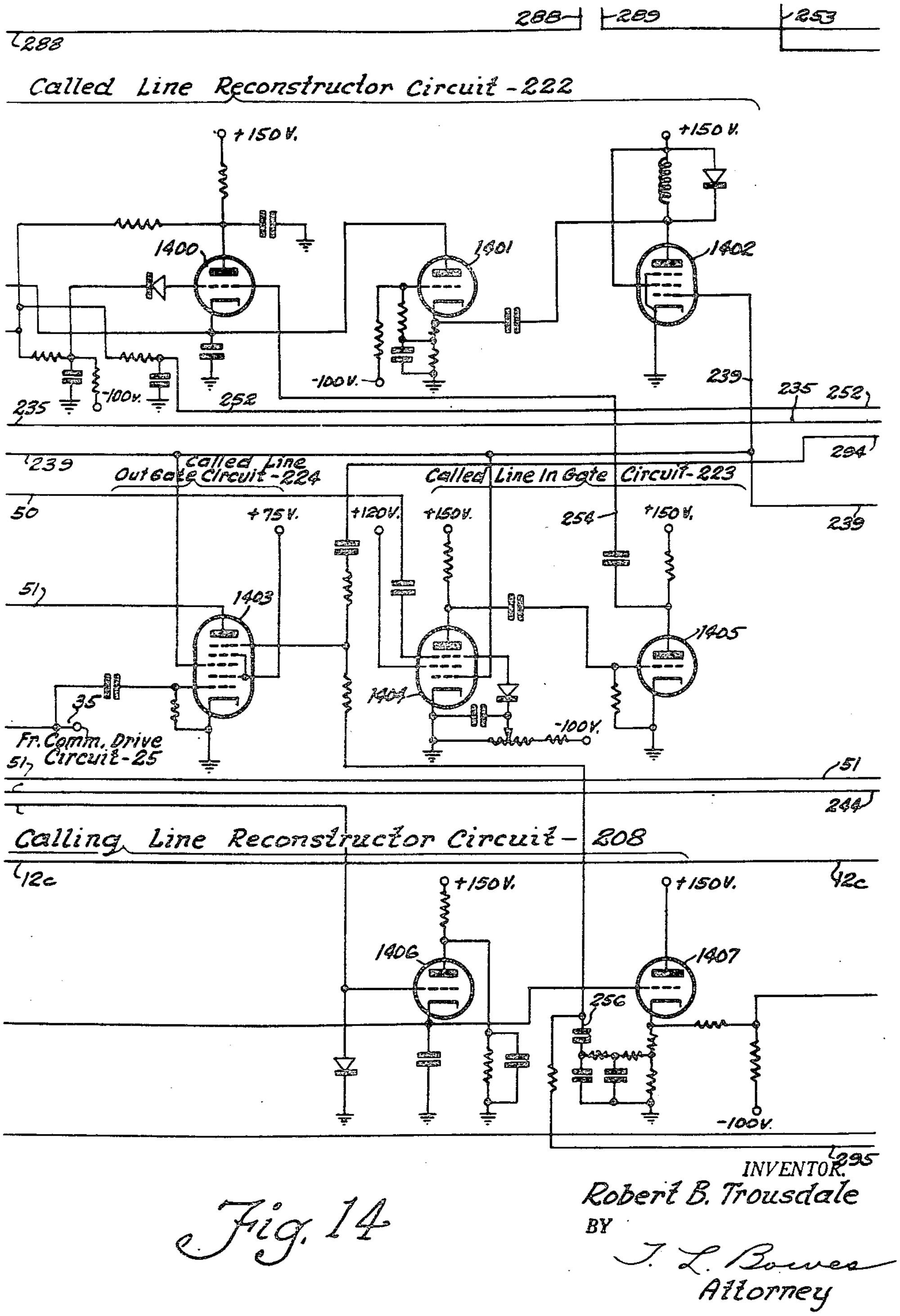
Figure 15:
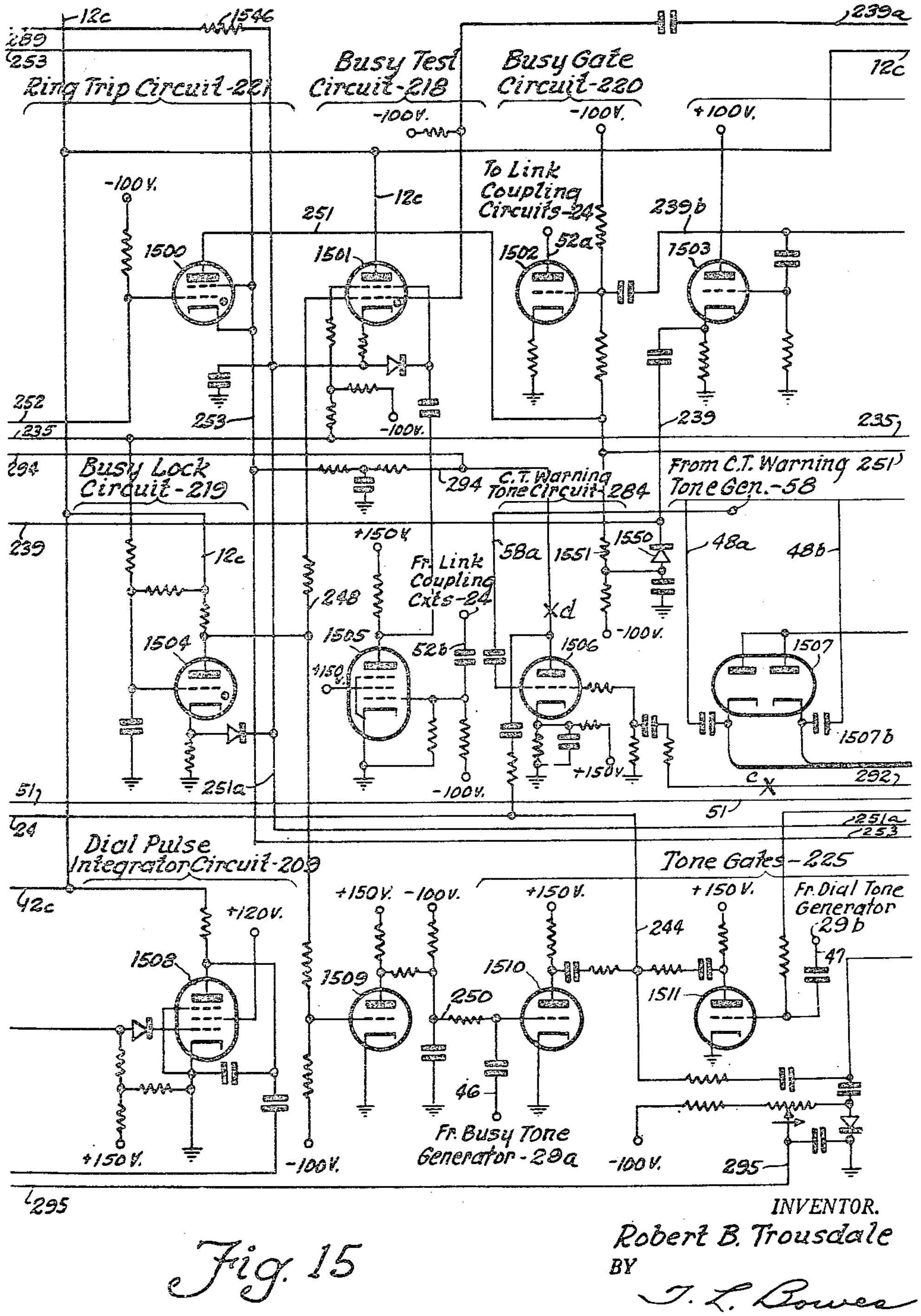
Figure 16:
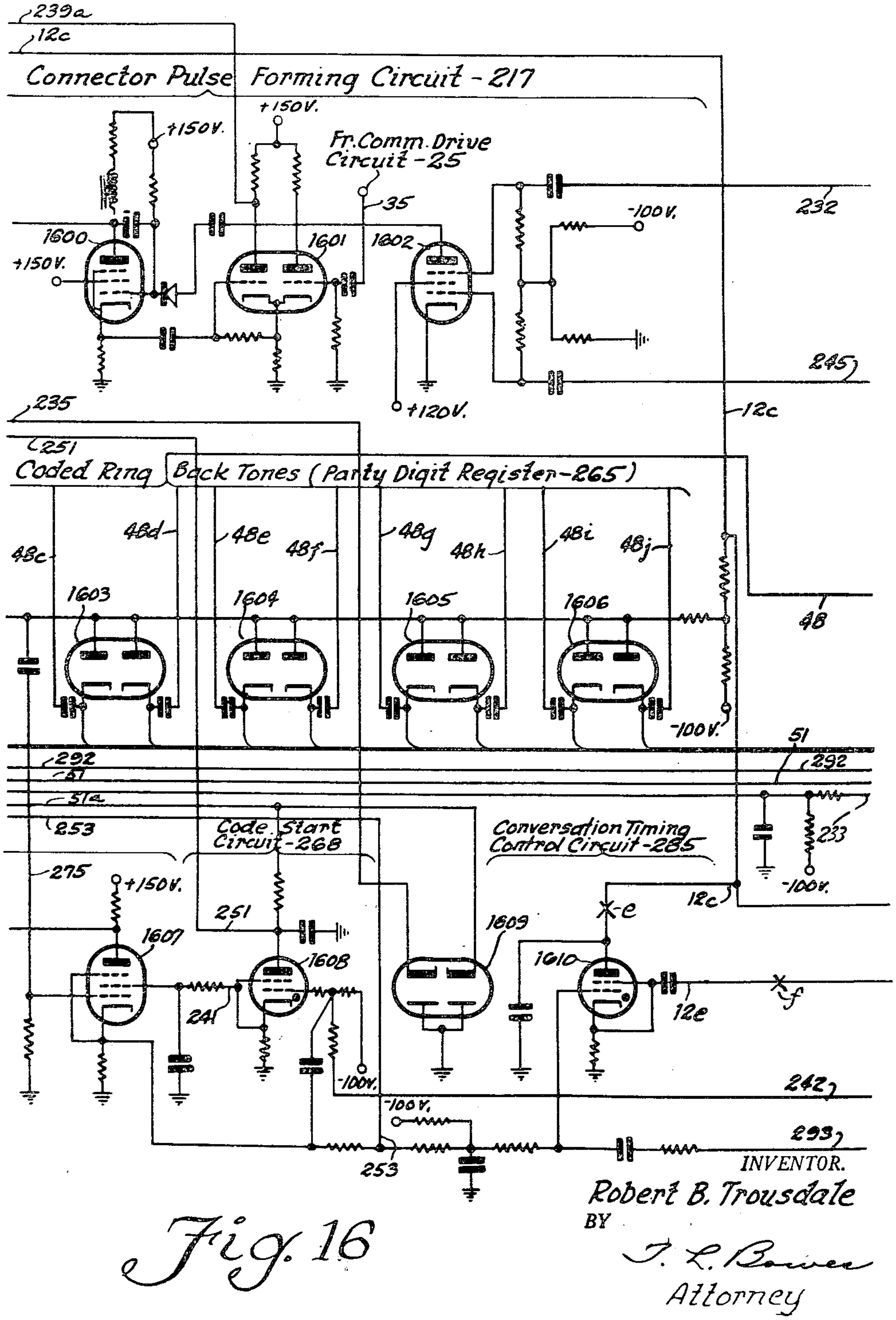

In order to illustrate the manner in which the composite connector may be modified to adapt it for use in any one of the three service groups, this connector is shown in detail in Figs. 6 to 10 inclusive, and 13 to 17, inclusive, of the drawings. In order to correlate these nine figures with the schematic showing of Figs. 2B and 2C, it may be pointed out that the tens, units and party inverters 260, 261 and 262 are shown in Fig. 6 as respectively including the inverter tubes 600, 603 and 606, the tens sequence timing circuit 212 is shown in Figs. 6 and 7 as comprising a start tube 601, a timing tube 602, and a condenser discharge tube 700, the units sequence timing circuit 216 is shown in Figs. 6 and 7 as comprising a start tube 604, a timing tube 605, and a condenser discharge tube 703, and the party sequence timing circuit 264 is shown in Figs. 6 and 7 as comprising a start tube 607, a timing tube 608, and a condenser discharge tube 706. The tens register pulsers 210, 214 and 263 are shown in Fig. 7 of the drawings as respectively including the pulser tubes 701, 704 and 707. The tens, units, and party register advancers 280, 281 and 282 are shown in Fig. 7 of the drawings as respectively including the pulser tubes 702, 705 and 708. The tens digit register 211 is shown in Figs. 8, 9 and 10 of the drawings as including the primer tube 800, the parallel connected impulse counting tubes 801A and 801B which together comprise the first impulse counting stage and nine other impulse counting tubes 802, 903–907, inclusive, and 1008–1010, inclusive. The units digit register 215 is shown in Figs. 8, 9 and 10 as comprising the primer tube 810, the parallel connected tubes 811A and 811B which together comprise the first impulse counting stage, and nine other impulse counting tubes 812, 913–917, inclusive, and 1018–1020, inclusive. The party digit register 265 is shown in Figs. 8, 9, 10, 15 and 16 of the drawings as comprising the primer tube 820, ten impulse counting tubes 821–823, inclusive, 924–928, inclusive, 1029 and 1030 and five double diode gate tubes 1507 and 1603–1606, inclusive. The trunk hunting control circuit 283 is shown in Fig. 13 of the drawings as comprising the trunk hunting control tube 1300 and the trunk hunting inverter tube 1301, the calling line in gate circuit 207 is shown in Fig. 13 of the drawings as comprising the gate tube 1303 and the inverter 1304, the called line reconstructor circuit 222 is shown in Figs. 13 and 14 of the drawings as comprising a peaker tube 1402, a condenser discharging tube 1401, a condenser charging tube 1400, and a cathode follower output tube 1302, the calling line out gate circuit 226 is shown in Fig. 13 of the drawings as comprising a single triple-grid gate tube 1305, the calling line reconstructor circuit 208 is shown in Figs. 13 and 14 of the drawings as comprising the peaker tube 1307, the condenser discharge tube 1308, the condenser charging tube 1406, a clamping diode including the right hand section of the duo-diode 1306 and a cathode follower tube 1407, the called line out gate circuit 224 is shown in Fig. 14 of the drawings as comprising the single triple-grid gate tube 1403, the called line in gate circuit 223 is shown in Fig. 14 of the drawings as comprising the gate tube 1404 and the inverter tube 1405, the ring trip circuit 221 is shown in Fig. 15 of the drawings as comprising the ring trip tube 1500, the busy test circuit 218 is shown in Fig. 15 of the drawings as comprising the busy test tube 1501 and the inverter tube 1505, the busy lock circuit 219 is shown in Fig. 15 of the drawings as comprising the busy lock tube 1504 and the inverter tube 1509, the dial impulse integrator circuit 209 is shown in Figs. 15 and 13 as comprising the dial impulse integrator tube 1508 and a diode clamping tube comprising the left hand section of the duo-diode 1306, the busy gate circuit 220 is shown in Fig. 15 of the drawings as comprising the gate tube 1502, and the connector pulse forming circuit 217 is shown in Figs. 15 and 16 of the drawings as comprising a connector pulse mixer tube 1602, a connector pulse sharpening tube 1601, an inverter tube 1600, and a cathode follower output tube 1503. The conversation timing warning tone circuit 284 is shown in Fig. 15 as comprising the gate tube 1506, the tone gate circuits 225 are shown in Figs. 15 and 16 as comprising the busy tone gate tube 1510, the dial tone gate tube 1511 and the ringback tone gate tube 1607, the code start circuit 1508 is shown in Fig. 16 as comprising the code start tube 1608, and the conversation timing control circuit 285 is shown in Fig. 16 as comprising the control tube 1610.

The manner in which the identified tubes of the connector are interconnected is described in detail in my copending application, Serial No. 301,215, identified above, and is pointed out more fully below with reference to the operation of the individual circuits. Although the identified tubes may be of any desired commercial type having the required operating characteristics, it is pointed out that preferably the tubes 600, 603, 606, 1400, 1401, 1308 and 1406 are duo-diode triodes of the commercial type 6AQ6, the tubes 1302, 1304, 1407, 1405, 1509, 1506, 1510, 1511, 1502 and 1503 are triodes of the commercial type 6C4, the tube 1601 is a double triode of the commercial type 6J6, the tubes 1303, 1404, and 1602 are pentodes of the commercial type 6AS6, the tubes 1301, 1307, 1402, 1600, 1607, 1505 and 1508 are pentodes of the commercial type 6AU6, the tubes 1300, 1305 and 1403 are preferably of the RCA developmental type A–5727 and are provided with three control grids each having a substantial mutual conductance with respect to the anode when operated at a potential negative with respect to the cathode, and the tubes 1306, 1507, 1603—1606 and 1609 are hot cathode duo-diodes of the commercial type 6AL5. Preferably, the gas filled thyratrons of the hot cathode type included in the connector **12*b*, namely the tubes 601, 604, 607, 800, 810, 820, 1500, 1501, 1608 and 1610 are of the RCA commercial type 5696. The cold cathode gas filled triodes included in the connector 12*b* are preferably of the RCA commercial type 5823. This group includes the tubes 602, 605, 608, 700–708, inclusive, 801A, 801B, 802, 811A, 811B, 812, 821–823, inclusive, 903–907, inclusive, 913–917, inclusive, 924–928, inclusive, 1008–1010, inclusive, 1018–1020, inclusive, 1029, 1030 and 1504**.

In the connector **12*b* the trunk hunting facilities are provided although no conversation timing facilities are provided. Accordingly, in order to adapt the above-described composite connector for use in the service A links of the system, the conversation timing warning tone circuit 284 and the conversation timing control circuit 285 are disabled in the connector 12*b* as well as the other connectors in the service A group. More specifically, the conductor 292 which extends from the anode of the ninth counting tube 1029 in the party digit register 265 to the control grid circuit of the warning tone gate tube 1506 in the circuit 284** is broken as indicated at *"c"* in Fig. 15 of the drawings. Also, the connection from the conductor 253 through the time delay network 1570, 1571 and 1572 to the anode of the warning tone gate tube 1506 is broken as indicated at *"d"* in Fig. 15. In the conversation timing control circuit 285 the conductor **12*c* which extends to the anode of the conversation timing control tube 1610** is broken as indicated at *"e"* in Fig. 16 and the conductor **12*e* which extends to the finder 12*a*** is broken as indicated at *"f"* in Fig. 16.

When the above-described circuit connections *"c"* and *"d"* are broken, the circuits 284 and 285 are effectively removed from the circuit so that the operation of the connector **12*b*, as well as the other connectors in the service A group, is substantially unaffected thereby. Accordingly, when the ninth counting tube 1029 in the party digit register 265 is fired in response to the tenth register drive pulse produced by the party register advancer 282 and a positive potential is developed in the conductor 292, this potential is not impressed upon the control grid of the gate tube 1506 so that the warning tone signal appearing on the conductor 58*a* is not transmitted through the gate tube 1506 to the calling and called subscribers. Furthermore, signal transmission through the tube 1506** is positively prevented by the disconnection *"d"* which removes anode potential from the tube 1506 and prevents conduction therethrough. Furthermore, when the tenth counting tube 1030 in the party digit register 265 is fired at the ends of the normal conversation timing period, the potential developed on the conductor 293 is impressed upon the control grid of the tube 1610 in a normal manner but this tube is prevented from firing due to the disconnection *"e"* which removes anode potential from this tube. Furthermore, even though the positive potential on the conductor 293 is repeated to the cathode circuit of the tube 1610, this potential is prevented from being transmitted to the finder **12*a*** due to the circuit disconnection *"f"*. Accordingly, the link 12 is not released at the end of the conversation timing period and the duration of a call, which is set up through the connector **12*b*** as well as any of the other connectors in the service A group, is unlimited.

With the exception of the above-described conversation timing facilities, the operation of the connector **12*b*** in the present system is substantially identical to the operation of the corresponding system components shown and described in detail in my copending application, Serial No. 301,215, identified above. Accordingly, a detailed description of the operation of this connector in setting up a call initiated on one of the service A lines of the system is considered unnecessary herein.

*Connector 12b′*

In considering the operation of the connector **12*b′*, it will be recalled that this connector, as well as the other connectors in the service B group, is not provided with either trunk hunting facilities or conversation timing facilities. The composite connector shown in Figs. 6 to 10, inclusive, and 13 to 17, inclusive, may be adapted for operation in the service B group of links by disconnecting the conversation timing facilities in the manner described above in connection with the connector 12*b* and by further disconnecting the trunk hunting facilities of the connector. More particularly, the conductor 235, which extends from the unit sequence timing circuit 216 to the trunk hunting control circuit 283**, is opened as indicated by the circuit disconnection *"a"* in Fig. 13 of the drawings, and the conductor 90, which extends from the units register advancer 281 to the units digit register 211 is also opened as indicated by the circuit disconnection *"b"* in Fig. 7. With this arrangement, the control grids of the trunk hunting control tube 1300 are biased well beyond cutoff so that the tube 1300 is prevented from conducting even though coincidence occurs between the trunk marking pulses appearing upon the conductor **56*a*, busy pulses appearing upon the conductor 52*b* and connector pulses appearing upon the conductor 239. Accordingly, if the called line tests busy, no trunk hunting control potential is developed on the conductor 288. Furthermore, the units register advancer tube 705** is prevented by means of the above-described circuit disconnection *"b"* from changing the setting of the units digit register 211 so that no trunk hunting operation is performed. The busy lock circuit 219 then functions at the end of the busy test interval to lock up the connector and return a busy tone signal to the calling subscriber to inform him that the called line is busy. It will also be understood that the conversation timing facilities in the connector **12*b′*** are disabled by means of the above-described circuit disconnections *"c," "d," "e"* and *"f"* so that the duration of a call set up through one of the connectors in the service B group is unlimited.

*Connector 12b″*

In considering the operation of the connector **12*b″*** as well as the other connectors in the service C group, it will be recalled that this connector is adapted to provide conversation timing facilities but is not adapted to provide trunk hunting facilities. Accordingly, the composite connector described above may be modified for operation in the service C group by making the above-described circuit disconnections "*a*" and "*b*" so that the trunk hunting facilities are disabled. However it will be understood that the conversation timing facilities remain operatively connected so as to limit the duration of the call in the manner described above.

*Distributor 15*

As pointed out in the general description of the system, this circuit is provided for the general purpose of distributing signals derived from the signal sample modulated connector pulses developed in the connectors of the system in the time positions of each pulse frame respectively assigned to the calling and called lines of the system to the line circuits terminating these lines. More specifically, this circuit is capable of distributing signals derived from the signal modulated connector pulses appearing in different time positions on the common distributor channel input conductor 51 to the respective line circuits under the directive control of the connectors of the system.

Figure 11:
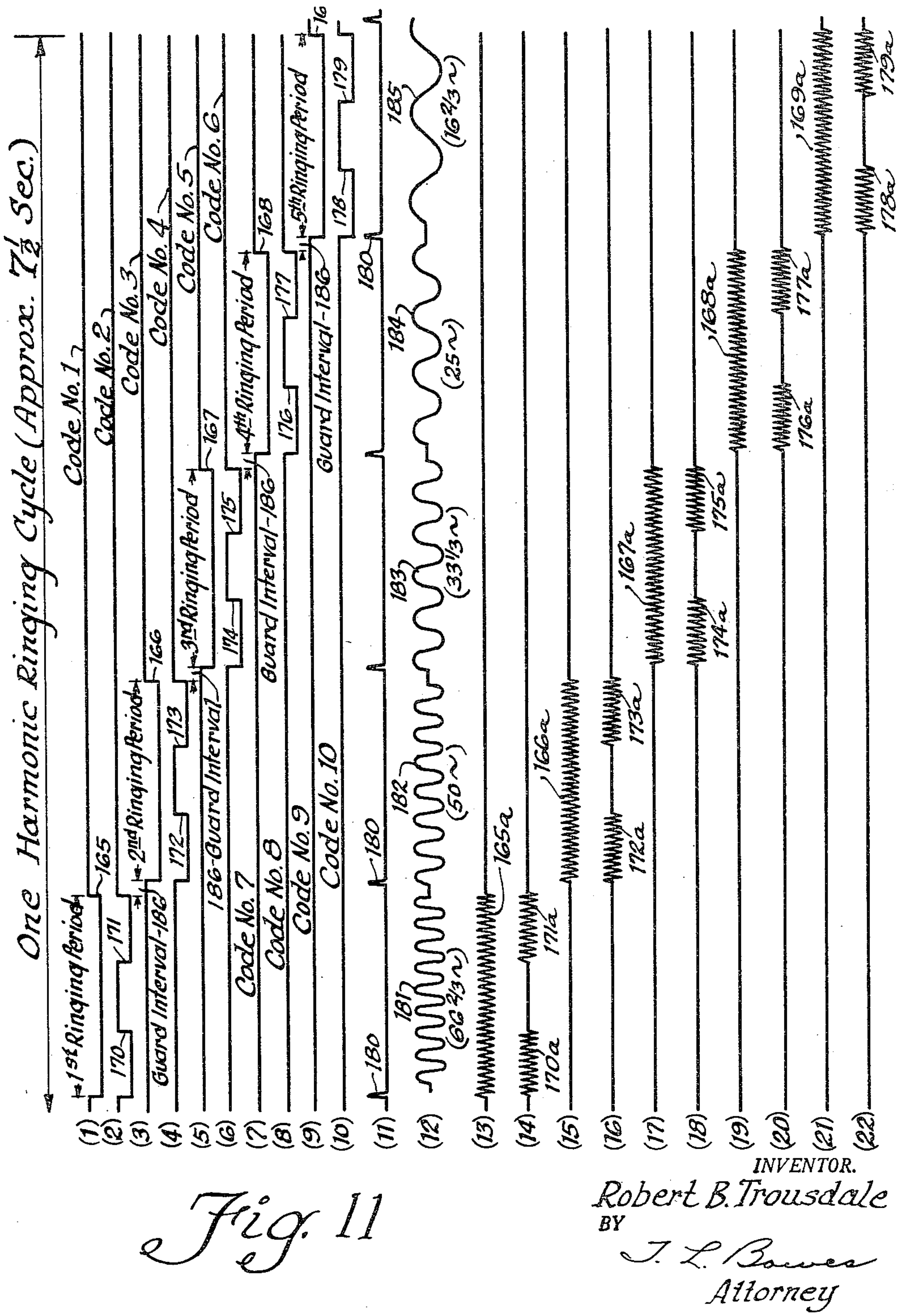

The distributor 15 may be of the type described in detail in either of the above-identified copending applications, Serial No. 134,974 and Serial No. 205,641 identified above. However, it will be understood that a particular type of distributor is designed to operate with a particular type of line circuit. With a line circuit of the type shown in Figs. 11 and 18 it is necessary to use a distributor of the type shown in copending application, Serial No. 205,641, since no provision is made in the line circuit of Figs. 11 and 18 for detecting the signals which are modulated on the connector signal pulses produced on the conductor 51, such detection being accomplished in a distributor of the type shown in copending application, Serial No. 205,641. However, it will be understood that a distributor of the type shown in copending application, Serial No. 134,974, may be employed, wherein no detection of the signal modulated connector signal pulses is performed in the distributor, in which case a line circuit of the type disclosed in that application would also be employed.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In an automatic telephone system, a plurality of lines having individually assigned thereto different time positions in repetitive time position frames, means including a plurality of impulse responsve links for setting up two-way communication connections between calling and called ones of said lines, and time position responsive restricted service means for restricting the service available to certain calling ones of said lines in accordance with the time position assigned thereto.

2. In an automatic telephone system, a plurality of lines having individually assigned thereto different time positions in repetitive time position frames, switching apparatus directively controllable in accordance with the time positions individually assigned to said lines for setting up two-way communication connections between different pairs of said lines, and time position responsive restricted service means for restricting the service available to certain calling ones of said lines in accordance with the time position assigned thereto.

3. In an automatic telephone system, a plurality of lines having individually assigned thereto different time positions in repetitive time position frames, means including a plurality of impulse responsive links for setting up two-way communication connections between calling and called ones of said lines, means for identifying certain calling ones of said lines as restricted service lines in accordance with the time positions individually assigned thereto, and restricted service means controlled by said line identification means for restricting the service on a call originating on one of said restricted service lines.

4. In an automatic telephone system, a plurality of lines having individually assigned thereto different time positions in repetitive time position frames, said lines being divided into two groups adapted to have different types of service available thereto, means for developing restricted service pulses in the time positions assigned to the lines of one of said groups, switching apparatus directively controllable in accordance with the time positions individually assigned to said lines for setting up telephonic connections between different pairs of said lines, and means included in said apparatus and controlled in part by said restricted service pulses for restricting the service available to the lines of one of said groups.

5. In an automatic telephone system, a plurality of lines having individually assigned thereto different time positions in repetitive time position frames, said lines being divided into two groups adapted to have different types of service available thereto, means for developing restricted service pulses in the time positions assigned to the lines of one of said groups, switching apparatus directively controllable in accordance with the time positions individually assigned to said lines for setting up telephonic connections between different pairs of said lines, and means included in said apparatus and controlled in part by said restricted service pulses for imposing service restrictions on said connections in accordance with the group to which the calling line involved in the connection is assigned.

6. In an automatic telephone system, a plurality of lines having individually assigned thereto different time positions in repetitive time position frames, said lines being divided into two groups having different classes of service available thereto, means including a plurality of impulse responsive links for setting up two-way communication connections between calling and called ones of said lines, certain ones of said links being equipped to provide service of one class and other ones of said links being equipped to provide service of a different class, and means for preventing calling lines of one group from being connected to links equipped to provide service of the type assigned to the other group incident to the setting up of said connections.

7. In an automatic telephone system, a plurality of lines having individually assigned thereto different time positions in repetitive time position frames, said lines being divided into two groups having different classes of service available thereto, means including a plurality of impulse responsive links for setting up two-way communication connections between calling and called ones of said lines, certain ones of said links being equipped to provide service of one class and other ones of said links being equipped to provide service of a different class, and means for operatively associating calling ones of said lines with said links in accordance with the class of service assigned thereto incident to the setting up of said connections.

8. In an automatic telephone system, a plurality of lines having individually assigned thereto different time positions in repetitive time position frames, said lines being arranged in two groups having different classes of service available thereto, means for developing a first group of restricted service pulses in the time positions assigned to the lines of one of said groups, means for developing a second group of restricted service pulses in the time positions assigned to the lines of the other of said groups, means including a plurality of impulse responsive links for setting up telephonic connections between calling and called ones of said lines, certain ones of said links being equipped to provide service of one class and other ones of said links being equipped to provide service of a different class, means included in said certain links and responsive to said first group of restricted service pulses for preventing said certain links from seizing calling lines in one of said groups, and means included in said other links and responsive to said second group of restricted service pulses for preventing said other links from seizing calling lines in the other of said groups.

9. In an automatic telephone system, a plurality of lines having individually assigned thereto different time positions in repetitive time position frames, means for producing pulses in the time positions indivdually assigned to calling ones of said lines, means for developing restricted service pulses in the time positions assigned to certain ones of said lines to mark said lines as restricted service lines, means for identifying a calling one of said lines as one of said marked lines by comparing the time positions of said calling line pulses and said restricted service pulses, and service limiting means controlled by said last named means for restricting the service available on a call originating on one of said calling lines which is identified as a restricted service line.

10. In an automatic telephone system, a plurality of lines having individually assigned thereto different time positions in repetitive time position frames, means for producing pulses in the time positions individually assigned to calling ones of said lines, means for developing restricted service pulses in the time positions assigned to certain ones of said lines to mark said lines as restricted service lines, a plurality of finder-connector links each including a finder and a connector, means including said links for setting up connections between different pairs of said lines, a group of said connectors being adapted to provide a restricted service, and means included in each of said finders and jointly controlled by said calling line pulses and said restricted service pulses for permitting calling ones of said restricted service lines to complete calls only through said group of connectors, thereby to restrict the service available to said restricted service lines.

11. In an automatic telephone system, a plurality of lines having individually assigned thereto different time positions in repetitive time position frames, first and second groups of impulse responsive links, multiplexer means provided with an output channel extending to all of said links and including means for impressing multiplexer pulses on said output channel in the time positions assigned to calling ones of said lines, means including said first group of links for completing calls originating on any one of a first group of said lines to any called one of said lines, and means including said second group of links for completing calls originating on any one of a second group of said lines to any called one of said lines.

12. In an automatic telephone system, a plurality of lines having individually assigned thereto different time positions in repetitive time position frames, said lines being arranged in two groups, the lines in one of said groups being designated as restricted service lines in which the duration of a call initiated thereon is limited, means for developing restricted service pulses in the time positions assigned to the lines of one of said groups, switching apparatus directively controllable in accordance with the time positions individually assigned to said lines for setting up telephonic connections between different pairs of said lines, and means included in said apparatus and controlled in part by said restricted service pulses for limiting the duration of calls initiated on the lines in said one group.

13. In an automatic telephone system, a plurality of lines having individually assigned thereto different time positions in repetitive time position frames, said lines being arranged in two groups, the lines in one of said groups being designated as restricted service lines in which the duration of a call initiated thereon is limited, means for developing restricted service pulses in the time positions assigned to the lines of one of said groups, means including a plurality of impulse responsive links for setting up telephonic connections between calling and called ones of said lines, means included in a first group of said links for limiting the duration of calls set up through said links, and restricted service means controlled in part by said restricted service pulses for operatively associating calling ones of the lines in said one group with idle ones of the links in said first group.

14. In an automatic telephone system, a plurality of lines having individually assigned thereto different time positions in repetitive time position frames, said lines being arranged in two groups, the lines in one of said groups being designated as restricted service lines in which the duration of a call initiated thereon is limited, first and second groups of impulse responsive links, means including said links for setting up two-way communication connections between different pairs of said lines, means included in each link in said first group of links for limiting the duration of a call set up therethrough, a first restricted service marking generator common to the links of said first group for developing restricted service marking pulses in the time positions assigned to the lines in one of said groups, a second restricted service marking generator common to the links of said second group for developing restricted service marking pulses in the time positions assigned to the lines in the other of said groups, and means for operatively associating calling ones of the lines in said one group only with idle ones of said first group of links.

15. In an automatic telephone system, a plurality of lines having individually assigned thereto different time positions in repetitive time position frames, said lines being arranged in different groups adapted to have different classes of service available thereto on calls initiated thereon, means including a plurality of impulse responsive links for setting up two-way communication connections between different pairs of said lines, said links being arranged in different groups adapted to provide said different classes of services on calls set up therethrough, means for operatively associating calling ones of said lines with said links in accordance with the service classification on said lines, and means for allotting the links in each of said groups to the use of calling lines in the same service class one at a time.

16. In an automatic telephone system, a plurality of lines having individually assigned thereto different time positions in repetitive time position frames, said lines being arranged in different groups adapted to have different classes of service available thereto on calls initiated thereon, means including a plurality of impulse responsive links for setting up two-way communication connections between different pairs of said lines, said links being arranged in different groups adapted to provide said different classes of services on calls set up therethrough, means for operatively associating calling ones of said lines with said links in accordance with the service classification of said lines, and means for allotting successive links in each of said groups to the use of successive calling lines in the same service classification.

17. In an automatic telephone system, a plurality of lines having individually assigned thereto different time positions in repetitive time position frames, said lines being arranged in different groups adapted to have different classes of service available thereto on calls initiated thereon, means including a plurality of impulse responsive links for setting up two-way communication connections between different pairs of said lines, said links being arranged in different groups adapted to provide said different classes of services on calls set up therethrough, means for operatively associating calling ones of said lines with said links in accordance with the service classification of said lines, means normally rendering each of said links inoperative to handle a call, means normally supplying an enabling control signal to one link in each group to permit said enabled links to handle the first call originating in each service group, and means included in each link and responsive to seizure of the link by a calling line in the same service group for diverting said control signal to the next link in the same service group to enable said next link to be taken into use by the next calling line in the same service group.

18. In an automatic telephone system, a plurality of lines having individually assigned thereto different time positions in repetitive time position frames, means for producing pulses in the time positions individually assigned to calling ones of said lines, means for developing restricted service pulses in the time positions assigned to certain ones of said lines to mark said lines as restricted service lines, a plurality of line finders, and means included in each of said finders and jointly controlled by said calling line pulses and said restricted service pulses for preventing a first group of said finders from becoming operatively associated with calling ones of said restricted service lines while permitting a second group of said finders to become operatively associated with calling ones of said restricted service lines.

19. In an automatic telephone system, a plurality of lines having individually assigned thereto different time positions in repetitive time position frames, a plurality of finders, multiplexer means provided with an output channel extending to all of said finders and including means for impressing multiplexer pulses on said output channel in the time positions assigned to calling ones of said lines, a first restricted service marking pulse channel extending to a first group of said finders, a second restricted service marking pulse channel extending to a second group of said finders, means for impressing restricted service marking pulses on said first channel in the time positions assigned to one group of said lines, means for impressing restricted service marking pulses on said second channel in the time positions assigned to another group of said lines, and means included in each of said finders and jointly controlled by the multiplexer pulses and restricted service marking pulses transmitted thereto for operatively associating said first group of finders with calling ones of the lines in one of said line groups and operatively associating said second group of finders with calling ones of the lines in the other of said line groups.

20. In an automatic telephone system, a plurality of lines having individually assigned thereto different time positions in repetitive time position frames, a plurality of finders each provided with a pulse gating circuit, multiplexer means for developing multiplexer pulses in the time positions assigned to calling ones of said lines, means for impressing said multiplexer pulses on the pulse gating circuits of each of said finders in parallel, means for impressing marking pulses on the pulse gating circuits of a first group of said finders in parallel in the time positions individually assigned to one group of said lines to control the gating of multiplexer pulses therethrough, means for impressing marking pulses on the pulse gating circuits of a second group of said finders in parallel in the time positions individually assigned to another group of said lines to control the gating of multiplexer pulses therethrough, and means included in each of said finders and responsive to the multiplexer pulses gated by the pulse gating circuit thereof for operatively associating the finder with the calling line corresponding to said gated multiplexer pulses.

21. In an automatic telephone system, a plurality of lines having individually assigned thereto different time positions in repetitive time position frames, a plurality of finders each provided with a pulse input gate tube, multiplexer means for developing multiplexer pulses in the time positions assigned to calling ones of said lines, means for impressing said multiplexer pulses on one control electrode of the gate tube in each of said finders in parallel, means for impressing marking pulses on a second electrode of the gate tube of a first group of said finders in parallel in the time positions individually assigned to one group of said lines, means for impressing marking pulses on a second electrode of the gate tube of a second group of said finders in parallel in the time positions individually assigned to another group of said lines, means common to said lines for impressing busy pulses on a third control electrode of the gate tube in each of said finders in parallel in the time positions assigned to busy lines of the system, each of said gate tubes being adapted to transmit multiplexer pulses therethrough which do not occur coincidentally with marking pulses and busy pulses impressed thereon, and means included in each finder and responsive to multiplexer pulses gated through the gate tube thereof for operatively associating the finder with the calling line corresponding to said gated multiplexer pulses.

22. In an automatic telephone system, a plurality of lines having individually assigned thereto different time positions in repetitive time position frames, a plurality of finders each provided with a pulse input gate tube, multiplexer means for developing multiplexer pulses in the time positions assigned to calling ones of said lines, means for impressing said multiplexer pulses on one control electrode of the gate tube in each of said finders in parallel, means for impressing marking pulses on a second electrode of the gate tube of a first group of said finders in parallel in the time positions individually assigned to one group of said lines, means for impressing marking pulses on a second electrode of the gate tube of a second group of said finders in parallel in the time positions individually assigned to another group of said lines, a busy pulse channel common to said lines and extending to each of said finders, means for impressing busy pulses on said channel in the time positions assigned to busy lines of the system, means included in each finder for impressing the busy pulses transmitted thereto over said channel on a third control electrode of the gate tube thereof, each of said gate tubes being adapted to transmit multiplexer pulses therethrough which do not occur coincidentally with marking pulses and busy pulses impressed thereon, means included in each finder and responsive to multiplexer pulses gated through the gate tube thereof for operatively associating the finder with the calling line corresponding to said gated multiplexer pulses, means included in each finder and responsive to operative association thereof with the calling line for impressing busy pulses on said channel in the time position assigned to the calling line, and means included in each finder for preventing said last named busy pulses from being impressed upon the third control electrode of the gate tube thereof.

23. In an automatic telephone system, a plurality of lines, means responsive to the initiation of a call on one of said lines for developing calling line pulses identifying said calling line, means for developing restricted service pulses to mark certain ones of said lines as restricted service lines, means for comparing said calling line pulses and said restricted service pulses to determine if said calling line is a restricted service line, and service restricting means controlled by said last named means for restricting the service available on the call in the event said calling line is a restricted service line.

24. In an automatic telephone system, a plurality of lines, means responsive to the initiation of a call on one of said lines for developing calling line pulses identifying said calling line, means for developing restricted service pulses to mark certain ones of said lines as restricted service lines, means for comparing said calling line pulses and said restricted service pulses to determine if said calling line is a restricted service line, and service limiting means controlled by said last named means for limiting the duration of the call in the event said calling line is a restricted service line.

25. In an automatic telephone system, a plurality of lines, means responsive to the initiation of a call on one of said lines for developing calling line pulses identifying said calling line, means responsive to said calling line pulses and directively controllable in accordance with operator produced signals transmitted over said calling line for extending a connection from said calling line to a called one of said lines, means for developing restricted service pulses to mark certain ones of said lines as restricted service lines, and restricted service means responsive to said restricted service pulses for restricting to service available on the call in the event said calling line is a restricted service line.

26. In an automatic telephone system, a plurality of lines, means responsive to the initiation of a call on one of said lines for developing calling line pulses identifying said calling line, means responsive to said calling line pulses and directively controllable in accordance with operator produced signals transmitted over said calling line for extending a connection from said calling line to a called one of said lines, means for developing restricted service pulses to mark certain ones of said lines as restricted service lines, and means jointly responsive to said calling line pulses and said restricted service pulses for limiting the duration of the call in the event said calling line is a restricted service line.

27. In an automatic telephone system, a plurality of lines, said lines being divided into two groups having different classes of service available thereto, means including a plurality of impulse responsive links for setting up two-way communication connections between calling and called ones of said lines, certain ones of said links being equipped to provide service of one class and other ones of said links being equipped to provide service of a different class, and means for operatively associating calling ones of said lines with said links in accordance with the class of service assigned thereto incident to the setting up of said connections.

28. In an automatic telephone system, a plurality of lines, means responsive to the initiation of a call on any one of said lines for developing pulses which distinguish said calling line from the other lines of said system, a plurality of pulse transmission paths, means including a plurality of impulse responsive links for setting up over different ones of said pulse paths a two-way communication connection between said calling line and any called one of said lines, and pulse responsive restricted service means for restricting the service available to certain calling ones of said lines in accordance with the pulse identification assigned thereto.

29. In an automatic telephone system, a plurality of lines, means responsive to the initiation of a call on one of said lines for developing continuously repetitive pulses identifying said calling line, means responsive to said developed pulses and directively controllable in accordance with operator produced signals transmitted over said calling line for extending a connection from said calling line to a called one of said lines, and pulse responsive restricted service means for restricting the service available to certain calling ones of said lines in accordance with the pulse identification assigned thereto.

References Cited in the file of this patent

UNITED STATES PATENTS

| | | |
|---|---|---|
| 2,333,474 | Denton | Nov. 2, 1943 |
| 2,584,987 | Deloraine | Feb. 12, 1952 |
| 2,647,163 | Lomax | July 28, 1953 |